(12) United States Patent
Chen et al.

(10) Patent No.: US 12,445,616 B2
(45) Date of Patent: *Oct. 14, 2025

(54) VIDEO DECODING METHOD AND VIDEO DECODER

(71) Applicant: Huawei Technologies Co., Ltd., Shenzhen (CN)

(72) Inventors: Huanbang Chen, Shenzhen (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/741,097

(22) Filed: Jun. 12, 2024

(65) Prior Publication Data

US 2024/0333935 A1 Oct. 3, 2024

Related U.S. Application Data

(63) Continuation of application No. 18/322,037, filed on May 23, 2023, now Pat. No. 12,047,577, which is a
(Continued)

(30) Foreign Application Priority Data

Sep. 10, 2018 (CN) .......................... 201811053068.0

(51) Int. Cl.
*H04N 19/13* (2014.01)
*H04N 19/159* (2014.01)
(Continued)

(52) U.S. Cl.
CPC ........... *H04N 19/13* (2014.11); *H04N 19/159* (2014.11); *H04N 19/176* (2014.11); *H04N 19/52* (2014.11); *H04N 19/70* (2014.11)

(58) Field of Classification Search
None
See application file for complete search history.

(56) References Cited

U.S. PATENT DOCUMENTS

| 8,995,523 B2 | 3/2015 | Chien |
| 2009/0096643 A1 | 4/2009 | Chang |

(Continued)

FOREIGN PATENT DOCUMENTS

| CN | 102611888 A | 7/2012 |
| CN | 103024380 A | 4/2013 |

(Continued)

OTHER PUBLICATIONS

Yin Zhao et al, "CE1: Context modeling of MTT split modes (Test 1.0.17)," JVET-K0134-v1, Joint Video Experts Team (JVET) of ITU-T SG 16 WP 3 and ISO/IEC JTC 1/SC 29/WG 11, 11th Meeting: Ljubljana, SI, Jul. 10-18, 2018, 6 pages.

(Continued)

*Primary Examiner* — Lindsay J Uhl
(74) *Attorney, Agent, or Firm* — Conley Rose, P.C.

(57) ABSTRACT

A video decoding method includes obtaining a to-be-entropy-decoded syntax element in a current block by parsing a received bitstream, where the to-be-entropy-decoded syntax element includes a syntax element 1 or a syntax element 2 in the current block, obtaining a context model corresponding to the to-be-entropy-decoded syntax element, where both of a context model corresponding to the syntax element 1 and a context model corresponding to the syntax element 2 are determined from the same preset context model set, entropy decoding the to-be-entropy-decoded syntax element based on the context model corresponding to the to-be-entropy-decoded syntax element, and obtaining a reconstructed image of the current block based on the syntax element obtained by entropy decoding.

20 Claims, 12 Drawing Sheets

Related U.S. Application Data continuation of application No. 17/195,798, filed on Mar. 9, 2021, now Pat. No. 11,706,417, which is a continuation of application No. PCT/CN2019/105024, filed on Sep. 10, 2019.

(51) Int. Cl.
*H04N 19/176* (2014.01)
*H04N 19/52* (2014.01)
*H04N 19/70* (2014.01)

(56) References Cited

U.S. PATENT DOCUMENTS

| | | |
|---|---|---|
| 2011/0243226 A1 | 10/2011 | Choi et al. |
| 2012/0155545 A1 | 6/2012 | Marpe et al. |
| 2012/0320968 A1 | 12/2012 | Zheng et al. |
| 2012/0328003 A1 | 12/2012 | Chien et al. |
| 2012/0328209 A1 | 12/2012 | Sasai et al. |
| 2013/0003835 A1* | 1/2013 | Sole Rojals ......... H04N 19/129 375/240.18 |
| 2013/0016789 A1* | 1/2013 | Lou ...................... H04N 19/61 375/240.18 |
| 2013/0070848 A1 | 3/2013 | Guo et al. |
| 2013/0094580 A1 | 4/2013 | Zhou et al. |
| 2013/0114668 A1 | 5/2013 | Misra et al. |
| 2013/0114671 A1 | 5/2013 | Chien et al. |
| 2013/0176390 A1 | 7/2013 | Chen et al. |
| 2013/0271566 A1 | 10/2013 | Chen et al. |
| 2013/0272377 A1 | 10/2013 | Karzewicz et al. |
| 2014/0098878 A1 | 4/2014 | Guillemot et al. |
| 2014/0140400 A1 | 5/2014 | George et al. |
| 2014/0219335 A1 | 8/2014 | Lee et al. |
| 2014/0294061 A1 | 10/2014 | Zhang et al. |
| 2014/0301454 A1 | 10/2014 | Zhang et al. |
| 2015/0023409 A1 | 1/2015 | Schierl et al. |
| 2016/0301938 A1 | 10/2016 | Sun et al. |
| 2016/0330479 A1 | 11/2016 | Liu |
| 2016/0373741 A1 | 12/2016 | Zhao et al. |
| 2016/0373756 A1 | 12/2016 | Yu et al. |
| 2017/0339419 A1 | 11/2017 | Chuang et al. |
| 2018/0098089 A1 | 4/2018 | Chen et al. |
| 2018/0098092 A1 | 4/2018 | Ye et al. |
| 2018/0184126 A1 | 6/2018 | Zhang et al. |
| 2018/0288416 A1 | 10/2018 | Huang et al. |
| 2018/0295385 A1 | 10/2018 | Alshin et al. |
| 2018/0309990 A1 | 10/2018 | Alshina et al. |

FOREIGN PATENT DOCUMENTS

| | | |
|---|---|---|
| CN | 103563378 A | 2/2014 |
| CN | 103609123 A | 2/2014 |
| CN | 103716629 A | 4/2014 |
| CN | 103765887 A | 4/2014 |
| CN | 103797802 A | 5/2014 |
| CN | 103988437 A | 8/2014 |
| CN | 104041047 A | 9/2014 |
| CN | 104093025 A | 10/2014 |
| CN | 104205830 A | 12/2014 |
| CN | 104205846 A | 12/2014 |
| CN | 105052147 A | 11/2015 |
| CN | 105103559 A | 11/2015 |
| CN | 105247863 A | 1/2016 |
| CN | 105850132 A | 8/2016 |
| CN | 106063262 A | 10/2016 |
| CN | 106488239 A | 3/2017 |
| CN | 106878715 A | 6/2017 |
| CN | 107277539 A | 10/2017 |
| CN | 107333141 A | 11/2017 |
| CN | 107431824 A | 12/2017 |
| CN | 107534711 A | 1/2018 |
| CN | 107787582 A | 3/2018 |
| CN | 108028919 A | 5/2018 |
| CN | 108141594 A | 6/2018 |
| EP | 3139616 A1 | 3/2017 |
| KR | 20140130171 A | 11/2014 |
| RU | 2603531 C2 | 11/2016 |
| TW | 201830964 A | 8/2018 |
| WO | 2013155424 A1 | 10/2013 |
| WO | 2014048372 A1 | 4/2014 |
| WO | 2018048904 A1 | 3/2018 |

OTHER PUBLICATIONS

Yin Zhao et al, "CE1-related: Context modeling of CU split modes," JVET-L0361-v4, Joint Video Experts Team (JVET) of ITU-T SG 16 WP 3 and ISO/IEC JTC 1/SC 29/WG 11, 12th Meeting: Macao, CN, Oct. 3-12, 2018, 8 pages.

Benjamin Bross et al, WD4: "Working Draft 4 of High-Efficiency Video Coding," JCTVC-F803_d6, Joint Collaborative Team on Video Coding (JCT-VC) of ITU-T SG16 WP3 and ISO/IEC JTC1/SC29/WG11, 6th Meeting: Torino, IT, Jul. 14-22, 2011, 44 pages.

Shih-Ta Hsiang et al, "CE1-related: Context modeling for coding CU split decisions," JVET-K0362-v2, Joint Video Experts Team (JVET) of ITU-T SG 16 WP 3 and ISO/IEC JTC 1/SC 29/WG 11, 11th Meeting: Ljubljana, SI, Jul. 10-18, 2018, 6 pages.

Kengo Terada et al, "CE11: Context reduction for coefficient level," JCTVC-H0160, WG 11 No. m23032, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, XP030051557, 9 pages.

Haitao Yang et al, "Draft text for affine motion compensation," JVET-K0565-v2, Joint Video Experts Team (JVET) of ITU-T SG 16 WP 3 and ISO/IECJTC 1/SC 29/WG11, 11th Meeting: Ljubljana, SI, Jul. 10-18, 2018, XP030200043, 61 pages.

Benjamin Bross et al, "WD4: Working Draft 4 of High-Efficiency Video Coding," JCTVC-F803_d2, Joint Collaborative Team on Video Coding (JCT-VC) ofITU-T SG16 WP3 and ISO/IEC JTC1/SC29/WG11, 6th Meeting: Torino, IT, Jul. 14-22, 2011, XP030229349, 223 pages.

\* cited by examiner

VIDEO DECODING METHOD AND VIDEO DECODER

CROSS-REFERENCE TO RELATED APPLICATIONS

This is a continuation of U.S. patent application Ser. No. 18/322,037 filed on May 23, 2023, which is a continuation of U.S. patent application Ser. No. 17/195,798 filed on Mar. 9, 2021, now U.S. Pat. No. 11,706,417, which is a continuation of International Patent Application No. PCT/CN2019/105024 filed on Sep. 10, 2019, which claims priority to Chinese Patent Application No. 201811053068.0 filed on Sep. 10, 2018. All of the aforementioned patent applications are hereby incorporated by reference in their entireties.

TECHNICAL FIELD

Embodiments of this application generally relate to the video coding field, and more specifically, to a video decoding method and a video decoder.

BACKGROUND

Video coding (video encoding and decoding) is used in a wide range of digital video applications, for example, broadcast digital television (TV), video transmission over internet and mobile networks, real-time conversational applications such as video chat and video conferencing, digital versatile disc (DVD) and BLU-RAY discs, and security applications of video content acquisition and editing systems and camcorders.

With development of a block-based hybrid video coding mode in the H.261 standard in 1990, new video coding technologies and tools have been developed and lay a foundation for new video coding standards. Other video coding standards include Moving Picture Experts Group (MPEG)-1 video, MPEG-2 video, International Telecommunications Union (ITU)-T H.262/MPEG-2, ITU-T H.263, ITU-T H.264/MPEG-4 Part 10 advanced video coding (AVC), and ITU-T H.265/High Efficiency Video Coding (HEVC), and extensions of such standards, for example, scalability and/or three-dimensional (3D) extensions of such standards. As video creation and use become increasingly widespread, video traffic has become a biggest burden for communications networks and data storage. Therefore, one of objectives of most video coding standards is to reduce a bit rate without sacrificing picture quality as compared with previous standards. Although latest HEVC can compress videos about twice as much as AVC without sacrificing picture quality, there is still an urgent need for a new technology to further compress videos in comparison with HEVC.

SUMMARY

Embodiments of this application provide a video decoding method and a video decoder, to reduce space required by an encoder or a decoder to store a context.

The foregoing and other objects are achieved by the subject matter of the independent claims. Other implementations are apparent from the dependent claims, the description, and the accompanying draws.

According to a first aspect, a video decoding method is provided, including parsing a received bitstream to obtain a to-be-entropy-decoded syntax element in a current block, where the to-be-entropy-decoded syntax element in the current block includes a syntax element 1 in the current block or a syntax element 2 in the current block, performing entropy decoding on the to-be-entropy-decoded syntax element in the current block, where entropy decoding on the syntax element 1 in the current block is completed by using a preset context model, or entropy decoding on the syntax element 2 in the current block is completed by using the context model, performing prediction processing on the current block based on a syntax element that is in the current block and that is obtained through entropy decoding, to obtain a prediction block of the current block, and obtaining a reconstructed image of the current block based on the prediction block of the current block.

Because the syntax element 1 and the syntax element 2 in the current block share one context model, a decoder does not need to confirm the context model when performing entropy decoding, so as to improve decoding efficiency of performing video decoding by the decoder. In addition, because the video decoder needs to store only one context model for the syntax element 1 and the syntax element 2, less storage space of the video decoder can be occupied.

According to a second aspect, a video decoding method is provided, including parsing a received bitstream to obtain a to-be-entropy-decoded syntax element in a current block, where the to-be-entropy-decoded syntax element in the current block includes a syntax element 1 in the current block or a syntax element 2 in the current block, obtaining a context model corresponding to the to-be-entropy-decoded syntax element, where a context model corresponding to the syntax element 1 in the current block is determined from a preset context model set, or a context model corresponding to the syntax element 2 in the current block is determined from the preset context model set, performing entropy decoding on the to-be-entropy-decoded syntax element based on the context model corresponding to the to-be-entropy-decoded syntax element in the current block, performing prediction processing on the current block based on a syntax element that is in the current block and that is obtained through entropy decoding, to obtain a prediction block of the current block, and obtaining a reconstructed image of the current block based on the prediction block of the current block.

Because the syntax element 1 and the syntax element 2 in the current block share one context model, a video decoder needs to store only one context model for the syntax element 1 and the syntax element 2, so as to occupy less storage space of the video decoder.

With reference to the second aspect, in a possible implementation, a quantity of context models in the preset context model set is 2 or 3.

With reference to the second aspect, in a possible implementation, that a context model corresponding to the syntax element 1 in the current block is determined from a preset context model set includes determining a context index of the syntax element 1 in the current block based on a syntax element 1 and a syntax element 2 in the left neighboring block of the current block and a syntax element 1 and a syntax element 2 in the upper neighboring block of the current block, where the context index of the syntax element 1 in the current block is used to indicate the context model corresponding to the syntax element 1 in the current block, or that a context model corresponding to the syntax element 2 in the current block is determined from the preset context model set includes determining a context index of the syntax element 2 in the current block based on a syntax element 1 and a syntax element 2 in the left neighboring block of the current block and a syntax element 1 and a syntax element 2 in the upper neighboring block of the current block, where the context index of the syntax element 2 in the current block is used to indicate the context model corresponding to the syntax element 2 in the current block.

With reference to the second aspect, in a possible implementation, if the quantity of context models in the preset context model set is 3, a value of the context index of the syntax element 1 in the current block is a sum of a value obtained by performing an OR operation on the syntax element 1 and the syntax element 2 in the upper neighboring block and a value obtained by performing an OR operation on the syntax element 1 and the syntax element 2 in the left neighboring block, or a value of the context index of the syntax element 2 in the current block is a sum of a value obtained by performing an OR operation on the syntax element 1 and the syntax element 2 in the upper neighboring block and a value obtained by performing an OR operation on the syntax element 1 and the syntax element 2 in the left neighboring block.

With reference to the second aspect, in a possible implementation, if the quantity of context models in the preset context model set is 2, a value of the context index of the syntax element 1 in the current block is a result obtained by performing an OR operation on a value obtained by performing an OR operation on the syntax element 1 and the syntax element 2 in the upper neighboring block and a value obtained by performing an OR operation on the syntax element 1 and the syntax element 2 in the left neighboring block, or a value of the context index of the syntax element 2 in the current block is a result obtained by performing an OR operation on a value obtained by performing an OR operation on the syntax element 1 and the syntax element 2 in the upper neighboring block and a value obtained by performing an OR operation on the syntax element 1 and the syntax element 2 in the left neighboring block.

With reference to the first aspect or the second aspect, in a possible implementation, the syntax element 1 in the current block is affine_merge_flag, and is used to indicate whether an affine motion model-based merge mode is used for the current block, or the syntax element 2 in the current block is affine_inter_flag, and is used to indicate whether an affine motion model-based advanced motion vector prediction (AMVP) mode is used for the current block when a slice in which the current block is located is a P-type slice or a B-type slice, or the syntax element 1 in the current block is subblock_merge_flag, and is used to indicate whether a subblock-based merge mode is used for the current block, or the syntax element 2 in the current block is affine_inter_flag, and is used to indicate whether an affine motion model-based AMVP mode is used for the current block when a slice in which the current block is located is a P-type slice or a B-type slice.

According to a third aspect, a video decoding method is provided, including parsing a received bitstream to obtain a to-be-entropy-decoded syntax element in a current block, where the to-be-entropy-decoded syntax element in the current block includes a syntax element 3 in the current block or a syntax element 4 in the current block, obtaining a context model corresponding to the to-be-entropy-decoded syntax element, where a context model corresponding to the syntax element 3 in the current block is determined from a preset context model set, or a context model corresponding to the syntax element 4 in the current block is determined from the preset context model set, performing entropy decoding on the to-be-entropy-decoded syntax element based on the context model corresponding to the to-be-entropy-decoded syntax element in the current block, performing prediction processing on the current block based on a syntax element that is in the current block and that is obtained through entropy decoding, to obtain a prediction block of the current block, and obtaining a reconstructed image of the current block based on the prediction block of the current block.

Because the syntax element 3 and the syntax element 4 in the current block share one context model, a video decoder needs to store only one context model for the syntax element 3 and the syntax element 4, so as to occupy less storage space of the video decoder.

With reference to the third aspect, in a possible implementation, the preset context model set includes five context models.

With reference to the third aspect, in a possible implementation, the syntax element 3 in the current block is merge_idx, and is used to indicate an index value of a merge candidate list of the current block, or the syntax element 4 in the current block is affine_merge_idx, and is used to indicate an index value of an affine merge candidate list of the current block, or the syntax element 3 in the current block is merge_idx, and is used to indicate an index value of a merge candidate list of the current block, or the syntax element 4 in the current block is subblock_merge_idx, and is used to indicate an index value of a subblock merge candidate list.

According to a fourth aspect, a video decoding method is provided, including parsing a received bitstream to obtain a to-be-entropy-decoded syntax element in a current block, where the to-be-entropy-decoded syntax element in the current block includes a syntax element 1 in the current block or a syntax element 2 in the current block, determining a value of a context index of the to-be-entropy-decoded syntax element in the current block based on values of a syntax element 1 and a syntax element 2 in the left neighboring block of the current block and values of a syntax element 1 and a syntax element 2 in the upper neighboring block of the current block, performing entropy decoding on the to-be-entropy-decoded syntax element based on the value of the context index of the to-be-entropy-decoded syntax element in the current block, performing prediction processing on the current block based on a syntax element that is in the current block and that is obtained through entropy decoding, to obtain a prediction block of the current block, and obtaining a reconstructed image of the current block based on the prediction block of the current block.

With reference to the fourth aspect, in a possible implementation, the syntax element 1 in the current block is affine_merge_flag, and is used to indicate whether an affine motion model-based merge mode is used for the current block, or the syntax element 2 in the current block is affine_inter_flag, and is used to indicate whether an affine motion model-based AMVP mode is used for the current block when a slice in which the current block is located is a P-type slice or a B-type slice, or the syntax element 1 in the current block is subblock_merge_flag, and is used to indicate whether a subblock-based merge mode is used for the current block, or the syntax element 2 in the current block is affine_inter_flag, and is used to indicate whether an affine motion model-based AMVP mode is used for the current block when a slice in which the current block is located is a P-type slice or a B-type slice.

With reference to the fourth aspect, in a possible implementation, the determining a value of a context index of the to-be-entropy-decoded syntax element in the current block based on values of a syntax element 1 and a syntax element 2 in the left neighboring block of the current block and values of a syntax element 1 and a syntax element 2 in the upper neighboring block of the current block includes determining the value of the context index of the to-be-entropy-decoded syntax element in the current block according to the following logical expression: Context index=(condL && availableL)+(condA && availableA), where condL=syntax element 1 [x0−1][y0]|syntax element 2 [x0−1][y0], where syntax element 1 [x0−1][y0] indicates the value of the syntax element 1 in the left neighboring block, and syntax element 2 [x0−1][y0] indicates the value of the syntax element 2 in the left neighboring block, condA=syntax element 1 [x0][y0−1]|syntax element 2 [x0][y0−1], where syntax element 1 [x0][y0−1] indicates the value of the syntax element 1 in the upper neighboring block, and syntax element 2 [x0][y0−1] indicates the value of the syntax element 2 in the upper neighboring block, and availableL indicates whether the left neighboring block is available, and availableA indicates whether the upper neighboring block is available.

According to a fifth aspect, a video decoder is provided, including an entropy decoding unit, configured to parse a received bitstream to obtain a to-be-entropy-decoded syntax element in a current block, where the to-be-entropy-decoded syntax element in the current block includes a syntax element 1 in the current block or a syntax element 2 in the current block, determine a value of a context index of the to-be-entropy-decoded syntax element in the current block based on values of a syntax element 1 and a syntax element 2 in the left neighboring block of the current block and values of a syntax element 1 and a syntax element 2 in the upper neighboring block of the current block, and perform entropy decoding on the to-be-entropy-decoded syntax element based on the value of the context index of the to-be-entropy-decoded syntax element in the current block, a prediction processing unit, configured to perform prediction processing on the current block based on a syntax element that is in the current block and that is obtained through entropy decoding, to obtain a prediction block of the current block, and a reconstruction unit, configured to obtain a reconstructed image of the current block based on the prediction block of the current block.

With reference to the fifth aspect, in a possible implementation, the syntax element 1 in the current block is affine_merge_flag, and is used to indicate whether an affine motion model-based merge mode is used for the current block, or the syntax element 2 in the current block is affine_inter_flag, and is used to indicate whether an affine motion model-based AMVP mode is used for the current block when a slice in which the current block is located is a P-type slice or a B-type slice, or the syntax element 1 in the current block is subblock_merge_flag, and is used to indicate whether a subblock-based merge mode is used for the current block, or the syntax element 2 in the current block is affine_inter_flag, and is used to indicate whether an affine motion model-based AMVP mode is used for the current block when a slice in which the current block is located is a P-type slice or a B-type slice.

With reference to the fifth aspect, in a possible implementation, the entropy decoding unit is specifically configured to determine the value of the context index of the to-be-entropy-decoded syntax element in the current block according to the following logical expression: Context index=(condL && availableL)+(condA && availableA), where condL=syntax element 1 [x0−1][y0]|syntax element 2 [x0−1][y0], where syntax element 1 [x0−1][y0] indicates the value of the syntax element 1 in the left neighboring block, and syntax element 2 [x0−1][y0] indicates the value of the syntax element 2 in the left neighboring block, condA=syntax element 1 [x0][y0−1]|syntax element 2 [x0][y0−1], where syntax element 1 [x0][y0−1] indicates the value of the syntax element 1 in the upper neighboring block, and syntax element 2 [x0][y0−1] indicates the value of the syntax element 2 in the upper neighboring block, and availableL indicates whether the left neighboring block is available, and availableA indicates whether the upper neighboring block is available.

According to a sixth aspect, a video decoder is provided, including an entropy decoding unit, configured to parse a received bitstream to obtain a to-be-entropy-decoded syntax element in a current block, where the to-be-entropy-decoded syntax element in the current block includes a syntax element 1 in the current block or a syntax element 2 in the current block, and perform entropy decoding on the to-be-entropy-decoded syntax element in the current block, where entropy decoding on the syntax element 1 in the current block is completed by using a preset context model, or entropy decoding on the syntax element 2 in the current block is completed by using the context model, a prediction processing unit, configured to perform prediction processing on the current block based on a syntax element that is in the current block and that is obtained through entropy decoding, to obtain a prediction block of the current block, and a reconstruction unit, configured to obtain a reconstructed image of the current block based on the prediction block of the current block.

According to a seventh aspect, a video decoder is provided, including an entropy decoding unit, configured to parse a received bitstream to obtain a to-be-entropy-decoded syntax element in a current block, where the to-be-entropy-decoded syntax element in the current block includes a syntax element 1 in the current block or a syntax element 2 in the current block, obtain a context model corresponding to the to-be-entropy-decoded syntax element, where a context model corresponding to the syntax element 1 in the current block is determined from a preset context model set, or a context model corresponding to the syntax element 2 in the current block is determined from the preset context model set, and perform entropy decoding on the to-be-entropy-decoded syntax element based on the context model corresponding to the to-be-entropy-decoded syntax element in the current block, a prediction processing unit, configured to perform prediction processing on the current block based on a syntax element that is in the current block and that is obtained through entropy decoding, to obtain a prediction block of the current block, and a reconstruction unit, configured to obtain a reconstructed image of the current block based on the prediction block of the current block.

With reference to the seventh aspect, in a possible implementation, a quantity of context models in the preset context model set is 2 or 3.

With reference to the seventh aspect, in a possible implementation, the entropy decoding unit is specifically configured to determine a context index of the syntax element 1 in the current block based on a syntax element 1 and a syntax element 2 in the left neighboring block of the current block and a syntax element 1 and a syntax element 2 in the upper neighboring block of the current block, where the context index of the syntax element 1 in the current block is used to indicate the context model corresponding to the syntax element 1 in the current block, or determine a context index of the syntax element 2 in the current block based on a syntax element 1 and a syntax element 2 in the left neighboring block of the current block and a syntax element 1 and a syntax element 2 in the upper neighboring block of the current block, where the context index of the syntax element 2 in the current block is used to indicate the context model corresponding to the syntax element 2 in the current block.

With reference to the seventh aspect, in a possible implementation, if the quantity of context models in the preset context model set is 3, a value of the context index of the syntax element 1 in the current block is a sum of a value obtained by performing an OR operation on the syntax element 1 and the syntax element 2 in the upper neighboring block and a value obtained by performing an OR operation on the syntax element 1 and the syntax element 2 in the left neighboring block, or a value of the context index of the syntax element 2 in the current block is a sum of a value obtained by performing an OR operation on the syntax element 1 and the syntax element 2 in the upper neighboring block and a value obtained by performing an OR operation on the syntax element 1 and the syntax element 2 in the left neighboring block.

With reference to the seventh aspect, in a possible implementation, if the quantity of context models in the preset context model set is 2, a value of the context index of the syntax element 1 in the current block is a result obtained by performing an OR operation on a value obtained by performing an OR operation on the syntax element 1 and the syntax element 2 in the upper neighboring block and a value obtained by performing an OR operation on the syntax element 1 and the syntax element 2 in the left neighboring block, or a value of the context index of the syntax element 2 in the current block is a result obtained by performing an OR operation on a value obtained by performing an OR operation on the syntax element 1 and the syntax element 2 in the upper neighboring block and a value obtained by performing an OR operation on the syntax element 1 and the syntax element 2 in the left neighboring block.

With reference to the sixth aspect or the seventh aspect, in a possible implementation, the syntax element 1 in the current block is affine_merge_flag, and is used to indicate whether an affine motion model-based merge mode is used for the current block, or the syntax element 2 in the current block is affine_inter_flag, and is used to indicate whether an affine motion model-based AMVP mode is used for the current block when a slice in which the current block is located is a P-type slice or a B-type slice, or the syntax element 1 in the current block is subblock_merge_flag, and is used to indicate whether a subblock-based merge mode is used for the current block, or the syntax element 2 in the current block is affine_inter_flag, and is used to indicate whether an affine motion model-based AMVP mode is used for the current block when a slice in which the current block is located is a P-type slice or a B-type slice.

According to an eighth aspect, a video decoder is provided, including an entropy decoding unit, configured to parse a received bitstream to obtain a to-be-entropy-decoded syntax element in a current block, where the to-be-entropy-decoded syntax element in the current block includes a syntax element 3 in the current block or a syntax element 4 in the current block, obtain a context model corresponding to the to-be-entropy-decoded syntax element, where a context model corresponding to the syntax element 3 in the current block is determined from a preset context model set, or a context model corresponding to the syntax element 4 in the current block is determined from the preset context model set, and perform entropy decoding on the to-be-entropy-decoded syntax element based on the context model corresponding to the to-be-entropy-decoded syntax element in the current block, a prediction processing unit, configured to perform prediction processing on the current block based on a syntax element that is in the current block and that is obtained through entropy decoding, to obtain a prediction block of the current block, and a reconstruction unit, configured to obtain a reconstructed image of the current block based on the prediction block of the current block.

With reference to the eighth aspect, in a possible implementation, the preset context model set includes five context models.

With reference to the eighth aspect, in a possible implementation, the syntax element 3 in the current block is merge_idx, and is used to indicate an index value of a merge candidate list of the current block, or the syntax element 4 in the current block is affine_merge_idx, and is used to indicate an index value of an affine merge candidate list of the current block, or the syntax element 3 in the current block is merge_idx, and is used to indicate an index value of a merge candidate list of the current block, or the syntax element 4 in the current block is subblock_merge_idx, and is used to indicate an index value of a subblock merge candidate list.

According to a ninth aspect, an encoding method is provided, including obtaining a to-be-entropy-encoded syntax element in a current block, where the to-be-entropy-encoded syntax element in the current block includes a syntax element 1 in the current block or a syntax element 2 in the current block, performing entropy encoding on the to-be-entropy-encoded syntax element in the current block, where when entropy encoding is performed on the to-be-entropy-encoded syntax element in the current block, entropy encoding on the syntax element 1 in the current block is completed by using a preset context model, or entropy encoding on the syntax element 2 in the current block is completed by using the context model, and outputting a bitstream including a syntax element that is in the current block and that is obtained through entropy encoding.

For a specific syntax element and a specific context model, refer to the first aspect.

According to a tenth aspect, an encoding method is provided, including obtaining a to-be-entropy-encoded syntax element in a current block, where the to-be-entropy-encoded syntax element in the current block includes a syntax element 1 in the current block or a syntax element 2 in the current block, obtaining a context model corresponding to the to-be-entropy-encoded syntax element, where a context model corresponding to the syntax element 1 in the current block is determined from a preset context model set, or a context model corresponding to the syntax element 2 in the current block is determined from the preset context model set, performing entropy encoding on the to-be-entropy-encoded syntax element based on the context model corresponding to the to-be-entropy-encoded syntax element in the current block, and outputting a bitstream including a syntax element that is in the current block and that is obtained through entropy encoding.

For a specific syntax element and a specific context model, refer to the second aspect.

According to an eleventh aspect, an encoding method is provided, including obtaining a to-be-entropy-encoded syntax element in a current block, where the to-be-entropy-encoded syntax element in the current block includes a syntax element 3 in the current block or a syntax element 4 in the current block, obtaining a context model corresponding to the to-be-entropy-decoded syntax element, where a context model corresponding to the syntax element 3 in the current block is determined from a preset context model set, or a context model corresponding to the syntax element 4 in the current block is determined from the preset context model set, performing entropy encoding on the to-be-entropy-encoded syntax element based on the context model corresponding to the to-be-entropy-encoded syntax element in the current block, and outputting a bitstream including a syntax element that is in the current block and that is obtained through entropy encoding.

For a specific syntax element and a specific context model, refer to the third aspect.

According to a twelfth aspect, a video encoder is provided, including an entropy encoding unit, configured to obtain a to-be-entropy-encoded syntax element in a current block, where the to-be-entropy-encoded syntax element in the current block includes a syntax element 1 in the current block or a syntax element 2 in the current block, and perform entropy encoding on the to-be-entropy-encoded syntax element in the current block, where when entropy encoding is performed on the to-be-entropy-encoded syntax element in the current block, entropy encoding on the syntax element 1 in the current block is completed by using a preset context model, or entropy encoding on the syntax element 2 in the current block is completed by using the context model, and an output, configured to output a bitstream including a syntax element that is in the current block and that is obtained through entropy encoding.

For a specific syntax element and a specific context model, refer to the fourth aspect.

According to a thirteenth aspect, a video encoder is provided, including an entropy encoding unit, configured to obtain a to-be-entropy-encoded syntax element in a current block, where the to-be-entropy-encoded syntax element in the current block includes a syntax element 1 in the current block or a syntax element 2 in the current block, obtain a context model corresponding to the to-be-entropy-encoded syntax element, where a context model corresponding to the syntax element 1 in the current block is determined from a preset context model set, or a context model corresponding to the syntax element 2 in the current block is determined from the preset context model set, and perform entropy encoding on the to-be-entropy-encoded syntax element based on the context model corresponding to the to-be-entropy-encoded syntax element in the current block, and an output, configured to output a bitstream including a syntax element that is in the current block and that is obtained through entropy encoding.

For a specific syntax element and a specific context model, refer to the fifth aspect.

According to a fourteenth aspect, a video encoder is provided, including an entropy encoding unit, configured to obtain a to-be-entropy-encoded syntax element in a current block, where the to-be-entropy-encoded syntax element in the current block includes a syntax element 3 in the current block or a syntax element 4 in the current block, obtain a context model corresponding to the to-be-entropy-decoded syntax element, where a context model corresponding to the syntax element 3 in the current block is determined from a preset context model set, or a context model corresponding to the syntax element 4 in the current block is determined from the preset context model set, and perform entropy encoding on the to-be-entropy-encoded syntax element based on the context model corresponding to the to-be-entropy-encoded syntax element in the current block, and an output, configured to output a bitstream including a syntax element that is in the current block and that is obtained through entropy encoding.

For a specific syntax element and a specific context model, refer to the sixth aspect.

According to a fifteenth aspect, the present disclosure relates to an apparatus for decoding a video stream, including a processor and a memory. The memory stores an instruction, and the instruction enables the processor to perform the method in the first aspect, the second aspect, the third aspect, or the fourth aspect, or any possible implementation thereof.

According to a sixteenth aspect, the present disclosure relates to an apparatus for decoding a video stream, including a processor and a memory. The memory stores an instruction, and the instruction enables the processor to perform the method in the seventh aspect, the eighth aspect, or the ninth aspect, or any possible implementation thereof.

According to a seventeenth aspect, a computer readable storage medium is proposed. The computer readable storage medium stores an instruction, and when the instruction is executed, one or more processors are enabled to encode video data. The instruction enables the one or more processors to perform the method in the first aspect, the second aspect, the third aspect, the fourth aspect, the seventh aspect, the eighth aspect, or the ninth aspect, or any possible implementation thereof.

According to an eighteenth aspect, the present disclosure relates to a computer program including program code. When the program code is run on a computer, the method in the first aspect, the second aspect, the third aspect, the fourth aspect, the seventh aspect, the eighth aspect, or the ninth aspect, or any possible implementation thereof is performed.

Details of one or more embodiments are described in accompanying drawings and the following descriptions. Other features, objects, and advantages will be apparent from the description, drawings, and claims.

BRIEF DESCRIPTION OF DRAWINGS

To describe the technical solutions in the embodiments of this application or in the background more clearly, the following briefly describes the accompanying drawings required for describing the embodiments of this application or the background.

Figure 1:
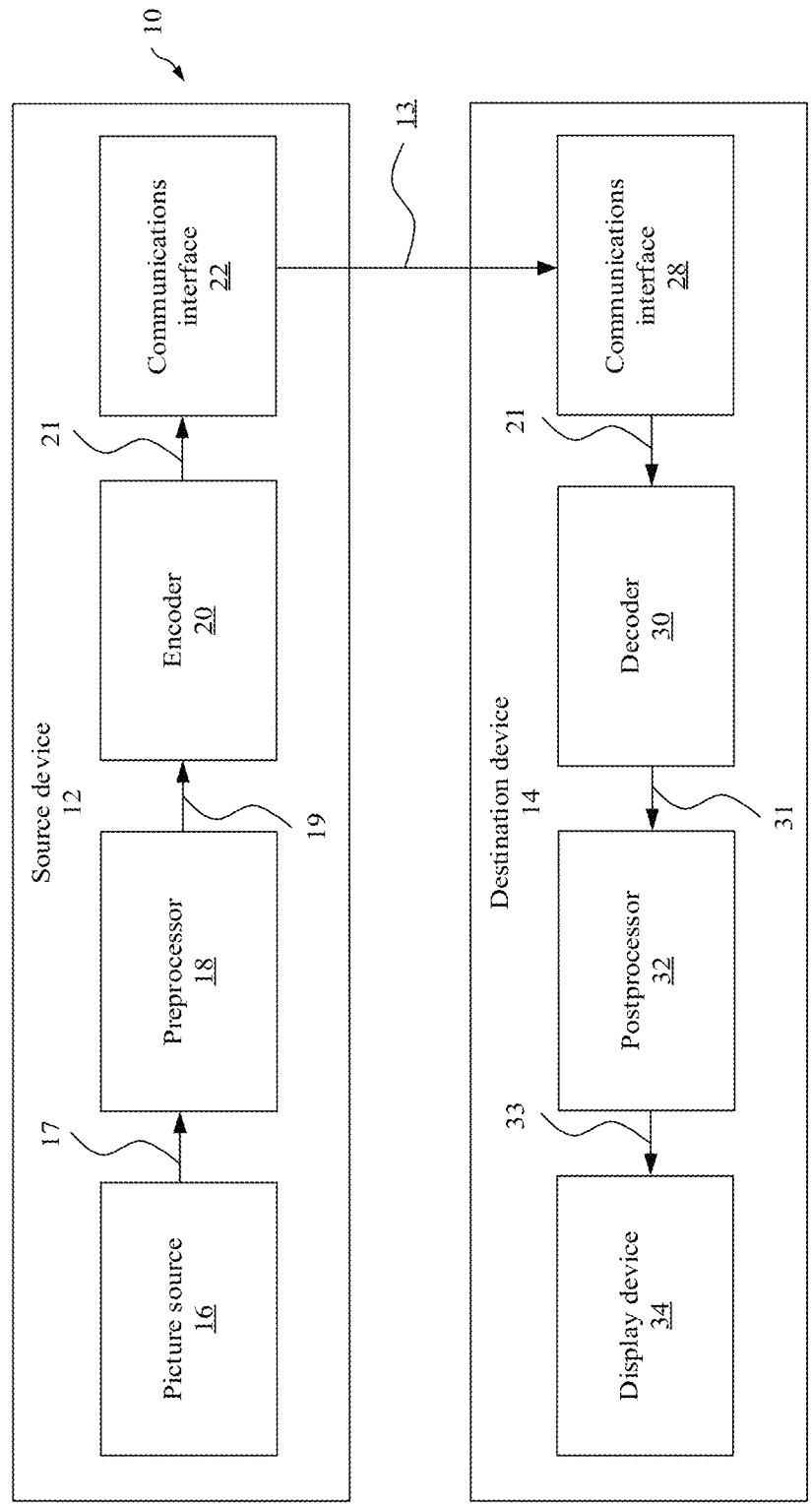
FIG. 1 is a block diagram of an example of a video encoding system for implementing an embodiment of the present disclosure.

In the following, identical reference signs represent identical or at least functionally equivalent features unless otherwise specified.

DESCRIPTION OF EMBODIMENTS

In the following description, reference is made to the accompanying drawings that form a part of this disclosure and show, by way of illustration, specific aspects of the embodiments of the present disclosure or specific aspects in which the embodiments of the present disclosure may be used. It should be understood that the embodiments of the present disclosure may be used in other aspects, and may include structural or logical changes not depicted in the accompanying drawings. Therefore, the following detailed description shall not be construed as a limitation, and the scope of the present disclosure is defined by the appended claims.

For example, it should be understood that disclosed content with reference to a described method may also be applied to a corresponding device or system configured to perform the method, and vice versa. For example, if one or more specific method steps are described, a corresponding device may include one or more units such as function units for performing the described one or more method steps (for example, one unit performing the one or more steps, or a plurality of units, each of which performs one or more of the plurality of steps), even if such one or more units are not explicitly described or illustrated in the accompanying drawings. In addition, for example, if a specific apparatus is described based on one or more units such as function units, a corresponding method may include one step for performing functionality of the one or more units (for example, one step for performing functionality of the one or more units, or a plurality of steps, each of which is used to perform functionality of one or more of the plurality of units), even if such one or more steps are not explicitly described or illustrated in the accompanying drawings. Further, it should be understood that features of the various example embodiments and/or aspects described in this specification may be combined with each other, unless specifically noted otherwise.

Video coding is usually processing a sequence of pictures that form a video or a video sequence. In the field of video coding, the terms "picture (picture)", "frame (frame)", and "image (image)" may be used as synonyms. Video coding used in this application (or this disclosure) indicates video encoding or video decoding. Video encoding is performed on a source side, and usually includes processing (for example, through compression) an original video picture to reduce an amount of data required for representing the video picture (for more efficient storage and/or transmission). Video decoding is performed on a destination side, and usually includes inverse processing relative to an encoder to reconstruct a video picture. "Coding" of a video picture (or generally referred to as a picture, which is explained below) in the embodiments should be understood as "encoding" or "decoding" related to a video sequence. A combination of encoding and decoding is also referred to as coding (encoding and decoding).

In a case of lossless video coding, an original video picture can be reconstructed, that is, a reconstructed video picture has same quality as the original video picture (assuming that no transmission loss or other data loss occurs during storage or transmission). In a case of lossy video coding, further compression is performed through quantization and the like, to reduce an amount of data required for representing a video picture, and a video picture cannot be completely reconstructed on a decoder side, that is, quality of a reconstructed video picture is poorer than that of the original video picture.

Several H.261 video coding standards relate to "lossy hybrid video coding" (that is, spatial and temporal prediction in a sample domain is combined with two-dimensional (2D) transform coding for applying quantization in a transform domain). Each picture in a video sequence is usually partitioned into a set of non-overlapping blocks, and coding is usually performed at a block level. To be specific, on an encoder side, a video is usually processed, that is, encoded, at a block (video block) level. For example, a prediction block is generated through spatial (intra-picture) prediction and temporal (inter-picture) prediction, the prediction block is subtracted from a current block (a block currently being processed or to be processed) to obtain a residual block, and the residual block is transformed in the transform domain and quantized to reduce an amount of data that is to be transmitted (compressed). On a decoder side, inverse processing relative to the encoder is applied to the encoded or compressed block to reconstruct the current block for representation. In addition, the encoder duplicates a processing loop of the decoder, so that the encoder and the decoder generate same prediction (for example, intra prediction and inter prediction) and/or reconstruction for processing, that is, encoding a subsequent block.

As used in this specification, the term "block" may be a part of a picture or a frame. For ease of description, refer to Versatile Video Coding (VVC) or HEVC developed by the Joint Collaboration Team on Video Coding (JCT-VC) of the ITU-T Video Coding Experts Group (VCEG) and the International Organization for Standardization (ISO)/International Electrotechnical Commission (IEC) MPEG, to describe the embodiments of the present disclosure. A person of ordinary skill in the art understands that the embodiments of the present disclosure are not limited to HEVC or VVC, and the block may be a coding unit (CU), a prediction unit (PU), or a transform unit (TU). In HEVC, a coding tree unit (CTU) is split into a plurality of CUs by using a quadtree structure denoted as a coding tree. It is determined whether a picture region is coded through inter-picture (temporal) or intra-picture (spatial) prediction at a CU level. Each CU may be further split into one, two, or four PUs based on a PU splitting type. A same prediction process is applied within one PU, and related information is transmitted to a decoder based on the PU. After obtaining a residual block by applying the prediction process based on the PU splitting type, the CU may be partitioned into a TU based on another quadtree structure similar to the coding tree used for the CU. In the latest development of video compression technologies, a frame is partitioned through quadtree plus binary tree (QTBT) to partition a coding block. In a QTBT block structure, a CU may be square or rectangular. In VVC, a CTU is first partitioned by using a quadtree structure, and a quadtree leaf node is further partitioned by using a binary tree structure. A binary tree leaf node is referred to as a CU, and the partitioning is used for prediction and transformation processing without any other partitioning. This means that the CU, the PU, and the TU have a same block size in the QTBT coding block structure. In addition, multiply partitioning is used together with the QTBT block structure, for example, triple tree partitioning.

Figure 10:
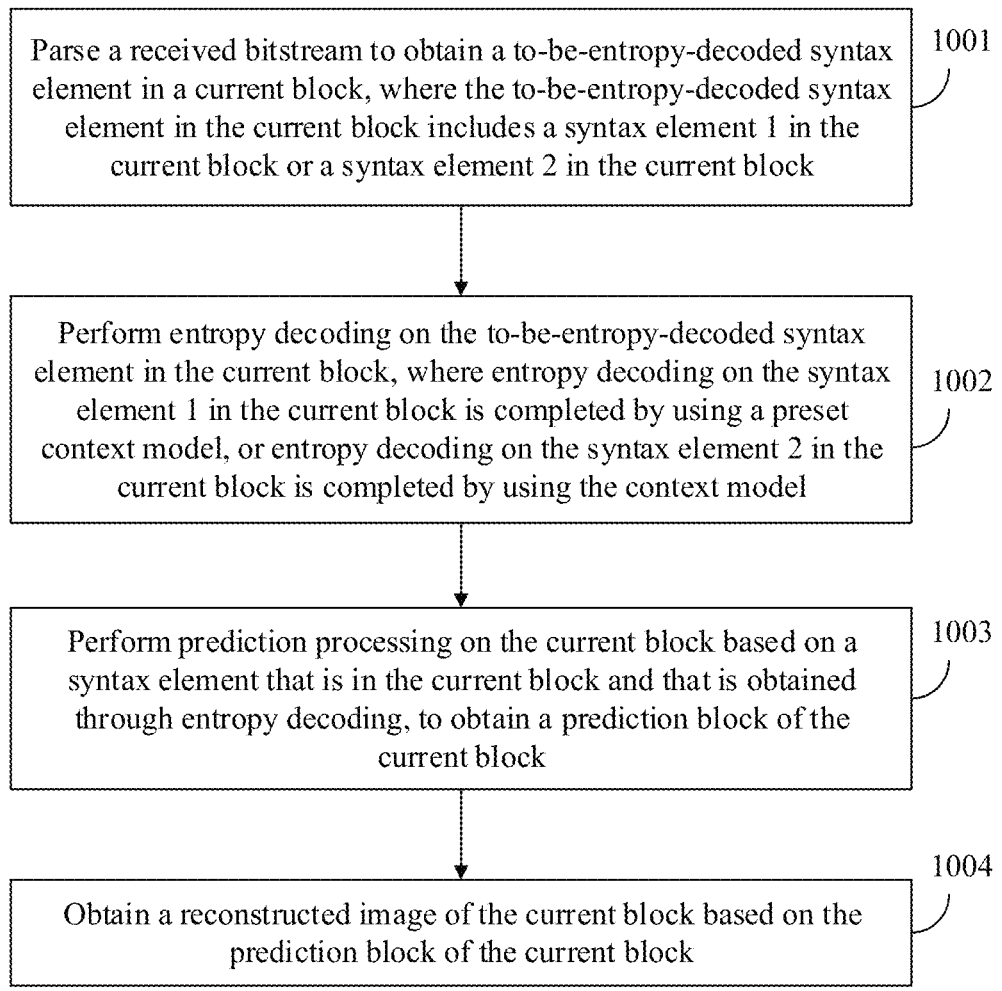
FIG. 10 is a flowchart illustrating a video decoding method according to an embodiment.

The following describes embodiments of an encoder 20, a decoder 30, an encoding system 10, and a decoding system 40 based on FIG. 1 to FIG. 4 (before the embodiments of the present disclosure are described in more detail based on FIG. 10).

FIG. 1 is a conceptual or schematic block diagram illustrating an example encoding system 10, for example, a video encoding system 10 that may use the technology of this application (this disclosure). An encoder 20 (for example, a video encoder 20) and a decoder 30 (for example, a video decoder 30) in the video encoding system 10 represent device examples that may be configured to perform technologies for partitioning and/or intra prediction according to various examples described in this application. As shown in FIG. 1, the encoding system 10 includes a source device 12 configured to provide encoded data 13 such as an encoded picture 13 to a destination device 14 for decoding the encoded data 13, or the like.

The source device 12 includes the encoder 20, and additionally or optionally, may include a picture source 16, for example, a preprocessing unit 18 such as a picture preprocessing unit 18, and a communications interface or communications unit 22.

The picture source 16 may include or may be any type of picture capturing device configured to capture a real-world picture and the like, and/or any type of device for generating a picture or comment (for screen content encoding, some text on a screen is also considered as a part of a to-be-encoded picture or image), for example, a computer graphics processing unit configured to generate a computer animation picture, or any type of device configured to obtain and/or provide a real-world picture or a computer animation picture (for example, screen content or a virtual reality (VR) picture), and/or any combination thereof (for example, an augmented reality (AR) picture).

A (digital) picture is or may be considered as a two-dimensional array or matrix of samples with luminance values. The sample in the array may also be referred to as a picture element (pixel) or a pel. A quantity of samples in horizontal and vertical directions (or axes) of the array or the picture defines a size and/or a resolution of the picture. For representation of color, three color components are usually used, that is, the picture may be represented as or include three sample arrays. In red-blue-green (RBG) format or color space, a picture includes corresponding red, green and blue sample arrays. However, in video coding, each sample is usually represented in a luminance/chrominance format or color space, for example, a picture in luma-chrominance-chroma (YCbCr) format includes a luminance component indicated by Y (sometimes indicated by L) and two chrominance components indicated by Cb and Cr. The luminance (luma) component Y indicates luminance or gray level intensity (for example, the two are the same in a gray-scale picture), and the two chrominance (chroma) components Cb and Cr represent chrominance or color information components. Accordingly, the picture in YCbCr format includes a luminance sample array of luminance sample values (Y), and two chrominance sample arrays of chrominance values (Cb and Cr). A picture in RGB format may be converted or transformed into a picture in YCbCr format, and vice versa. This process is also referred to as color transformation or conversion. If a picture is monochrome, the picture may include only a luminance sample array.

The picture source 16 (for example, a video source 16) may be, for example, a camera configured to capture a picture, for example, a memory such as a picture memory, which includes or stores a previously captured or generated picture, and/or any type of (internal or external) interface for obtaining or receiving a picture. The camera may be, for example, a local camera or an integrated camera integrated into the source device, and the memory may be a local memory or an integrated memory integrated into the source device. The interface may be, for example, an external interface for receiving a picture from an external video source. The external video source is, for example, an external picture capturing device such as a camera, an external memory, or an external picture generation device. The external picture generation device is, for example, an external computer graphics processing unit, a computer, or a server. The interface may be any type of interface according to any proprietary or standardized interface protocol, for example, a wired or wireless interface or an optical interface. The interface for obtaining picture data 17 may be an interface the same as the communications interface 22, or may be a part of the communications interface 22.

Different from the preprocessing unit 18 and processing performed by the preprocessing unit 18, the picture 17 or the picture data 17 (for example, video data 16) may also be referred to as an original picture 17 or original picture data 17.

The preprocessing unit 18 is configured to receive the (original) picture data 17 and perform preprocessing on the picture data 17, to obtain a preprocessed picture 19 or preprocessed picture data 19. For example, the preprocessing performed by the preprocessing unit 18 may include trimming, color format conversion (for example, from RGB to YCbCr), color correction, or noise reduction. It may be understood that the preprocessing unit 18 may be an optional component.

The encoder 20 (for example, the video encoder 20) is configured to receive the preprocessed picture data 19 and provide encoded picture data 21 (details are further described below, for example, based on FIG. 2 or FIG. 4). In an example, the encoder 20 may be configured to encode a picture.

The communications interface 22 of the source device 12 may be configured to receive the encoded picture data 21 and transmit the encoded picture data 21 to another device, for example, the destination device 14 or any another device, for storage or direct reconstruction, or may be configured to process the encoded picture data 21 before correspondingly storing the encoded data 13 and/or transmitting the encoded data 13 to another device. Another device is, for example, the destination device 14 or any other device used for decoding or storage.

The destination device 14 includes the decoder 30 (for example, the video decoder 30), and additionally or optionally, may include a communications interface or communications unit 28, a postprocessing unit 32, and a display device 34.

For example, the communications interface 28 of the destination device 14 is configured to directly receive the encoded picture data 21 or the encoded data 13 from the source device 12 or any other source. The any other source is, for example, a storage device, and the storage device is, for example, an encoded picture data storage device.

The communications interface 22 and the communications interface 28 may be configured to transmit or receive the encoded picture data 21 or the encoded data 13 over a direct communications link between the source device 12 and the destination device 14 or over any type of network. The direct communications link is, for example, a direct wired or wireless connection, and the any type of network is, for example, a wired or wireless network or any combination thereof, or any type of private network or public network or any combination thereof.

The communications interface 22 may be, for example, configured to encapsulate the encoded picture data 21 into a proper format such as a packet for transmission over a communications link or a communications network.

The communications interface 28 as a corresponding part of the communications interface 22 may be configured to decapsulate the encoded data 13 to obtain the encoded picture data 21, and the like.

Both the communications interface 22 and the communications interface 28 may be configured as unidirectional communications interfaces, for example, an arrow pointing from the source device 12 to the destination device 14 that are used for the encoded picture data 13 in FIG. 1, or may be configured as bidirectional communications interfaces, and may be, for example, configured to send and receive a message to establish a connection, and confirm and exchange any other information related to a communications link and/or data transmission such as encoded picture data transmission.

The decoder 30 is configured to receive the encoded picture data 21 and provide decoded picture data 31 or a decoded picture 31 (details are further described below, for example, based on FIG. 3 or FIG. 5).

The postprocessor 32 of the destination device 14 is configured to postprocess the decoded picture data 31 (also referred to as reconstructed picture data) such as the decoded picture 31, to obtain postprocessed picture data 33 such as a postprocessed picture 33. The postprocessing performed by the postprocessing unit 32 may include, for example, color format conversion (for example, from YCbCr to RGB), color correction, trimming, resampling, or any other processing to prepare the decoded picture data 31 for display by the display device 34.

The display device 34 of the destination device 14 is configured to receive the postprocessed picture data 33 to display the picture to a user, a viewer, or the like. The display device 34 may be or may include any type of display configured to present a reconstructed picture, for example, an integrated or external display or monitor. For example, the display may include a liquid-crystal display (LCD), an organic light-emitting diode (OLED) display, a plasma display, a projector, a micro-light-emitting diode (LED) display, a liquid crystal on silicon (LCoS) display, a digital light processor (DLP), or any other type of display.

Although FIG. 1 depicts the source device 12 and the destination device 14 as separate devices, device embodiments may also include both the source device 12 and the destination device 14 or both a function of the source device 12 and a function of the destination device 14, that is, the source device 12 or the corresponding function and the destination device 14 or the corresponding function. In such embodiments, the source device 12 or the corresponding function and the destination device 14 or the corresponding function may be implemented by using same hardware and/or software, separate hardware and/or software, or any combination thereof.

Based on the descriptions, a person skilled in the art easily understands that existence and (accurate) division of functions of different units or functions/a function of the source device 12 and/or the destination device 14 shown in FIG. 1 may vary with an actual device and application.

The encoder 20 (for example, the video encoder 20) and the decoder 30 (for example, the video decoder 30) each may be implemented as any one of various proper circuits, for example, one or more microprocessors, a digital signal processor (DSP), an application-specific integrated circuit (ASIC), a field-programmable gate array (FPGA), discrete logic, hardware, or any combination thereof. If the technology is partially implemented in software, the device may store a software instruction in a proper non-transitory computer readable storage medium, and may execute the instruction in hardware by using one or more processors to perform the technologies in this disclosure. Any of the foregoing content (including hardware, software, a combination of hardware and software, and the like) may be considered as one or more processors. The video encoder 20 and the video decoder 30 each may be included in one or more encoders or decoders, and any one of the encoders or the decoders may be integrated as a part of a combined encoder/decoder (a codec) in a corresponding device.

The source device 12 may be referred to as a video encoding device or a video encoding apparatus. The destination device 14 may be referred to as a video decoding device or a video decoding apparatus. The source device 12 and the destination device 14 each may be an example of a video encoding device or a video decoding apparatus.

The source device 12 and the destination device 14 each may include any one of various devices, including any type of handheld or stationary device, for example, a notebook or laptop computer, a mobile phone, a smartphone, a tablet or a tablet computer, a video camera, a desktop computer, a set-top box, a television, a display device, a digital media player, a video game console, a video streaming transmission device (such as a content service server or a content distribution server), a broadcast receiver device, or a broadcast transmitter device, and may use or may not use any type of operating system.

In some cases, the source device 12 and the destination device 14 may be equipped for wireless communication. Therefore, the source device 12 and the destination device 14 may be wireless communications devices.

In some cases, the video encoding system 10 shown in FIG. 1 is merely an example, and the technologies in this application may be applied to a video coding setting (for example, video encoding or video decoding) that does not need to include any data communication between an encoding device and a decoding device. In other examples, data may be retrieved from a local memory, streamed over a network, or the like. A video encoding device may encode data and store the data in a memory, and/or a video decoding device may retrieve the data from the memory and decode the data. In some examples, encoding and decoding are performed by devices that do not communicate with each other but only encode data to a memory and/or retrieve the data from the memory and decode the data.

It should be understood that, for each of the foregoing examples described with reference to the video encoder 20, the video decoder 30 may be configured to perform an inverse process. For a signaling syntax element, the video decoder 30 may be configured to receive and parse the syntax element and decode related video data accordingly. In some examples, the video encoder 20 may entropy-encode one or more syntax elements into an encoded video bitstream. In such examples, the video decoder 30 may parse such syntax elements and decode related video data accordingly.

Encoder & Encoding Method

Figure 2:
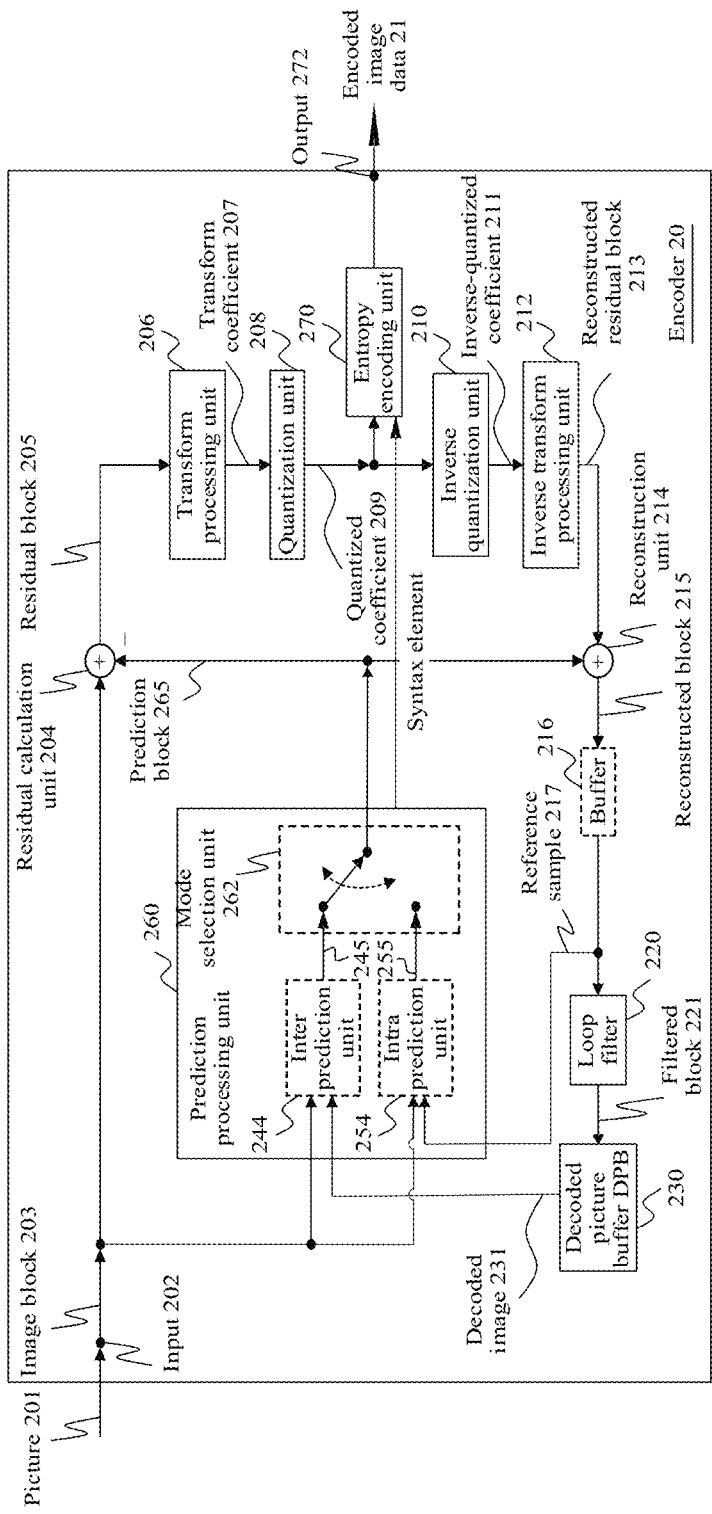
FIG. 2 is a block diagram illustrating an example structure of a video encoder for implementing an embodiment of the present disclosure.

FIG. 2 is a schematic/conceptual block diagram of an example of a video encoder 20 configured to implement the technologies in this application (disclosure). In the example in FIG. 2, the video encoder 20 includes a residual calculation unit 204, a transform processing unit 206, a quantization unit 208, an inverse quantization unit 210, an inverse transform processing unit 212, a reconstruction unit 214, a buffer 216, a loop filter unit 220, a decoded picture buffer (DPB) 230, a prediction processing unit 260, and an entropy encoding unit 270. The prediction processing unit 260 may include an inter prediction unit 244, an intra prediction unit 254, and a mode selection unit 262. The inter prediction unit 244 may include a motion estimation unit and a motion compensation unit (not shown in the figure). The video encoder 20 shown in FIG. 2 may also be referred to as a hybrid video encoder or a hybrid video codec-based video encoder.

For example, the residual calculation unit 204, the transform processing unit 206, the quantization unit 208, the prediction processing unit 260, and the entropy encoding unit 270 form a forward signal path of the encoder 20, and the inverse quantization unit 210, the inverse transform processing unit 212, the reconstruction unit 214, the buffer 216, the loop filter 220, the DPB 230, the prediction processing unit 260, and the like form a backward signal path of the encoder. The backward signal path of the encoder corresponds to a signal path of a decoder (referring to a decoder 30 in FIG. 3).

The encoder 20 receives a picture 201 or a block 203 of the picture 201 by using an input 202 or the like, for example, a picture in a sequence of pictures that form a video or a video sequence. The picture block 203 may also be referred to as a current picture block or a to-be-encoded picture block, and the picture 201 may be referred to as a current picture or a to-be-encoded picture (especially when the current picture is distinguished from another picture in video coding, other pictures, for example, in a same video sequence, also include previously encoded and/or decoded pictures in the video sequence of the current picture).

Partitioning

The embodiment of the encoder 20 may include a partitioning unit (not shown in FIG. 2), configured to partition the picture 201 into a plurality of non-overlapping blocks such as blocks 203. The partitioning unit may be configured to use a same block size for all pictures in the video sequence and a corresponding raster defining the block size, or may be configured to change a block size between pictures, subsets, or picture groups, and partition each picture into corresponding blocks.

In one example, the prediction processing unit 260 of the video encoder 20 may be configured to perform any combination of the foregoing partitioning technologies.

For example, in the picture 201, the block 203 is also or may be also considered as a two-dimensional array or matrix of samples with luminance values (sample values), although a size of the block 203 is smaller than that of the picture 201. In other words, the block 203 may include, for example, one sample array (for example, a luminance array in a case of a monochrome picture 201), three sample arrays (for example, one luminance array and two chrominance arrays in a case of a color picture), or any other quantity and/or type of arrays based on a used color format. A quantity of samples in horizontal and vertical directions (or axes) of the block 203 defines the size of block 203.

The encoder 20 shown in FIG. 2 is configured to encode the picture 201 block by block, for example, perform encoding and prediction on each block 203.

Residual Calculation

The residual calculation unit 204 is configured to calculate a residual block 205 based on the picture block 203 and a prediction block 265 (further details about the prediction block 265 are provided below), for example, obtain the residual block 205 in a sample domain by subtracting a sample value of the prediction block 265 from a sample value of the picture block 203 sample by sample (pixel by pixel).

Transform

The transform processing unit 206 is configured to apply transform such as discrete cosine transform (DCT) or discrete sine transform (DST) to a sample value of the residual block 205, to obtain a transform coefficient 207 in a transform domain. The transform coefficient 207 may also be referred to as a residual transform coefficient, and indicates the residual block 205 in the transform domain.

The transform processing unit 206 may be configured to apply integer approximation of DCT/DST, for example, transform specified in HEVC/H.265. This integer approximation is usually scaled proportionally by a factor compared with orthogonal DCT transform. To maintain the norm of a residual block obtained through forward transform and inverse transform, an additional scale factor is applied as a part of the transform process. The scale factor is usually selected based on some constraint conditions, for example, is a power of 2, a bit depth of a transform coefficient, or trade-off between accuracy and implementation costs that is used for a shift operation. For example, a specific scale factor is specified for inverse transform on a decoder 30 side by using the inverse transform processing unit 212 (and correspondingly, for inverse transform on an encoder 20 side by using the inverse transform processing unit 212 or the like), and correspondingly, a corresponding scale factor may be specified for forward transform on an encoder 20 side by using the transform processing unit 206.

Quantization

The quantization unit 208 is configured to quantize the transform coefficient 207 by applying scale quantization, vector quantization, or the like, to obtain a quantized transform coefficient 209. The quantized transform coefficient 209 may also be referred to as a quantized residual coefficient 209. The quantization process may reduce a bit depth related to some or all transform coefficients 207. For example, an n-bit transform coefficient may be rounded down to an m-bit transform coefficient during quantization, where n is greater than m. A quantization degree may be modified by adjusting a quantization parameter. For example, for scale quantization, different scales may be applied to achieve finer or coarser quantization. A smaller quantization step corresponds to finer quantization, and a larger quantization step corresponds to coarser quantization. A proper quantization step may be indicated by using a quantization parameter. For example, the quantization parameter may be an index of a predefined set of proper quantization steps. For example, a smaller quantization parameter may correspond to finer quantization (a smaller quantization step) and a larger quantization parameter may correspond to coarser quantization (a larger quantization step), and vice versa. The quantization may include division by a quantization step and corresponding quantization or inverse quantization performed by the inverse quantization unit 210 or the like, or may include multiplication by a quantization step. In embodiments according to some standards such as HEVC, a quantization parameter may be used to determine a quantization step. Generally, the quantization step may be calculated based on the quantization parameter through fixed point approximation of an equation including division. Additional scale factors may be introduced for quantization and inverse quantization, to restore the norm that is of a residual block and that may be modified because of a scale used in the fixed-point approximation of the equation used for the quantization step and the quantization parameter. In an example implementation, a scale of inverse transform may be combined with a scale of inverse quantization. Alternatively, a customized quantization table may be used and signaled from an encoder to a decoder, for example, in a bitstream. The quantization is a lossy operation, and a larger quantization step indicates a larger loss.

The inverse quantization unit 210 is configured to apply inverse quantization of the quantization unit 208 to a quantized coefficient to obtain an inverse-quantized coefficient 211, for example, apply, based on or by using a same quantization step as the quantization unit 208, an inverse quantization scheme of the quantization scheme applied by the quantization unit 208. The inverse-quantized coefficient 211 may also be referred to as an inverse-quantized residual coefficient 211, and correspond to the transform coefficient 207, although a loss caused by quantization is usually different from the transform coefficient.

The inverse transform processing unit 212 is configured to apply inverse transform of the transform applied by the transform processing unit 206, for example, inverse DCT or inverse DST, to obtain an inverse transform block 213 in a sample domain. The inverse transform block 213 may also be referred to as an inverse transform inverse-quantized block 213 or an inverse transform residual block 213.

The reconstruction unit 214 (for example, a summator 214) is configured to add the inverse transform block 213 (that is, a reconstructed residual block 213) to the prediction block 265 to obtain a reconstructed block 215 in the sample domain, for example, by adding a sample value of the reconstructed residual block 213 and a sample value of the prediction block 265.

Optionally, the buffer unit 216 (or the "buffer" 216) such as a line buffer 216 is configured to buffer or store the reconstructed block 215 and a corresponding sample value for intra prediction and the like. In other embodiments, an encoder may be configured to use an unfiltered reconstructed block and/or a corresponding sample value that are/is stored in the buffer unit 216 for any type of estimation and/or prediction such as intra prediction.

For example, the embodiment of the encoder 20 may be configured, so that the buffer unit 216 is not only configured to store the reconstructed block 215 for intra prediction, but also configured to store the filtered block 221 of the loop filter unit 220 (not shown in FIG. 2), and/or the buffer unit 216 and the DPB unit 230 form one buffer. Other embodiments may be used to use a filtered block 221 and/or a block or a sample from the DPB 230 (not shown in FIG. 2) as an input or a basis for intra prediction 254.

The loop filter unit 220 (or the "loop filter" 220) is configured to perform filtering on the reconstructed block 215 to obtain the filtered block 221, so as to smoothly perform sample transformation or improve video quality. The loop filter unit 220 is intended to represent one or more loop filters, for example, a deblocking filter, a sample-adaptive offset filter, or another filter such as a bilateral filter, an adaptive loop filter, a sharpening or smoothing filter, or a cooperative filter. Although the loop filter unit 220 is shown in FIG. 2 as an in-loop filter, the loop filter unit 220 may be implemented as a post-loop filter in other configurations. The filtered block 221 may also be referred to as a filtered reconstructed block 221. The DPB 230 may store the reconstructed coding block after the loop filter unit 220 performs a filtering operation on the reconstructed coding block.

The embodiment of the encoder 20 (correspondingly, the loop filter unit 220) may be used to output a loop filter parameter (for example, sample adaptive offset information), for example, directly output a loop filter parameter or output a loop filter parameter after the entropy encoding unit 270 or any other entropy encoding unit performs entropy encoding, so that the decoder 30 can receive and apply a same loop filter parameter for decoding, and the like.

The DPB 230 may be a reference picture memory that stores reference picture data for the video encoder 20 to encode video data. The DPB 230 may be any one of a plurality of memories, for example, a dynamic random-access memory (DRAM) (including a synchronous DRAM (SDRAM)), a magneto-resistive random-access memory (MRAM), or a resistive random-access memory (RRAM)), or another type of memory. The DPB 230 and the buffer 216 may be provided by a same memory or separate memories. In an example, the DPB 230 is configured to store the filtered block 221. The DPB 230 may be further configured to store other previous filtered blocks such as previous reconstructed and filtered blocks 221 of a same current picture or different pictures such as previous reconstructed pictures, and may provide a complete previous reconstructed, that is, decoded picture (and a corresponding reference block and a corresponding sample) and/or a partially reconstructed current picture (and a corresponding reference block and a corresponding sample) for inter prediction and the like. In an example, if the reconstructed block 215 is reconstructed without in-loop filtering, the DPB 230 is configured to store the reconstructed block 215.

The prediction processing unit 260 is also referred to as a block prediction processing unit 260, and is configured to receive or obtain the block 203 (the current block 203 of the current picture 201) and reconstructed picture data, for example, a reference sample from a same (current) picture in the buffer 216 and/or reference picture data 231 from one or more previous decoded pictures in the DPB 230, and process such data for prediction, that is, provide a prediction block 265 that may be an inter prediction block 245 or an intra prediction block 255.

The mode selection unit 262 may be configured to select a prediction mode (for example, an intra or inter prediction mode) and/or a corresponding prediction block 245 or 255 as the prediction block 265, to calculate the residual block 205 and reconstruct the reconstructed block 215.

The embodiment of the mode selection unit 262 may be used to select a prediction mode (for example, from prediction modes supported by the prediction processing unit 260). The prediction mode provides a best match or a minimum residual (the minimum residual means better compression in transmission or storage), or provides minimum signaling overheads (the minimum signaling overheads mean better compression in transmission or storage), or considers or balances the two. The mode selection unit 262 may be configured to determine a prediction mode based on rate distortion optimization, that is, select a prediction mode that provides minimum rate distortion optimization, or select a prediction mode in which related rate distortion at least meets a prediction mode selection criterion.

The prediction processing (for example, by using the prediction processing unit 260) and the mode selection (for example, by using the mode selection unit 262) performed by an example of the encoder 20 are described in detail below.

As described above, the encoder 20 is configured to determine or select a best or optimal prediction mode from a (predetermined) prediction mode set. The prediction mode set may include, for example, an intra prediction mode and/or an inter prediction mode.

The intra prediction mode set may include 35 different intra prediction modes, for example, non-directional modes such as a direct coding (DC) (or mean) mode and a planar mode, or directional modes defined in H.265, or may include 67 different intra prediction modes, for example, non-directional mode such as a DC (or mean) mode and a planar mode, or developing directional modes defined in H.266.

A (possible) inter prediction mode set depends on an available reference picture (for example, at least a part of the decoded picture stored in the DBP 230) and other inter prediction parameters, for example, depends on whether the entire reference picture is used or only a part of the reference picture is used, for example, a search window region surrounding a region of a current block is searched for a best matched reference block, and/or depends on whether sample interpolation such as half-sample and/or quarter-sample interpolation is applied.

In addition to the foregoing prediction modes, a skip mode and/or a direct mode may also be applied.

The prediction processing unit 260 may be further configured to partition the block 203 into smaller block partitions or subblocks, for example, by iteratively using quadtree (QT) partitioning, binary-tree (BT) partitioning, tripletree or ternary-tree (TT) partitioning, or any combination thereof, and perform prediction and the like on each of the block partitions or the subblocks. The mode selection includes selecting a tree structure of the partitioned block 203 and selecting a prediction mode applied to each of the block partitions or the subblocks.

The inter prediction unit 244 may include a motion estimation unit (not shown in FIG. 2) and a motion compensation unit (not shown in FIG. 2). The motion estimation unit is configured to receive or obtain the picture block 203 (the current picture block 203 of the current picture 201) and the decoded picture 31, or at least one or more previous reconstructed blocks, for example, one or more other reconstructed blocks different from the previous decoded picture 31, to perform motion estimation. For example, a video sequence may include the current picture and the previous decoded picture 31. In other words, the current picture and the previous decoded picture 31 may be a part of a sequence of pictures that form the video sequence, or form the picture sequence.

For example, the encoder 20 may be configured to select a reference block from a plurality of reference blocks of a same picture or different pictures in a plurality of other pictures, and provide a reference picture (or a reference picture index) and/or an offset (a spatial offset) between a position (X-Y coordinates) of the reference block and a position of the current block as an inter prediction parameter to the motion estimation unit (not shown in FIG. 2). This offset is also referred to as a motion vector (MV).

The motion compensation unit is configured to obtain, for example, receive an inter prediction parameter, and perform inter prediction based on or by using the inter prediction parameter to obtain the inter prediction block 245. The motion compensation performed by the motion compensation unit (not shown in FIG. 2) may include fetching or generating the prediction block based on a motion/block vector determined through motion estimation (possibly performing interpolation on sub-sample precision). During interpolation filtering, an additional sample may be generated from known samples, thereby potentially increasing a quantity of candidate prediction blocks that may be used to encode a picture block. Once a motion vector used for a PU of a current picture block is received, the motion compensation unit 246 may locate a prediction block to which the motion vector points in a reference picture list. The motion compensation unit 246 may further generate a syntax element associated with a block and a video slice, so that the video decoder 30 uses the syntax element when decoding a picture block of the video slice.

The intra prediction unit 254 is configured to obtain, for example, receive a picture block 203 (a current picture block) of the same picture and one or more previous reconstructed blocks such as reconstructed neighboring blocks, to perform intra estimation. For example, the encoder 20 may be configured to select an intra prediction mode from a plurality of (predetermined) intra prediction modes.

The embodiment of the encoder 20 may be configured to select an intra prediction mode based on an optimization criterion, for example, based on a minimum residual (for example, an intra prediction mode providing the prediction block 255 that is most similar to the current picture block 203) or minimum rate distortion.

The intra prediction unit 254 is further configured to determine the intra prediction block 255 based on an intra prediction parameter of the selected intra prediction mode. In any case, after selecting the intra prediction mode used for a block, the intra prediction unit 254 is further configured to provide the intra prediction parameter to the entropy encoding unit 270, that is, provide information for indicating the selected intra prediction mode used for a block. In an example, the intra prediction unit 254 may be configured to perform any combination of the following intra prediction technologies.

The entropy encoding unit 270 is configured to apply an entropy encoding algorithm or scheme (for example, a variable length coding (VLC) scheme, a context adaptive VLC (CAVLC) scheme, an arithmetic coding scheme, a context adaptive binary arithmetic coding (CABAC) scheme, a syntax-based context-adaptive binary arithmetic coding (SBAC) scheme, a probability interval partitioning entropy (PIPE) coding scheme, or another entropy encoding method or technology) to one or more (or none) of the quantized residual coefficient 209, the inter prediction parameter, the intra prediction parameter, and/or the loop filter parameter, to obtain the encoded picture data 21 that can be output by using an output 272, for example, in a form of an encoded bitstream. The encoded bitstream may be transmitted to the video decoder 30, or may be archived for later transmission or retrieval by the video decoder 30. The entropy encoding unit 270 may be further configured to perform entropy encoding on another syntax element of the current video slice that is being encoded.

Another structural variant of the video encoder 20 may be configured to encode a video stream. For example, the non-transform-based encoder 20 may directly quantize a residual signal without the transform processing unit 206 for some blocks or frames. In another implementation, the encoder 20 may have the quantization unit 208 and the inverse quantization unit 210 that are combined into one unit.

Figure 3:
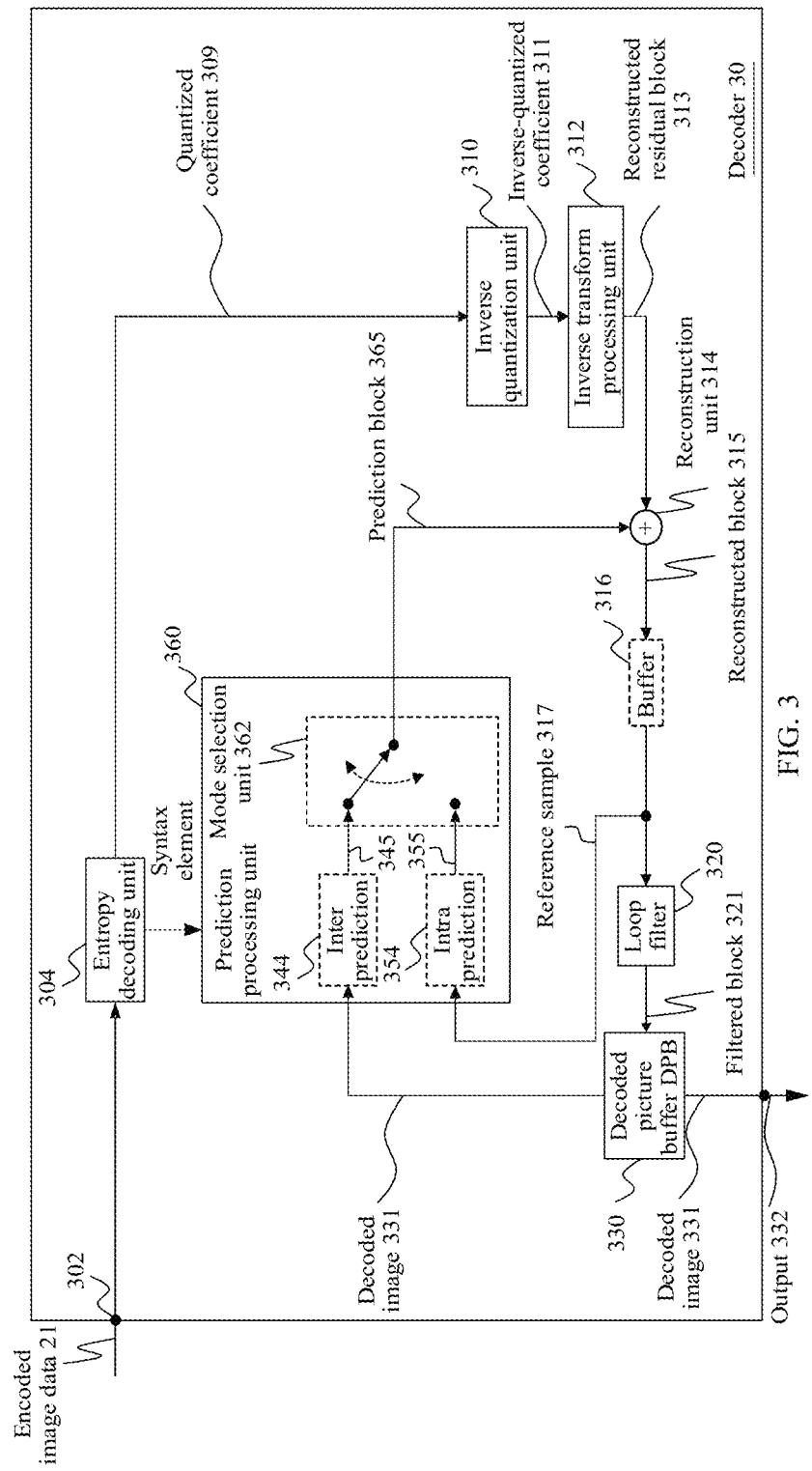
FIG. 3 is a block diagram illustrating an example structure of a video decoder for implementing an embodiment of the present disclosure.

FIG. 3 shows an example of a video decoder 30, configured to implement the technologies in this application. The video decoder 30 is configured to receive encoded picture data (for example, an encoded bitstream) 21 encoded by the encoder 20 or the like, to obtain a decoded picture 31. In a decoding process, the video decoder 30 receives video data from the video encoder 20, for example, an encoded video bitstream that indicates a picture block of an encoded video slice and an associated syntax element.

In the example of FIG. 3, the decoder 30 includes an entropy decoding unit 304, an inverse quantization unit 310, an inverse transform processing unit 312, a reconstruction unit 314 (for example, a summator 314), a buffer 316, a loop filter 320, a DPB 330, and a prediction processing unit 360. The prediction processing unit 360 may include an inter prediction unit 344, an intra prediction unit 354, and a mode selection unit 362. In some examples, the video decoder 30 may perform decoding traversal generally inverse to the encoding traversal described with reference to the video encoder 20 in FIG. 2.

The entropy decoding unit 304 is configured to perform entropy decoding on the encoded picture data 21, to obtain a quantized coefficient 309, a decoded coding parameter (not shown in FIG. 3), and/or the like, for example, any one or all of an inter prediction parameter, an intra prediction parameter, a loop filter parameter, and/or another syntax element (decoded). The entropy decoding unit 304 is further configured to forward the inter prediction parameter, the intra prediction parameter, and/or another syntax element to the prediction processing unit 360. The video decoder 30 may receive a syntax element at a video slice level and/or a syntax element at a video block level.

The inverse quantization unit 310 may have a same function as the inverse quantization unit 110, the inverse transform processing unit 312 may have a same function as the inverse transform processing unit 212, the reconstruction unit 314 may have a same function as the reconstruction unit 214, the buffer 316 may have a same function same as the buffer 216, the loop filter 320 may have a same function as the loop filter 220, and the DPB 330 may have a same function as the DPB 230.

The prediction processing unit 360 may include the inter prediction unit 344 and the intra prediction unit 354. The inter prediction unit 344 may have a function similar to that of the inter prediction unit 244, and the intra prediction unit 354 may have a function similar to that of the intra prediction unit 254. The prediction processing unit 360 is usually configured to perform block prediction and/or obtain a prediction block 365 from the encoded data 21, and receive or obtain (explicitly or implicitly) a prediction-related parameter and/or information about a selected prediction mode, for example, from the entropy decoding unit 304.

When a video slice is encoded as an intra-encoded (I) slice, the intra prediction unit 354 of the prediction processing unit 360 is configured to generate the prediction block 365 used for a picture block of the current video slice based on a signaled intra prediction mode and data from a previous decoded block of a current frame or picture. When a video frame is encoded as an inter-coded (that is, B or P) slice, the inter prediction unit 344 (for example, a motion compensation unit) of the prediction processing unit 360 is configured to generate the prediction block 365 used for a video block of the current video slice based on a motion vector and another syntax element received from the entropy decoding unit 304. For inter prediction, a prediction block may be generated from one of reference pictures in one reference picture list. The video decoder 30 may construct reference frame lists a list 0 and a list 1 by using a default construction technology based on a reference picture stored in the DPB 330.

The prediction processing unit 360 is configured to determine prediction information used for the video block of the current video slice by parsing the motion vector and another syntax element, and use the prediction information to generate the prediction block used for the current video block that is being decoded. For example, the prediction processing unit 360 determines, by using some received syntax elements, a prediction mode (for example, intra or inter prediction) used to encode a video block of a video slice, an inter prediction slice type (for example, a bi-directional predicted (B) slice, a predicted (P) slice, or a generalized P/B (GPB) slice), construction information of one or more of pictures in a reference picture list used for a slice, a motion vector of each inter-encoded video block used for a slice, an inter prediction state of each inter-encoded video block used for a slice, and other information, to decode the video block of the current video slice.

The inverse quantization unit 310 may be configured to perform inverse quantization (that is, dequantization) on a quantized transform coefficient provided in the bitstream and decoded by the entropy decoding unit 304. The inverse quantization process may include using a quantization parameter calculated by the video encoder 20 for each video block in the video slice, to determine a quantization degree that should be applied and determine an inverse quantization degree that should be applied.

The inverse transform processing unit 312 is configured to apply inverse transform (for example, inverse DCT, inverse integer transform, or a conceptually similar inverse transform process) to the transform coefficient, to generate a residual block in a sample domain.

The reconstruction unit 314 (for example, the summator 314) is configured to add an inverse transform block 313 (that is, a reconstructed residual block 313) to the prediction block 365, to obtain a reconstructed block 315 in a sample domain, for example, by adding a sample value of the reconstructed residual block 313 to a sample value of the prediction block 365.

The loop filter unit 320 (in an encoding loop or after an encoding loop) is configured to filter the reconstructed block 315 to obtain a filtered block 321, so as to smoothly perform sample transformation or improve video quality. In an example, the loop filter unit 320 may be configured to perform any combination of the following filtering technologies. The loop filter unit 320 is intended to represent one or more loop filters, for example, a deblocking filter, a sample-adaptive offset filter, or another filter such as a bilateral filter, an adaptive loop filter, a sharpening or smoothing filter, or a collaborative filter. Although the loop filter unit 320 is shown in FIG. 3 as an in-loop filter, the loop filter unit 320 may be implemented as a post-loop filter in other configurations.

The filtered block 321 in a given frame or picture is then stored in the DPB 330 that stores a reference picture used for subsequent motion compensation.

The decoder 30 is configured to output the decoded picture 31 by using an output 332, and the like, to present the decoded picture 31 to the user or provide the decoded picture 31 for the user to view.

Another variation of the video decoder 30 may be configured to decode a compressed bitstream. For example, the decoder 30 may generate an output video stream without the loop filter unit 320. For example, the non-transform-based decoder 30 may directly dequantize a residual signal without the inverse transform processing unit 312 for some blocks or frames. In another implementation, the video decoder 30 may have the inverse quantization unit 310 and the inverse transform processing unit 312 that are combined into one unit.

Figure 4:
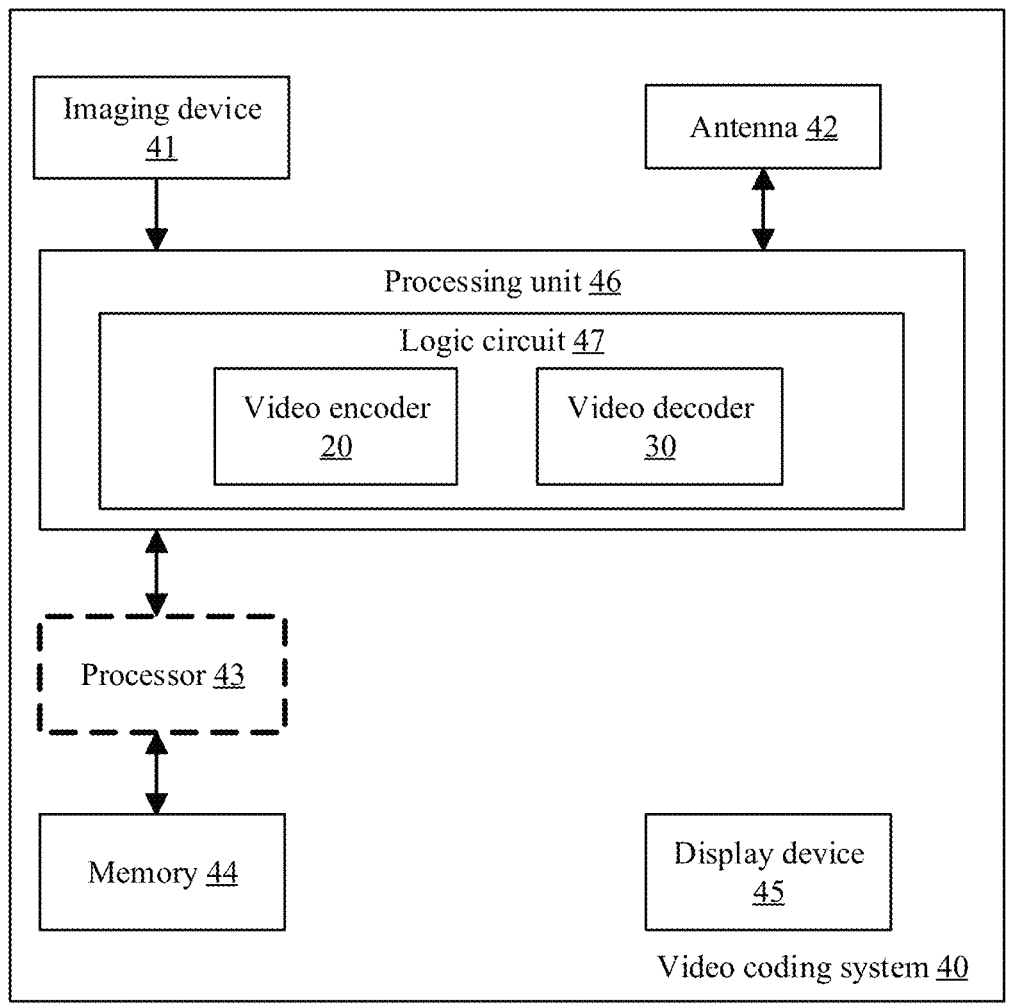
FIG. 4 is a diagram illustrating a video coding system including an encoder 20 in FIG. 2 and a decoder 30 in FIG. 3.

FIG. 4 is a diagram illustrating an example of a video coding system 40 including the encoder 20 in FIG. 2 and/or the decoder 30 in FIG. 3 according to an example embodiment. The system 40 may implement a combination of various technologies of this application. In the illustrated implementation, the video coding system 40 may include an imaging device 41, the video encoder 20, the video decoder 30 (and/or a video decoder implemented by a logic circuit 47 of a processing unit 46), an antenna 42, one or more processors 43, one or more memories 44, and/or a display device 45.

As shown in the figure, the imaging device 41, the antenna 42, the processing unit 46, the logic circuit 47, the video encoder 20, the video decoder 30, the processor 43, the memory 44, and/or the display device 45 can communicate with each other. As described, although the video coding system 40 is illustrated with both the video encoder 20 and the video decoder 30, in different examples, the video coding system 40 may include only the video encoder 20 or only the video decoder 30.

In some examples, as shown in the figure, the video coding system 40 may include the antenna 42. For example, the antenna 42 may be configured to transmit or receive an encoded bitstream of video data. In addition, in some examples, the video coding system 40 may include the display device 45. The display device 45 may be configured to present the video data. In some examples, as shown in the figure, the logic circuit 47 may be implemented by the processing unit 46. The processing unit 46 may include ASIC logic, a graphics processing unit, a general-purpose processor, or the like. The video coding system 40 may also include the optional processor 43. The optional processor 43 may similarly include ASIC logic, a graphics processing unit, a general-purpose processor, or the like. In some examples, the logic circuit 47 may be implemented by hardware such as video encoding dedicated hardware, and the processor 43 may be implemented by universal software, an operating system, or the like. In addition, the memory 44 may be any type of memory, for example, a volatile memory (for example, a static random-access memory (SRAM) or a DRAM) or a non-volatile memory (for example, a flash memory). In a non-limitative example, the memory 44 may be implemented by a cache memory. In some examples, the logic circuit 47 may access the memory 44 (for example, to implement an image buffer). In other examples, the logic circuit 47 and/or the processing unit 46 may include a memory (for example, a cache) to implement an image buffer or the like.

In some examples, the video encoder 20 implemented by the logic circuit may include an image buffer (for example, implemented by the processing unit 46 or the memory 44) and a graphics processing unit (for example, implemented by the processing unit 46). The graphics processing unit may be communicatively coupled to the image buffer. The graphics processing unit may include the video encoder 20 implemented by the logic circuit 47, to implement various modules that are described with reference to FIG. 2 and/or any other encoder system or subsystem described in this specification. The logic circuit may be configured to perform various operations described in this specification.

The video decoder 30 may be similarly implemented by the logic circuit 47, to implement various modules that are described with reference to the decoder 30 in FIG. 3 and/or any other decoder system or subsystem described in this specification. In some examples, the video decoder 30 implemented by the logic circuit may include an image buffer (implemented by the processing unit 46 or the memory 44) and a graphics processing unit (for example, implemented by the processing unit 46). The graphics processing unit may be communicatively coupled to the image buffer. The graphics processing unit may include the video decoder 30 implemented by the logic circuit 47, to implement various modules that are described with reference to FIG. 3 and/or any other decoder system or subsystem described in this specification.

In some examples, the antenna 42 of the video coding system 40 may be configured to receive an encoded bitstream of video data. As described, the encoded bitstream may include data, an indicator, an index value, mode selection data, or the like that is related to video frame encoding described in this specification, for example, data related to encoding partitioning (for example, a transform coefficient or a quantized transform coefficient, an optional indicator (as described), and/or data defining encoding partitioning). The video coding system 40 may further include the video decoder 30 that is coupled to the antenna 42 and that is configured to decode the encoded bitstream. The display device 45 is configured to present a video frame.

Figure 5:
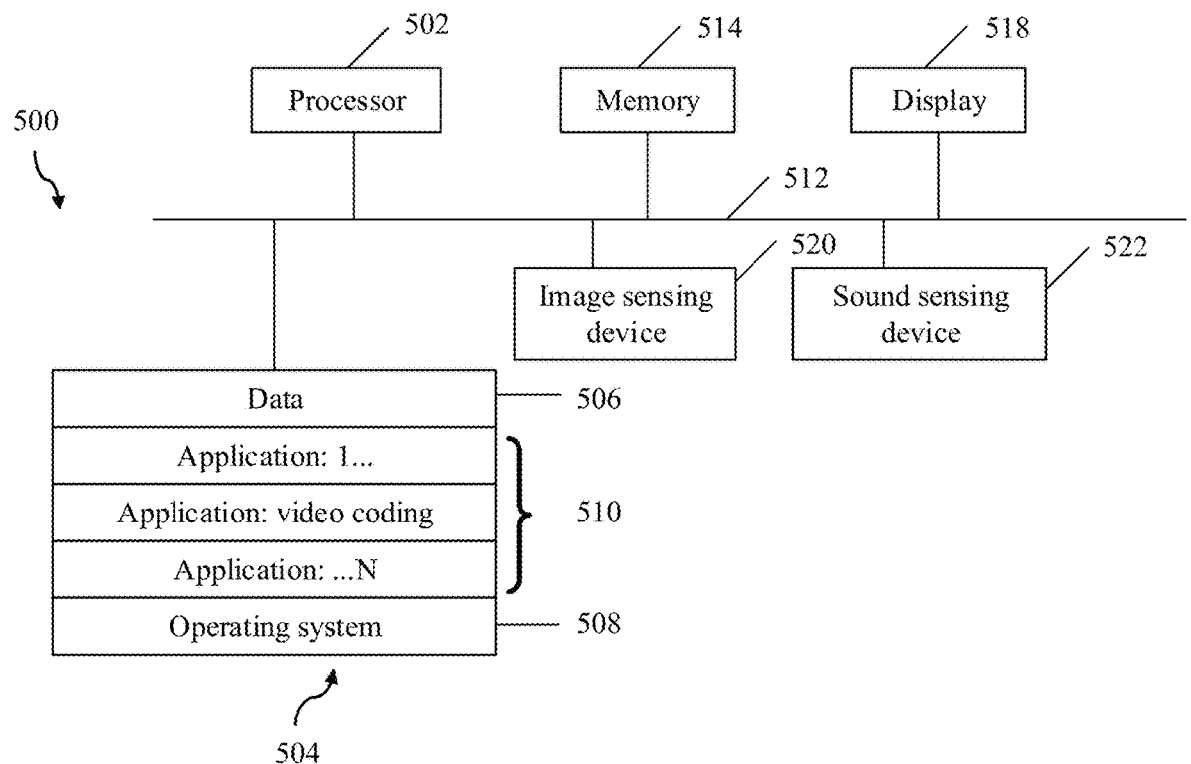
FIG. 5 is a block diagram illustrating an example of another encoding apparatus or decoding apparatus.

FIG. 5 is a simplified block diagram of an apparatus 500 that can be used as any one or two of the source device 12 and the destination device 14 in FIG. 1 according to an example embodiment. The apparatus 500 may implement the technologies in this application. The apparatus 500 may use a form of a computing system including a plurality of computing devices, or may use a form of a single computing device such as a mobile phone, a tablet computer, a laptop computer, a notebook computer, or a desktop computer.

A processor 502 in the apparatus 500 may be a central processing unit. Alternatively, the processor 502 may be any other type of existing or future device or devices that can control or process information. As shown in the figure, although the disclosed implementations may be practiced by using a single processor such as the processor 502, advantages in speed and efficiency may be achieved by using more than one processor.

In an implementation, a memory 504 in the apparatus 500 may be a read-only memory (ROM) or a random-access memory (RAM). Any other proper type of storage device may be used as the memory 504. The memory 504 may include code and data 506 that is accessed by the processor 502 by using a bus 512. The memory 504 may further include an operating system 508 and an application program 510. The application program 510 includes at least one program that allows the processor 502 to perform the method described in this specification. For example, the application program 510 may include applications 1 to N, and the applications 1 to N further include a video encoding application for performing the method described in this specification. The apparatus 500 may further include an additional memory in a form of a secondary memory 514. The secondary memory 514 may be, for example, a memory card used together with a mobile computing device. Because a video communication session may contain a large amount of information, the information may be completely or partially stored in the secondary memory 514 and loaded into the memory 504 for processing as required.

The apparatus 500 may further include one or more output devices, for example, a display 518. In an example, the display 518 may be a touch-sensitive display that combines a display with a touch-sensitive element that can be operated to sense a touch input. The display 518 may be coupled to the processor 502 by using the bus 512. In addition to the display 518, another output device that allows a user to program the apparatus 500 or use the apparatus 500 in another manner may be further provided, or another output device may be provided as an alternative to the display 518. When the output device is a display or includes a display, the display may be implemented differently, for example, by using a LCD, a cathode-ray tube (CRT) display, a plasma display, or a LED display such as an OLED display.

The apparatus 500 may further include an image sensing device 520, or may be connected to the image sensing device 520. The image sensing device 520 is, for example, a camera or any other existing or future image sensing device 520 that can sense an image. The image is, for example, an image of a user who runs the apparatus 500. The image sensing device 520 may be placed directly facing the user who runs the apparatus 500. In an example, a position and an optical axis of the image sensing device 520 may be configured, so that a field of view of the image sensing device 520 includes a region adjacent to the display 518, and the display 518 can be seen from the region.

The apparatus 500 may further include a sound sensing device 522, or may be connected to the sound sensing device 522. The sound sensing device 522 is, for example, a microphone or any other existing or future sound sensing device that can sense a sound near the apparatus 500. The sound sensing device 522 may be placed directly facing the user who runs the apparatus 500, and may be configured to receive a sound such as a voice or another sound that is made by the user when the user runs the apparatus 500.

Although the processor 502 and the memory 504 of the apparatus 500 are integrated into one unit as illustrated in FIG. 5, other configurations can be used. The running of the processor 502 may be distributed in a plurality of machines that may be directly coupled (each machine has one or more processors), or may be distributed in a local region or in another network. The memory 504 may be distributed in a plurality of machines such as a network-based memory and a memory in a plurality of machines that run the apparatus 500. Although a single bus is drawn herein, there may be a plurality of buses 512 of the apparatus 500. Further, the secondary memory 514 may be directly coupled to the other components of the apparatus 500 or may be accessed through a network, and may include a single integrated unit such as a memory card, or a plurality of units such as a plurality of memory cards. Therefore, the apparatus 500 may be implemented in a plurality of configurations.

The following describes concepts in this application.

1. Inter Prediction Mode

In HEVC, two inter prediction modes are used an AMVP mode and a merge mode.

In the AMVP mode, spatially or temporally neighboring encoded blocks (denoted as neighboring blocks) of a current block are first traversed, and a candidate motion vector list (which may also be referred to as a motion information candidate list) is constructed based on motion information of the neighboring blocks. Then, an optimal motion vector is determined from the candidate motion vector list based on a rate-distortion cost, and candidate motion information with a minimum rate-distortion cost is used as a motion vector predictor (MVP) of the current block. Both positions of the neighboring blocks and a traversal order thereof are predefined. The rate-distortion cost is calculated according to a formula (1):

$$J = SAD + \lambda R. \qquad (1)$$

where J indicates the rate-distortion cost (RD cost), a sum of absolute differences (SAD) between an original sample value and a predicted sample value obtained through motion estimation by using the candidate motion vector predictor, a bit rate (R), and λ indicates a Lagrange multiplier. An encoder side transfers an index of the selected motion vector predictor in the candidate motion vector list and an index value of a reference frame to a decoder side. Further, motion search is performed in a neighborhood centered on the MVP, to obtain an actual motion vector of the current block. The encoder side transfers a difference (motion vector difference) between the MVP and the actual motion vector to the decoder side.

Figure 6:
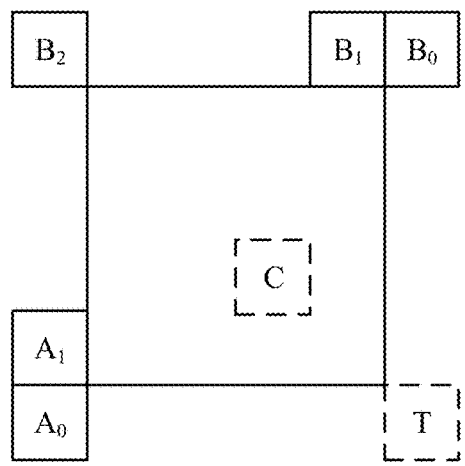
FIG. 6 is a schematic diagram illustrating positions of candidate motion information in space domain and time domain of a current block according to an embodiment.

In the merge mode, a candidate motion vector list is first constructed based on motion information of spatially or temporally neighboring encoded blocks of a current block. Then, optimal motion information is determined from the candidate motion vector list based on a rate-distortion cost, to serve as motion information of the current block. Next, an index value (denoted as a merge index hereinafter) of a position of the optimal motion information in the candidate motion vector list is transferred to a decoder side. Spatial candidate motion information and temporal candidate motion information of the current block are shown in FIG. 6. The spatial candidate motion information is from five spatially neighboring blocks (A0, A1, B0, B1, and B2). If a neighboring block is unavailable (the neighboring block does not exist, or the neighboring block is not encoded, or a prediction mode used for the neighboring block is not the inter prediction mode), motion information of the neighboring block is not added to the candidate motion vector list. The temporal candidate motion information of the current block is obtained by scaling an MV of a block at a corresponding position in a reference frame based on picture order counts (POC) of the reference frame and a current frame. Whether a block at a T position in the reference frame is available is first determined. If the block is unavailable, a block at a C position is selected.

Similar to the AMVP mode, in the merge mode, both positions of the neighboring blocks and a traversal order thereof are also predefined. In addition, positions of neighboring blocks and a transversal order thereof may vary with a mode.

It can be learned that a candidate motion vector list needs to be maintained in both the AMVP mode and the merge mode. Each time before new motion information is added to a candidate list, whether same motion information exists in the list is first checked. If the same motion information exists, the motion information is not added to the list. This checking process is referred to as trimming of the candidate motion vector list. Trimming of a list is to avoid same motion information in the list, thereby avoiding redundant rate-distortion cost calculation.

In HEVC inter prediction, all samples in a coding block use same motion information, and then motion compensation is performed based on the motion information, to obtain predictors of the samples of the coding block. However, in the coding block, not all samples have a same motion characteristic. Using the same motion information may cause inaccurate motion compensation prediction and more residual information.

In existing video coding standards, block matching motion estimation based on a translational motion model is used, and it is assumed that motion of all samples in a block is consistent. However, in the real world, there are a variety of motion. Many objects are in non-translational motion, for example, a rotating object, a roller coaster spinning in different directions, a display of fireworks, and some stunts in movies, especially a moving object in a user-generated content (UGC) scenario. For these moving objects, if a block motion compensation technology based on a translational motion model in the existing coding standards is used for coding, coding efficiency may be greatly affected. Therefore, a non-translational motion model such as an affine motion model is introduced to further improve coding efficiency.

Therefore, in terms of different motion models, the AMVP mode may be classified into a translational model-based AMVP mode and a non-translational model-based AMVP mode, and the merge mode may be classified into a translational model-based merge mode and a non-translational model-based merge mode.

2. Non-Translational Motion Model

In non-translational motion model-based prediction, a codec side uses one motion model to derive motion information of each child motion compensation unit in a current block, and performs motion compensation based on the motion information of the child motion compensation unit to obtain a prediction block, so as to improve prediction efficiency. A common non-translational motion model is a 4-parameter affine motion model or a 6-parameter affine motion model.

The child motion compensation unit in the embodiments of this application may be a sample or an $N_1 \times N_2$ sample block obtained through partitioning according to a particular method, where both $N_1$ and $N_2$ are positive integers, and $N_1$ may be equal to $N_2$, or may not be equal to $N_2$.

The 4-parameter affine motion model is expressed as a formula (2):

$$\begin{cases} vx = a_1 + a_3 x + a_4 y \\ vy = a_2 - a_4 x + a_3 y \end{cases} \tag{2}$$

The 4-parameter affine motion model may be represented by motion vectors of two samples and coordinates of the two samples relative to the top-left sample of the current block. A sample used for representing a motion model parameter is referred to as a control point. If the top-left sample (0, 0) and the top-right sample (W, 0) are used as control points, motion vectors (vx0, vy0) and (vx1, vy1) of the top-left control point and the top-right control point of the current block are determined first. Then, motion information of each child motion compensation unit in the current block is obtained according to a formula (3), where (x, y) is coordinates of the child motion compensation unit relative to the top-left sample of the current block, and W indicates a width of the current block.

$$\begin{cases} vx = \dfrac{vx_1 - vx_0}{W} x - \dfrac{vy_1 - vy_0}{W} y + vx_0 \\ vy = \dfrac{vy_1 - vy_0}{W} x + \dfrac{vx_1 - vx_0}{W} y + vy_0 \end{cases} \tag{3}$$

The 6-parameter affine motion model is expressed as a formula (4):

$$\begin{cases} vx = a_1 + a_3 x + a_4 y \\ vy = a_2 + a_5 x + a_5 y \end{cases} \tag{4}$$

The 6-parameter affine motion model may be represented by motion vectors of three samples and coordinates of the three samples relative to the top-left sample of the current block. If the top-left sample (0, 0), the top-right sample (W, 0), and the bottom-left sample (0, H) are used as control points, motion vectors (vx0, vy0), (vx1, vy1), and (vx2, vy2) of the top-left control point, the top-right control point, and the bottom-left control point of the current block are determined first. Then, motion information of each child motion compensation unit in the current block is obtained according to a formula (5), where (x, y) is coordinates of the child motion compensation unit relative to the top-left sample of the current block, and W and H indicate a width and a height of the current block, respectively.

$$\begin{cases} vx = \dfrac{vx_1 - vx_0}{W} x + \dfrac{vx_2 - vy_0}{H} y + vx_0 \\ vy = \dfrac{vy_1 - vy_0}{W} x + \dfrac{vy_2 - vx_0}{H} y + vy_0 \end{cases} \tag{5}$$

A coding block that is predicted by using the affine motion model is referred to as an affine coding block.

Generally, motion information of a control point of an affine coding block may be obtained by using an affine motion model-based AMVP mode or an affine motion model-based merge mode.

The motion information of the control point of the current coding block may be obtained by using an inherited control point motion vector prediction method or a constructed control point motion vector prediction method.

3. Inherited Control Point Motion Vector Prediction Method

The inherited control point motion vector prediction method is using a motion model of a neighboring encoded affine coding block to determine a candidate control point motion vector of a current block.

Figure 7:
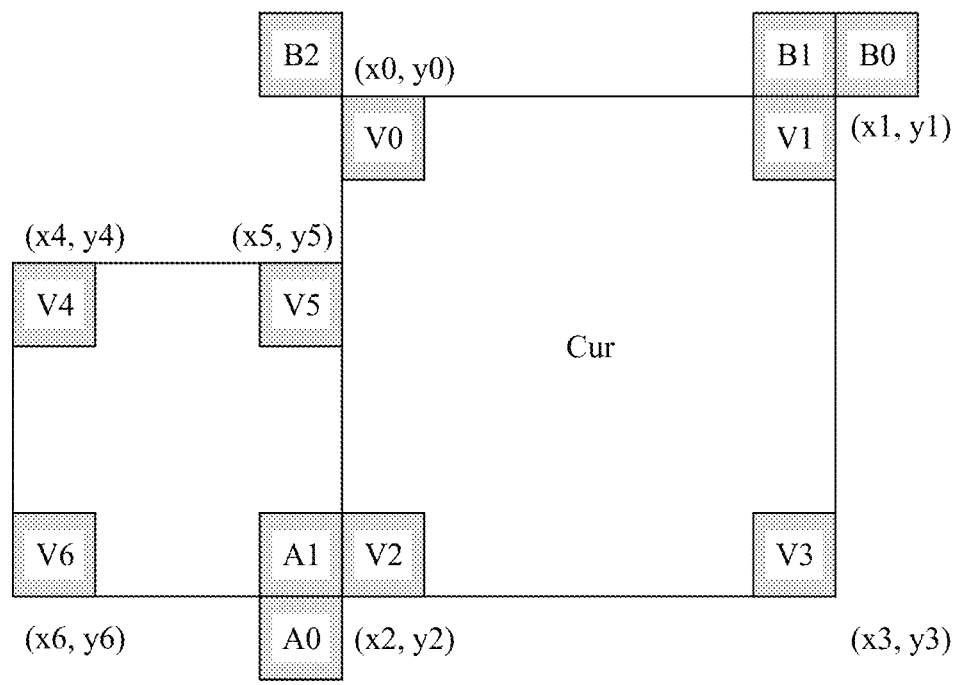
FIG. 7 is a schematic diagram illustrating positions of a current block and a plurality of neighboring position blocks according to an embodiment.

A current block shown in FIG. 7 is used as an example. Neighboring blocks around the current block are traversed in a specified order, for example, A1→B1→B0→A0→B2, to find an affine coding block in which a neighboring block of the current block is located, and obtain control point motion information of the affine coding block. Further, a control point motion vector (for the merge mode) or a control point motion vector predictor (for the AMVP mode) of the current block is derived by using a motion model constructed by using the control point motion information of the affine coding block. The order A1→B1→B0→A0→B2 is merely used as an example. An order of another combination is also applicable to this application. In addition, the neighboring blocks are not limited to A1, B1, B0, A0, and B2.

The neighboring block may be a sample or a sample block of a preset size obtained based on a particular partitioning method, for example, may be a 4×4 sample block, a 4×2 sample block, or a sample block of another size. This is not limited.

The following describes a determining process by using A1 as an example, and another case is similar thereto.

As shown in FIG. 7, if a coding block in which A1 is located is a 4-parameter affine coding block, a motion vector (vx4, vy4) of the top-left sample (x4, y4) and a motion vector (vx5, vy5) of the top-right sample (x5, y5) of the affine coding block are obtained. A motion vector (vx0, vy0) of the top-left sample (x0, y0) of a current affine coding block is calculated according to a formula (6), and a motion vector (vx1, vy1) of the top-right sample (x1, y1) of the current affine coding block is calculated according to a formula (7):

$$\begin{cases} vx_0 = vx_4 + \frac{(vx_5 - vx_4)}{x_5 - x_4} \times (x_0 - x_4) - \frac{(vy_5 - vy_4)}{x_5 - x_4} \times (y_0 - y_4) \\ vy_0 = vy_4 + \frac{(vy_5 - vy_4)}{x_5 - x_4} \times (x_0 - x_4) + \frac{(vx_5 - vx_4)}{x_5 - x_4} \times (y_0 - y_4) \end{cases} \quad (6)$$

$$\begin{cases} vx_1 = vx_4 + \frac{(vx_5 - vx_4)}{x_5 - x_4} \times (x_1 - x_4) - \frac{(vy_5 - vy_4)}{x_5 - x_4} \times (y_1 - y_4) \\ vy_1 = vy_4 + \frac{(vy_5 - vy_4)}{x_5 - x_4} \times (x_1 - x_4) + \frac{(vx_5 - vx_4)}{x_5 - x_4} \times (y_1 - y_4) \end{cases} \quad (7)$$

A combination of the motion vector (vx0, vy0) of the top-left sample (x0, y0) and the motion vector (vx1, vy1) of the top-right sample (x1, y1) of the current block that are obtained based on the affine coding block in which A1 is located is the candidate control point motion vector of the current block.

If a coding block in which A1 is located is a 6-parameter affine coding block, a motion vector (vx4, vy4) of the top-left sample (x4, y4), a motion vector (vx5, vy5) of the top-right sample (x5, y5), and a motion vector (vx6, vy6) of the bottom-left sample (x6, y6) of the affine coding block are obtained. A motion vector (vx0, vy0) of the top-left sample (x0, y0) of a current block is calculated according to a formula (8), a motion vector (vx1, vy1) of the top-right sample (x1, y1) of the current block is calculated according to a formula (9), and a motion vector (vx2, vy2) of the bottom-left sample (x2, y2) of the current block is calculated according to a formula (10):

$$\begin{cases} vx_0 = vx_4 + \frac{(vx_5 - vx_4)}{x_5 - x_4} \times (x_0 - x_4) + \frac{(vx_6 - vx_4)}{y_6 - y_4} \times (y_0 - y_4) \\ vy_0 = vy_4 + \frac{(vy_5 - vy_4)}{x_5 - x_4} \times (x_0 - x_4) + \frac{(vy_6 - vy_4)}{y_6 - y_4} \times (y_0 - y_4) \end{cases} \quad (8)$$

$$\begin{cases} vx_1 = vx_4 + \frac{(vx_5 - vx_4)}{x_5 - x_4} \times (x_1 - x_4) + \frac{(vx_6 - vx_4)}{y_6 - y_4} \times (y_1 - y_4) \\ vy_1 = vy_4 + \frac{(vy_5 - vy_4)}{x_5 - x_4} \times (x_1 - x_4) + \frac{(vy_6 - vy_4)}{y_6 - y_4} \times (y_1 - y_4) \end{cases} \quad (9)$$

$$\begin{cases} vx_2 = vx_4 + \frac{(vx_5 - vx_4)}{x_5 - x_4} \times (x_2 - x_4) + \frac{(vx_6 - vx_4)}{y_6 - y_4} \times (y_2 - y_4) \\ vy_2 = vy_4 + \frac{(vy_5 - vy_4)}{x_5 - x_4} \times (x_2 - x_4) + \frac{(vy_6 - vy_4)}{y_6 - y_4} \times (y_2 - y_4) \end{cases} \quad (10)$$

A combination of the motion vector (vx0, vy0) of the top-left sample (x0, y0), the motion vector (vx1, vy1) of the top-right sample (x1, y1), and the motion vector (vx2, vy2) of the bottom-left sample (x2, y2) of the current block that are obtained based on the affine coding block in which A1 is located is the candidate control point motion vector of the current block.

It should be noted that other motion models, candidate positions, and search and traversal orders are also applicable to this application. Details are not described in the embodiments of this application.

It should be noted that a method in which other control points are used to represent motion models for neighboring and current coding blocks are also applicable to this application. Details are not described herein.

4. Constructed Control Point Motion Vector Prediction Method 1

The constructed control point motion vector prediction method is combining motion vectors of neighboring encoded blocks around a control point of a current block and using the combined motion vectors as control point motion vectors of a current affine coding block, without considering whether the neighboring encoded blocks are affine coding blocks.

Figure 8A:
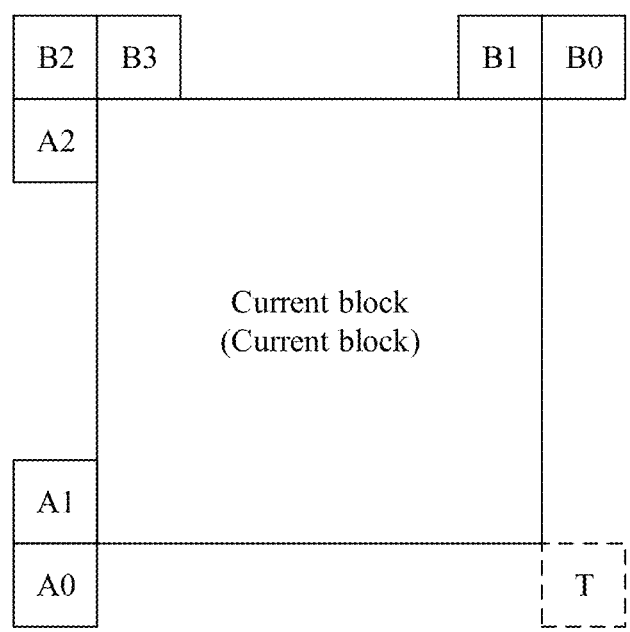
FIG. 8A is a flowchart illustrating a method for predicting a constructed control point motion vector according to an embodiment.

Motion vectors of the top-left sample and the top-right sample of the current block are determined by using motion information of the neighboring encoded blocks around the current coding block. FIG. 8A is used as an example to describe the constructed control point motion vector prediction method. It should be noted that FIG. 8A is merely an example.

As shown in FIG. 8A, motion vectors of neighboring encoded blocks A2, B2, and B3 at the top-left sample are used as candidate motion vectors for a motion vector of the top-left sample of the current block, and motion vectors of neighboring encoded blocks B1 and B0 at the top-right sample are used as candidate motion vectors for a motion vector of the top-right sample of the current block. The candidate motion vectors of the top-left sample and the top-right sample are combined to constitute a plurality of 2-tuples. Motion vectors of two encoded blocks included in a 2-tuple may be used as candidate control point motion vectors of the current block, as shown in the following formula (11A):

$$\{v_{A2}, v_{B1}\}, \{v_{A2}, v_{B0}\}, \{v_{B2}, v_{B1}\}, \{v_{B2}, v_{B0}\}, \{v_{B3}, v_{B1}\}, \{v_{B3}, v_{B0}\}. \quad 11(A)$$

$v_{A2}$ indicates the motion vector of A2, $v_{B1}$ indicates the motion vector of B1, $v_{B0}$ indicates the motion vector of B0, $v_{B2}$ indicates the motion vector of B2, and $v_{B3}$ indicates the motion vector of B3.

As shown in FIG. 8A, motion vectors of neighboring encoded blocks A2, B2, and B3 at the top-left sample are used as candidate motion vectors for a motion vector of the top-left sample of the current block, motion vectors of neighboring encoded blocks B1 and B0 at the top-right sample are used as candidate motion vectors for a motion vector of the top-right sample of the current block, and motion vectors of neighboring encoded blocks A0 and A1 at the bottom-left sample are used as candidate motion vectors for a motion vector of the bottom-left sample of the current block. The candidate motion vectors of the top-left sample, the top-right sample, and the bottom-left sample are combined to constitute a 3-tuple. Motion vectors of three encoded blocks included in the 3-tuple may be used as candidate control point motion vectors of the current block, as shown in the following formulas (11B) and (11C):

$$\{v_{A2}, v_{B1}, v_{A0}\}, \{v_{A2}, v_{B0}, v_{A0}\}, \{v_{B2}, v_{B1}, v_{A0}\}, \quad (11B)$$

$$\{v_{B2}, v_{B0}, v_{A0}\}, \{v_{B3}, v_{B1}, v_{A0}\}, \{v_{B3}, v_{B0}, v_{A0}\}$$

$$\{v_{A2}, v_{B1}, v_{A1}\}, \{v_{A2}, v_{B0}, v_{A1}\}, \{v_{B2}, v_{B1}, v_{A1}\}, \quad (11C)$$

$$\{v_{B2}, v_{B0}, v_{A1}\}, \{v_{B3}, v_{B1}, v_{A1}\}, \{v_{B3}, v_{B0}, v_{A1}\}.$$

$v_{A2}$ indicates the motion vector of A2, $v_{B1}$ indicates the motion vector of B1, $v_{B0}$ indicates the motion vector of B0, $v_{B2}$ indicates the motion vector of B2, $v_{B3}$ indicates the motion vector of B3, $v_{A0}$ indicates the motion vector of A0, and $v_{A1}$ indicates the motion vector of A1.

It should be noted that other methods of combining control point motion vectors are also applicable to this application. Details are not described herein.

It should be noted that a method in which other control points are used to represent motion models of neighboring and current coding blocks are also applicable to this application. Details are not described herein.

Figure 8B:
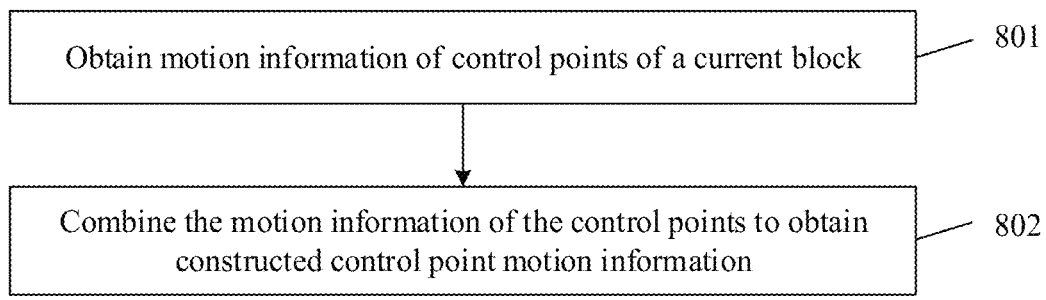
FIG. 8B is a flowchart illustrating a method for predicting a constructed control point motion vector according to an embodiment.

5. Constructed Control Point Motion Vector Prediction Method 2. For this, Refer to FIG. 8B Step 801. Obtain motion information of control points of a current block.

For example, in FIG. 8A, CPk (k=1, 2, 3, or 4) indicates a $k^{th}$ control point, A0, A1, A2, B0, B1, B2, and B3 are spatially neighboring positions of the current block and are used to predict CP1, CP2, or CP3, and T is a temporally neighboring position of the current block and is used to predict CP4.

It is assumed that coordinates of CP1, CP2, CP3, and CP4 are (0, 0), (W, 0), (H, 0), and (W, H), respectively, where W and H indicate a width and a height of the current block.

The motion information of each control point is obtained in the following order.

(1) For CP1, a check order is B2→A2→B3. If B2 is available, motion information of B2 is used. If B2 is unavailable, A2 and B3 are checked. If motion information of all the three positions is unavailable, motion information of CP1 cannot be obtained.

(2) For CP2, a check order is B0→B1. If B0 is available, motion information of B0 is used for CP2. If B0 is unavailable, B1 is checked. If motion information of both the positions is unavailable, motion information of CP2 cannot be obtained.

(3) For CP3, a check order is A0→A1.

(4) For CP4, motion information of T is used.

Herein, that X is available means that a block at an X (X is A0, A1, A2, B0, B1, B2, B3, or T) position has been encoded and an inter prediction mode is used. Otherwise, the X position is unavailable.

It should be noted that other methods of obtaining motion information of a control point are also applicable to this application. Details are not described herein.

Step 802. Combine the motion information of the control points to obtain constructed control point motion information.

Motion information of two control points is combined to constitute a 2-tuple, to construct a 4-parameter affine motion model. A manner of combining the two control points may be {CP1, CP4}, {CP2, CP3}, {CP1, CP2}, {CP2, CP4}, {CP1, CP3}, or {CP3, CP4}. For example, a 4-parameter affine motion model constructed by using a 2-tuple including the control points CP1 and CP2 may be denoted as Affine (CP1, CP2).

Motion information of three control points is combined to constitute a 3-tuple, to construct a 6-parameter affine motion model. A manner of combining the three control points may be {CP1, CP2, CP4}, {CP1, CP2, CP3}, {CP2, CP3, CP4}, or {CP1, CP3, CP4}. For example, a 6-parameter affine motion model constructed by using a 3-tuple including the control points CP1, CP2, and CP3 may be denoted as Affine (CP1, CP2, CP3).

Motion information of four control points is combined to constitute a 4-tuple, to construct an 8-parameter bilinear model. An 8-parameter bilinear model constructed by using a 4-tuple including the control points CP1, CP2, CP3, and CP4 may be denoted as "Bilinear" (CP1, CP2, CP3, CP4).

In this embodiment of this application, for ease of description, a combination of motion information of two control points (or two encoded blocks) is simply referred to as a 2-tuple, a combination of motion information of three control points (or three encoded blocks) is simply referred to as a 3-tuple, and a combination of motion information of four control points (or four encoded blocks) is simply referred to as a 4-tuple.

These models are traversed in a preset order. If motion information of a control point corresponding to a combined model is unavailable, it is considered that the model is unavailable. Otherwise, a reference frame index of the model is determined, and motion vectors of control points are scaled. If scaled motion information of all the control points is consistent, the model is invalid. If the motion information of all the control points controlling the model is available, and the model is valid, the motion information of the control points constructing the model is added to a motion information candidate list.

A control point motion vector scaling method is shown in a formula (12):

$$MV_s = \frac{CurPoc - DesPoc}{CurPoc - SrcPoc} \times MV. \quad (12)$$

CurPoc indicates a POC number of a current frame, DesPoc indicates a POC number of a reference frame of the current block, SrcPoc indicates a POC number of a reference frame of a control point, $MV_s$ indicates a motion vector obtained through scaling, and MV indicates a motion vector of the control point.

It should be noted that a combination of different control points may be transformed into control points at a same position.

For example, a 4-parameter affine motion model obtained through a combination of {CP1, CP4}, {CP2, CP3}, {CP2, CP4}, {CP1, CP3}, or {CP3, CP4} is transformed into a representation by {CP1, CP2} or {CP1, CP2, CP3}. A transform method is substituting a motion vector and coordinate information of a control point into the formula (2), to obtain a model parameter, and then substituting coordinate information of {CP1, CP2} into the formula (3), to obtain a motion vector.

More directly, transform may be performed according to the following formulas (13) to (21), where W indicates the width of the current block, and H indicates the height of the current block. In the formulas (13) to (21), $(vx_0, vy_0)$ indicates a motion vector of CP1, $(vx_1, vy_1)$ indicates a motion vector of CP2, $(vx_2, vy_2)$ indicates a motion vector of CP3, and $(vx_3, vy_3)$ indicates a motion vector of CP4.

{CP1, CP2} may be transformed into {CP1, CP2, CP3} according to the following formula (13). In other words, the motion vector of CP3 in {CP1, CP2, CP3} may be determined according to the formula (13):

$$\begin{cases} vx_2 = -\dfrac{vy_1 - vy_0}{W}H + vx_0 \\ vy_2 = +\dfrac{vx_1 - vx_0}{W}H + vy_0 \end{cases} \quad (13)$$

{CP1, CP3} may be transformed into {CP1, CP2} or {CP1, CP2, CP3} according to the following formula (14):

$$\begin{cases} vx_1 = +\dfrac{vy_2 - vy_0}{H}W + vx_0 \\ vy_1 = -\dfrac{vx_2 - vx_0}{H}W + vy_0 \end{cases} \quad (14)$$

{CP2, CP3} may be transformed into {CP1, CP2} or {CP1, CP2, CP3} according to the following formula (15):

$$\begin{cases} vx_0 = \dfrac{vx_2 - vx_1}{W*W + H*H}W*W - \dfrac{vy_2 - vy_1}{W*W + H*H}H*W + vx_1 \\ vy_0 = \dfrac{vy_2 - vy_1}{W*W + H*H}W*W + \dfrac{vx_2 - vx_1}{W*W + H*H}H*W + vy_1 \end{cases} \quad (15)$$

{CP1, CP4} may be transformed into {CP1, CP2} or {CP1, CP2, CP3} according to the following formula (16) or (17):

$$\begin{cases} vx_1 = \dfrac{vx_3 - vx_0}{W*W + H*H}W*W + \dfrac{vy_3 - vy_0}{W*W + H*H}H*W + vx_0 \\ vy_1 = \dfrac{vy_3 - vy_0}{W*W + H*H}W*W - \dfrac{vx_3 - vx_0}{W*W + H*H}H*W + vy_0 \end{cases} \quad (16)$$

$$\begin{cases} vx_2 = \dfrac{vx_3 - vx_0}{W*W + H*H}H*H - \dfrac{vy_3 - vy_0}{W*W + H*H}H*W + vx_0 \\ vy_2 = \dfrac{vy_3 - vy_0}{W*W + H*H}W*H + \dfrac{vx_3 - vx_0}{W*W + H*H}H*H + vy_0 \end{cases} \quad (17)$$

{CP2, CP4} may be transformed into {CP1, CP2} according to the following formula (18), and {CP2, CP4} may be transformed into {CP1, CP2, CP3} according to the following formulas (18) and (19):

$$\begin{cases} vx_0 = -\dfrac{vy_3 - vy_1}{H}W + vx_1 \\ vy_0 = +\dfrac{vx_3 - vx_1}{H}W + vy_1 \end{cases} \quad (18)$$

$$\begin{cases} vx_2 = -\dfrac{vy_3 - vy_1}{H}W + vx_3 \\ vy_2 = +\dfrac{vx_3 - vx_1}{H}W + vy_3 \end{cases} \quad (19)$$

{CP3, CP4} may be transformed into {CP1, CP2} according to the following formula (20), and {CP3, CP4} may be transformed into {CP1, CP2, CP3} according to the following formulas (20) and (21):

$$\begin{cases} vx_0 = +\dfrac{vy_3 - vy_2}{W}H + vx_2 \\ vy_0 = -\dfrac{vx_3 - vx_2}{W}H + vy_2 \end{cases} \quad (20)$$

$$\begin{cases} vx_1 = +\dfrac{vy_3 - vy_2}{W}H + vx_3 \\ vy_1 = -\dfrac{vx_3 - vx_2}{W}H + vy_3 \end{cases} \quad (21)$$

For example, a 6-parameter affine motion model obtained through a combination of {CP1, CP2, CP4}, {CP2, CP3, CP4}, or {CP1, CP3, CP4} is transformed into a representation by {CP1, CP2, CP3}. A transform method is substituting a motion vector and coordinate information of a control point into the formula (4), to obtain a model parameter, and then substituting coordinate information of {CP1, CP2, CP3} into the formula (5), to obtain a motion vector.

More directly, transform may be performed according to the following formulas (22) to (24), where W indicates the width of the current block, and H indicates the height of the current block. In the formulas (13) to (21), $(vx_0, vy_0)$ indicates a motion vector of CP1, $(vx_1, vy_1)$ indicates a motion vector of CP2, $(vx_2, vy_2)$ indicates a motion vector of CP3, and $(vx_3, vy_3)$ indicates a motion vector of CP4.

{CP1, CP2, CP4} may be transformed into {CP1, CP2, CP3} according to the following formula (22):

$$\begin{cases} vx_2 = vx_3 + vx_0 - vx_1 \\ vy_2 = vy_3 + vy_0 - vy_1 \end{cases} \quad (22)$$

{CP2, CP3, CP4} may be transformed into {CP1, CP2, CP3} according to the following formula (23):

$$\begin{cases} vx_0 = vx_1 + vx_2 - vx_3 \\ vy_0 = vy_1 + vy_2 - vy_3 \end{cases} \quad (23)$$

{CP1, CP3, CP4} may be transformed into {CP1, CP2, CP3} according to the following formula (24):

$$\begin{cases} vx_1 = vx_3 + vx_0 - vx_2 \\ vy_1 = vy_3 + vy_0 - vy_2 \end{cases} \quad (24)$$

6. Affine Motion Model-Based AMVP Mode (Affine AMVP Mode)

(1) Constructing a Candidate Motion Vector List.

A candidate motion vector list for the affine motion model-based AMVP mode is constructed by using an inherited control point motion vector prediction method and/or a constructed control point motion vector prediction method. In this embodiment of this application, the candidate motion vector list for the affine motion model-based AMVP mode may be referred to as a control point motion vector predictor candidate list. A motion vector predictor of each control point includes motion vectors of two (4-parameter affine motion model) control points or motion vectors of three (6-parameter affine motion model) control points.

Optionally, the control point motion vector predictor candidate list is pruned and sorted according to a particular rule, and may be truncated or padded to a particular quantity.

(2) Determining an Optimal Control Point Motion Vector Predictor.

On an encoder side, a motion vector of each child motion compensation unit in a current coding block is obtained based on each control point motion vector predictor in the control point motion vector predictor candidate list by using the formula (3)/(5), so as to obtain a sample value at a corresponding position in a reference frame to which the motion vector of each child motion compensation unit points, and the sample value is used as a predictor for performing motion compensation by using the affine motion model. An average difference between an original value and a predictor of each sample in the current coding block is calculated. A control point motion vector predictor corresponding to a minimum average difference is selected as the optimal control point motion vector predictor and used as motion vector predictors of two/three control points of the current coding block. An index number representing a position of the control point motion vector predictor in the control point motion vector predictor candidate list is encoded into a bitstream and sent to a decoder.

On a decoder side, the index number is parsed, and the control point motion vector predictor is determined from the control point motion vector predictor candidate list based on the index number.

(3) Determining a Control Point Motion Vector.

On the encoder side, the control point motion vector predictor is used as a search start point for motion search within a specific search range, to obtain the control point motion vector. A difference (control point motion vectors differences) between the control point motion vector and the control point motion vector predictor is transferred to the decoder side.

On the decoder side, the control point motion vector difference is parsed and added to the control point motion vector predictor, to obtain the control point motion vector.

7. Affine Merge Mode

A control point motion vector merge candidate list (control point motion vectors merge candidate list) is constructed by using an inherited control point motion vector prediction method and/or a constructed control point motion vector prediction method.

Optionally, the control point motion vector merge candidate list is pruned and sorted according to a particular rule, and may be truncated or padded to a particular quantity.

On an encoder side, a motion vector of each child motion compensation unit (a sample or an $N_1 \times N_2$ sample block obtained through partitioning according to a particular method) in a current coding block is obtained based on each control point motion vector in the merge candidate list by using the formula (3)/(5), so as to obtain a sample value at a position in a reference frame to which the motion vector of each child motion compensation unit points, and the sample value is used as a predictor for performing affine motion compensation. An average difference between an original value and a predictor of each sample in the current coding block is calculated. A control point motion vector corresponding to a minimum average difference is selected as motion vectors of two/three control points of the current coding block. An index number representing a position of the control point motion vector in the candidate list is encoded into a bitstream and sent to the decoder.

On a decoder side, the index number is parsed, and the control point motion vector is determined from the control point motion vector merge candidate list based on the index number.

In addition, it should be noted that in this application, "at least one" means one or more, and "a plurality of" means two or more. The term "and/or" describes an association relationship for describing associated objects and indicates that three relationships may exist. For example, A and/or B may represent the following cases only A exists, both A and B exist, and only B exists, where A and B may be singular or plural. The character "/" generally indicates an "or" relationship between the associated objects. "At least one of the following items (pieces)" or a similar expression indicates any combination of these items, including a single item (piece) or any combination of a plurality of items (pieces). For example, at least one of a, b, or c may indicate a, b, c, a and b, a and c, b and c, or a, b, and c, where a, b, and c may be singular or plural.

In this application, when the inter prediction mode is used to decode the current block, a syntax element may be used to signal the inter prediction mode.

For some currently used syntax structures of the inter prediction mode used for parsing the current block, refer to Table 1. It should be noted that a syntax element in a syntax structure may alternatively be represented by other identifiers. This is not specifically limited in this application.

TABLE 1

| | Descriptor (Descriptor) |
|---|---|
| coding_unit(x0,y0,cbWidth,cbHeight) { | |
| ... | |
|   merge_flag[x0][y0] | ae(v) |
|   if(merge_flag[x0][y0]) { | |
|     if (allowAffineMerge) | |
|       affine_merge_flag[x0][y0] | ae(v) |
|     if(MaxNumMergeCand>1 && affine_merge_flag[x0][y0]==0) | |
|       merge_idx[x0][y0] | ae(v) |
|     if(MaxNumAffineMergeCand>1 && affine_merge_flag[x0][y0] | |
|       affine_merge_idx[x0][y0] | ae(v) |
|   } else { | |
|     if(slice_type==B) | |
|       inter_pred_idc[x0][y0] | ae(v) |
|     if(allowAffineInter) { | |
|       affine_inter_flag[x0][y0] | ae(v) |
|       if(affine_inter_flag[x0][y0]) | |
|         affine_type_flag[x0][y0] | ae(v) |
|     } | |
|     MotionModelIdc[x0][y0]=affine_inter_flag[x0][y0] +affine_type_flag[x0][y0] | |
|     if(inter_pred_idc[x0][y0]!=PRED_L1) { | |
|       if(num_ref_idx_l0_active_minus1>0) | |
|         ref_idx_l0[x0][y0] | ae(v) |
|       mvd_coding(x0,y0,0,0) | |
|       if(MotionModelIdc[x0][y0]>0) { | |
|         mvd_coding(x0,y0,0,1) | |
|         if(MotionModelIdc[x0][y0]>1) | |
|           mvd)coding(x0,y0,0,2) | |
|       } | |
|       mvp_l0_flag[x0][y0] | ae(v) |
|     } | |
|     if(inter_pred_idc[x0][y0]!=PRED_L0) { | |
|       if(num_ref_idx_l1_active_minus1>0) | |
|         ref_idx_l1[x0][y0] | ae(v) |
|       mvd_coding(x0,y0,1,0) | |
|       if(MotionModelIdc[x0][y0]>0) { | |
|         mvd_coding(x0,y0,1,1) | |
|         if(MotionModelIdc[x0][y0]>1) | |
|           mvd_coding(x0,y0,1,2) | |
|       } | |

TABLE 1-continued

| | Descriptor (Descriptor) |
|---|---|
|     mvp_l1_flag[x0][y0]<br>   }<br>  }<br>...<br>} | ae(v) |

A syntax element merge_flag[x0][y0] may be used to indicate whether the merge mode is used for the current block. For example, when merge_flag [x0] [y0]=1, it indicates that the merge mode is used for the current block, and when merge_flag [x0] [y0]=0, it indicates that the merge mode is not used for the current block, where x0 and y0 indicate coordinates of the current block in a video picture.

A variable allowAffineMerge may be used to indicate whether the current block meets a condition for using the affine motion model-based merge mode. For example, when allowAffineInter=0, it indicates that the condition for using the affine motion model-based merge mode is not met, and when allowAffineInter=1, it indicates that the condition for using the affine motion model-based merge mode is met. The condition for using the affine motion model-based merge mode may be that both a width and a height of the current block are greater than or equal to 8, where cbWidth indicates the width of the current block, and cbHeight indicates the height of the current block. In other words, when cbWidth<8 or cbHeight<8, allowAffineMerge=0, and when cbWidth>8 and cbHeight>8, allow AffineMerge=1.

A variable allowAffineInter may be used to indicate whether the current block meets a condition for using the affine motion model-based AMVP mode. For example, when allowAffineInter=0, it indicates that the condition for using the affine motion model-based AMVP mode is not met, and when allowAffineInter=1, it indicates that the condition for using the affine motion model-based AMVP mode is met. The condition for using the affine motion model-based AMVP mode may be that both the width and the height of the current block are greater than or equal to 16. In other words, when cbWidth<16 or cbHeight<16, allowAffineInter=0, and when cbWidth≥16 and cbHeight≥16, allowAffineInter=1.

A syntax element affine_merge_flag[x0][y0] may be used to indicate whether the affine motion model-based merge mode is used for the current block. A type of a slice (slice_type) in which the current block is located is a P type or a B type. For example, when affine_merge_flag[x0][y0]=1, it indicates that the affine motion model-based merge mode is used for the current block, and when affine_merge_flag[x0][y0]=0, it indicates that the affine motion model-based merge mode is not used for the current block, but the translational motion model-based merge mode may be used.

A syntax element merge_idx[x0][y0] may be used to indicate an index value of a merge candidate list.

A syntax element affine_merge_idx[x0][y0] may be used to indicate an index value of an affine merge candidate list.

A syntax element affine_inter_flag[x0][y0] may be used to indicate whether the affine motion model-based AMVP mode is used for the current block when the slice in which the current block is located is a P-type slice or a B-type slice. For example, when allowAffineInter=0, it indicates that the affine motion model-based AMVP mode is used for the current block, and when allowAffineInter=1, it indicates that the affine motion model-based AMVP mode is not used for the current block, but the translational motion model-based AMVP mode may be used.

A syntax element affine_type_flag[x0][y0] may be used to indicate whether the 6-parameter affine motion model is used to perform motion compensation on the current block when the slice in which the current block is located is a P-type slice or a B-type slice. When affine_type_flag[x0][y0]=0, it indicates that the 6-parameter affine motion model is not used to perform motion compensation on the current block, but only the 4-parameter affine motion model may be used to perform motion compensation, and when affine_type_flag[x0][y0]=1, it indicates that the 6-parameter affine motion model is used to perform motion compensation on the current block.

As shown in Table 2, when MotionModelIdc[x0][y0]=1, it indicates that the 4-parameter affine motion model is used, when MotionModelIdc[x0][y0]=2, it indicates that the 6-parameter affine motion model is used, and when MotionModelIdc[x0][y0]=0, it indicates that the translational motion model is used.

TABLE 2

| MotionModelIdc[x0][y0] | Motion model for motion compensation (motion model for motion compensation) |
|---|---|
| 0 | Translational motion (translational motion) |
| 1 | 4-parameter affine motion (4-parameter affine motion) |
| 2 | 6-parameter affine motion (6-parameter affine motion) |

Variables MaxNumMergeCand and MaxAffineNumMrgCand are used to indicate a maximum list length, and indicate a maximum length of the constructed candidate motion vector list, inter_pred_idc[x0][y0] is used to indicate a prediction direction, PRED_L1 is used to indicate backward prediction, num_ref_idx_l0_active_minus1 indicates a quantity of reference frames in a forward reference frame list, and ref_idx_l0[x0][y0] indicates a forward reference frame index value of the current block, mvd_coding(x0, y0, 0, 0) indicates the first motion vector difference, mvp_l0_flag[x0][y0] indicates a forward MVP candidate list index value, PRED_L0 indicates forward prediction, num_ref_idx_l1_active_minus1 indicates a quantity of reference frames in a backward reference frame list, and ref_idx_l1[x0][y0] indicates a backward reference frame index value of the current block, and mvp_l1_flag[x0][y0] indicates a backward MVP candidate list index value.

In Table 1, ae(v) indicates a syntax element encoded through CABAC.

Figure 9A:
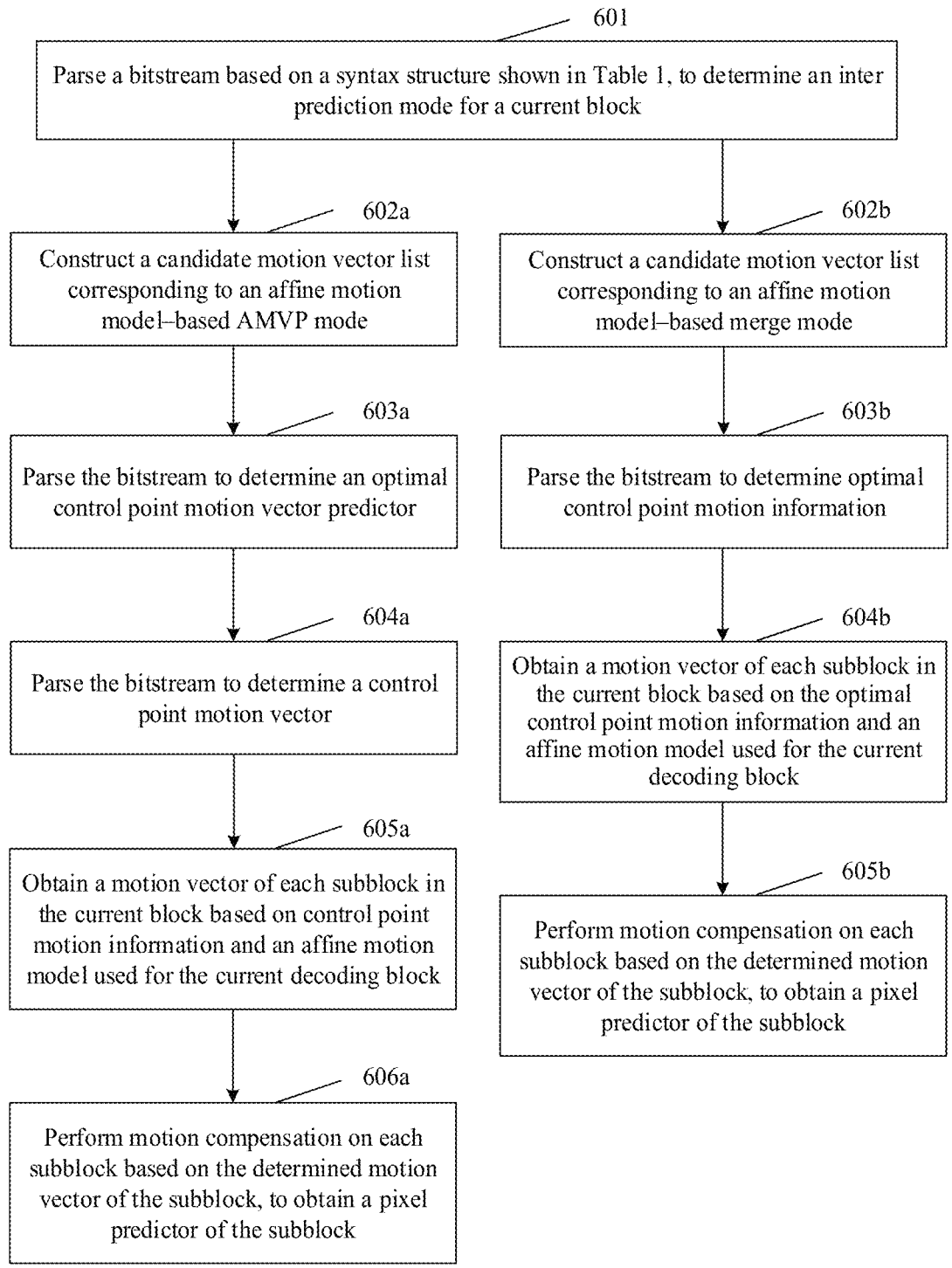
FIG. 9A is a flowchart illustrating an inter prediction method according to an embodiment.

The following describes an inter prediction process in detail. For this, refer to FIG. 9A.

Step 601. Parse a bitstream based on a syntax structure shown in Table 1, to determine an inter prediction mode for a current block.

If it is determined that the inter prediction mode for the current block is an affine motion model-based AMVP mode, step 602a is to be performed.

To be specific, when a syntax element merge_flag=0 and a syntax element affine_inter_flag=1, it indicates that the inter prediction mode for the current block is the affine motion model-based AMVP mode.

If it is determined that the inter prediction mode for the current block is an affine motion model-based merge mode, step 602b is to be performed.

To be specific, when a syntax element merge_flag=1 and a syntax element affine_merge_flag=1, it indicates that the inter prediction mode for the current block is the affine motion model-based merge mode.

Step 602a. Construct a candidate motion vector list corresponding to the affine motion model-based AMVP mode, and perform step 603a.

A candidate control point motion vector of the current block is derived by using an inherited control point motion vector prediction method and/or a constructed control point motion vector prediction method, and is added to the candidate motion vector list.

The candidate motion vector list may include a 2-tuple list (a 4-parameter affine motion model is used for the current coding block) or a 3-tuple list. The 2-tuple list includes one or more 2-tuples used for constructing a 4-parameter affine motion model. The 3-tuple list includes one or more 3-tuples used for constructing a 6-parameter affine motion model.

Optionally, the candidate motion vector 2-tuple/3-tuple list is pruned and sorted according to a particular rule, and may be truncated or padded to a particular quantity.

A1. A process of constructing the candidate motion vector list by using the inherited control point motion vector prediction method is described.

FIG. 7 is used as an example. For example, neighboring blocks around the current block are traversed in an order of A1→B1→B0→A0→B2 in FIG. 7, to find an affine coding block in which the neighboring block is located, and obtain control point motion information of the affine coding block. Further, candidate control point motion information of the current block is derived by using a motion model constructed based on the control point motion information of the affine coding block. For details, refer to related descriptions of the inherited control point motion vector prediction method in 3. Details are not described herein.

For example, when an affine motion model used for the current block is a 4-parameter affine motion model (that is, MotionModelIdc=1), if the 4-parameter affine motion model is used for a neighboring affine decoding block, motion vectors of two control points of the affine decoding block are obtained a motion vector (vx4, vy4) of a top-left control point (x4, y4) and a motion vector (vx5, vy5) of a top-right control point (x5, y5). The affine decoding block is an affine coding block predicted in an encoding phase by using an affine motion model.

Motion vectors of a top-left control point and a top-right control point of the current block are respectively derived according to the formulas (6) and (7) corresponding to the 4-parameter affine motion model by using the 4-parameter affine motion model including the two control points of the neighboring affine decoding block.

If a 6-parameter affine motion model is used for the neighboring affine decoding block, motion vectors of three control points of the neighboring affine decoding block are obtained, for example, the motion vector (vx4, vy4) of the top-left control point (x4, y4), the motion vector (vx5, vy5) of the top-right control point (x5, y5), and a motion vector (vx6, vy6) of a bottom-left control point (x6, y6) in FIG. 7.

The motion vectors of the top-left control point and the top-right control point of the current block are respectively derived according to the formulas (8) and (9) corresponding to the 6-parameter affine motion model by using the 6-parameter affine motion model including the three control points of the neighboring affine decoding block.

For example, an affine motion model used for the current decoding block is a 6-parameter affine motion model (that is, MotionModelIdc=2).

If an affine motion model used for a neighboring affine decoding block is the 6-parameter affine motion model, motion vectors of three control points of the neighboring affine decoding block are obtained, for example, a motion vector (vx4, vy4) of a top-left control point (x4, y4), a motion vector (vx5, vy5) of a top-right control point, and a motion vector (vx6, vy6) of a bottom-left control point (x6, y6) in FIG. 7.

Motion vectors of a top-left control point, a top-right control point, and a bottom-left control point of the current block are respectively derived according to the formulas (8), (9), and (10) corresponding to the 6-parameter affine motion model by using the 6-parameter affine motion model including the three control points of the neighboring affine decoding block.

If the affine motion model used for the neighboring affine decoding block is a 4-parameter affine motion model, motion vectors of two control points of the affine decoding block are obtained the motion vector (vx4, vy4) of the top-left control point (x4, y4) and the motion vector (vx5, vy5) of the top-right control point (x5, y5).

The motion vectors of the top-left control point, the top-right control point, and the bottom-left control point of the current block are respectively derived according to the formulas (6) and (7) corresponding to the 4-parameter affine motion model by using the 4-parameter affine motion model including the two control points of the neighboring affine decoding block.

It should be noted that other motion models, candidate positions, and search orders are also applicable to this application. Details are not described herein. It should be noted that a method in which other control points are used to represent motion models for neighboring and current coding blocks are also applicable to this application. Details are not described herein.

A2. A process of constructing the candidate motion vector list by using the constructed control point motion vector prediction method is described.

For example, if an affine motion model used for the current decoding block is a 4-parameter affine motion model (that is, MotionModelIdc=1), motion vectors of the top-left sample and the top-right sample of the current coding block are determined by using motion information of a neighboring encoded block of the current coding block. Specifically, the candidate motion vector list may be constructed by using the constructed control point motion vector prediction method 1 or the constructed control point motion vector prediction method 2. For a specific manner, refer to the descriptions in 4 and 5. Details are not described herein.

For example, if the affine motion model used for the current decoding block is a 6-parameter affine motion model (that is, MotionModelIdc=2), motion vectors of the top-left sample, the top-right sample, and the bottom-left sample of the current coding block are determined by using motion information of a neighboring encoded block of the current coding block. Specifically, the candidate motion vector list may be constructed by using the constructed control point motion vector prediction method 1 or the constructed control point motion vector prediction method 2. For a specific manner, refer to the descriptions in 4 and 5. Details are not described herein.

It should be noted that another manner of combining control point motion information is also applicable to this application. Details are not described herein.

Step 603a. Parse the bitstream to determine an optimal control point motion vector predictor, and perform step 604a.

B1. If an affine motion model used for the current decoding block is a 4-parameter affine motion model (MotionModelIdc=1), an index number is parsed, and the optimal motion vector predictor in two control points is determined from the candidate motion vector list based on the index number.

For example, the index number is mvp_l0_flag or mvp_l1_flag.

B2. If the affine motion model used for the current decoding block is a 6-parameter affine motion model (MotionModelIdc=2), an index number is parsed, and the optimal motion vector predictor in three control points is determined from the candidate motion vector list based on the index number.

Step 604a. Parse the bitstream to determine a control point motion vector.

C1. If an affine motion model used for the current decoding block is a 4-parameter affine motion model (MotionModelIdc=1), motion vector differences of two control points of the current block are obtained from the bitstream through decoding, and motion vectors of the control points are obtained based on the motion vector differences and motion vector predictors of the control points. Using forward prediction as an example, the motion vector differences of the two control points are mvd_coding(x0, y0, 0, 0) and mvd_coding(x0, y0, 0, 1), respectively.

For example, motion vector differences of a top-left control point and a top-right control point are obtained from the bitstream through decoding, and are respectively added to motion vector predictors, to obtain motion vectors of the top-left control point and the top-right control point of the current block.

C2. The affine motion model used for the current decoding block is a 6-parameter affine motion model (MotionModelIdc=2).

Motion vector differences of three control points of the current block are obtained from the bitstream through decoding, and motion vectors of the control points are obtained based on the motion vector differences and motion vector predictors of the control points. Using forward prediction as an example, the motion vector differences of the three control points are mvd_coding(x0, y0, 0, 0), mvd_coding(x0, y0, 0, 1), and mvd_coding(x0, y0, 0, 2), respectively.

For example, motion vector differences of a top-left control point, a top-right control point, and a bottom-left control point are obtained from the bitstream through decoding, and are respectively added to motion vector predictors, to obtain motion vectors of the top-left control point, the top-right control point, and the bottom-left control point of the current block.

Step 605a. Obtain a motion vector of each subblock in the current block based on control point motion information and an affine motion model used for the current decoding block.

Figure 9B:
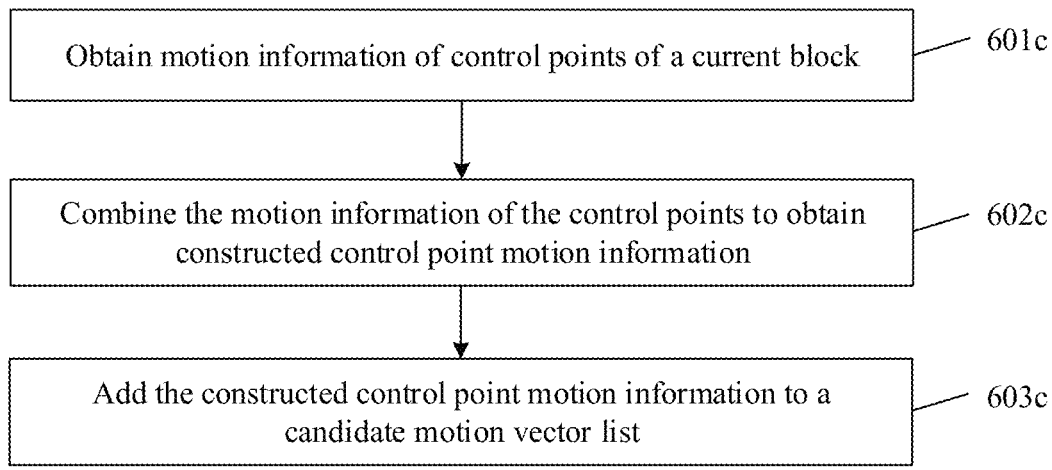
FIG. 9B is a flowchart illustrating a method for predicting a constructed control point motion vector according to an embodiment.
Figure 9C:
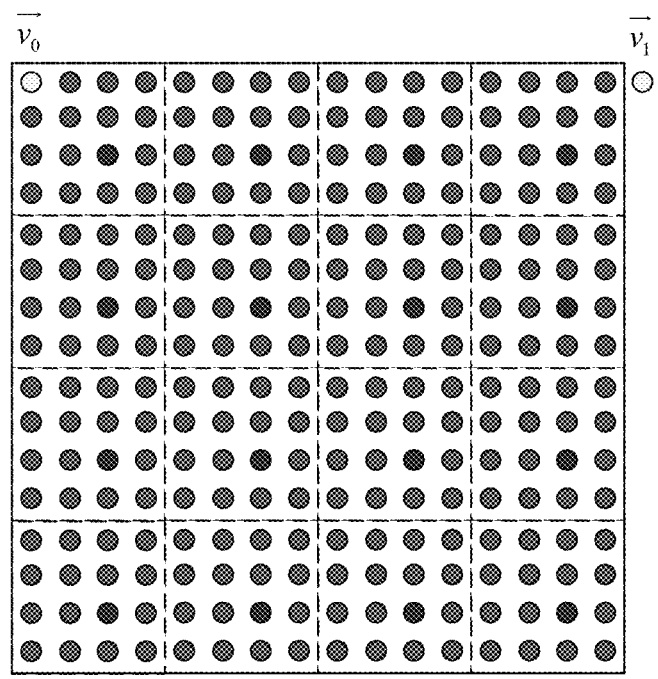
FIG. 9C is a schematic diagram illustrating a position of a motion compensation unit based on a center point of the motion compensation unit according to an embodiment.

For each subblock in the current affine decoding block (one subblock may be equivalent to one motion compensation unit, and a width and a height of the subblock are less than a width and a height of the current block), motion information of a sample at a preset position in a motion compensation unit may be used to represent motion information of all samples in the motion compensation unit. Assuming that a size of the motion compensation unit is M×N, the sample at the preset position may be a center sample (M/2, N/2), a top-left sample (0, 0), a top-right sample (M−1, 0), or a sample at another position of the motion compensation unit. The following uses the center sample of the motion compensation unit as an example for description. Referring to FIG. 9C, V0 indicates a motion vector of a top-left control point, and V1 indicates a motion vector of a top-right control point. Each small box indicates one motion compensation unit.

Coordinates of the center sample of the motion compensation unit relative to the top-left sample of the current affine decoding block are calculated by using a formula (25), where i indicates an $i^{th}$ motion compensation unit (from left to right) in a horizontal direction, j indicates a $j^{th}$ motion compensation unit (from top to bottom) in a vertical direction, and $(x_{(i,j)}, y_{(i,j)})$ indicates coordinates of a center sample of an $(i, j)^{th}$ motion compensation unit relative to the top-left sample of the current affine decoding block.

If an affine motion model used for the current affine decoding block is a 6-parameter affine motion model, $(x_{(i,j)}, y_{(i,j)})$ is substituted into a formula (26) corresponding to the 6-parameter affine motion model, to obtain a motion vector of a center sample of each motion compensation unit, and the motion vector of the center sample is used as a motion vector $(vx_{(i,j)}, vy_{(i,j)})$ of all samples in the motion compensation unit.

If the affine motion model used for the current affine decoding block is a 4-parameter affine motion model, $(x_{(i,j)}, y_{(i,j)})$ is substituted into a formula (27) corresponding to the 4-parameter affine motion model, to obtain a motion vector of a center sample of each motion compensation unit, and the motion vector of the center sample is used as a motion vector $(vx_{(i,j)}, vy_{(i,j)})$ of all samples in the motion compensation unit.

$$\begin{cases} x_{(i,j)} = M \times i + \frac{M}{2}, & i = 0, 1 \ldots \\ y_{(i,j)} = N \times j + \frac{N}{2}, & j = 0, 1 \ldots \end{cases} \quad (25)$$

$$\begin{cases} vx = \frac{vx_1 - vx_0}{W}x + \frac{vx_2 - vy_0}{H}y + vx_0 \\ vy = \frac{vy_1 - vy_0}{W}x + \frac{vy_2 - vx_0}{H}y + vy_0 \end{cases} \quad (26)$$

$$\begin{cases} vx = \frac{vx_1 - vx_0}{W}x - \frac{vy_1 - vy_0}{W}y + vx_0 \\ vy = \frac{vy_1 - vy_0}{W}x + \frac{vx_1 - vx_0}{W}y + vy_0 \end{cases} \quad (27)$$

Step 606a. Perform motion compensation on each subblock based on the determined motion vector of the subblock, to obtain a sample predictor of the subblock.

Step 602b. Construct a motion information candidate list corresponding to the affine motion model-based merge mode.

Specifically, the motion information candidate list corresponding to the affine motion model-based merge mode may be constructed by using an inherited control point motion vector prediction method and/or a constructed control point motion vector prediction method.

Optionally, the motion information candidate list is pruned and sorted according to a particular rule, and may be truncated or padded to a particular quantity.

D1. A process of constructing the candidate motion vector list by using the inherited control point motion vector prediction method is described.

Candidate control point motion information of the current block is derived by using the inherited control point motion vector prediction method, and is added to the motion information candidate list.

Neighboring blocks around the current block are traversed in an order of A1→B1→B0→A0→B2 in FIG. 8A, to find an affine coding block in which the position is located, and obtain control point motion information of the affine coding block. Further, the candidate control point motion information of the current block is derived by using a motion model for the affine coding block.

If the candidate motion vector list is empty, the candidate control point motion information is added to the candidate list. Otherwise, motion information in the candidate motion vector list is traversed sequentially, to check whether motion information that is the same as the candidate control point motion information exists in the candidate motion vector list. If no motion information that is the same as the candidate control point motion information exists in the candidate motion vector list, the candidate control point motion information is added to the candidate motion vector list.

To determine whether two pieces of candidate motion information are the same, it is necessary to sequentially determine whether forward reference frames, backward reference frames, horizontal and vertical components of each forward motion vector, and horizontal and vertical components of each backward motion vector in the two pieces of candidate motion information are the same. The two pieces of candidate motion information are considered to be different only when all of the foregoing elements are different.

If a quantity of pieces of motion information in the candidate motion vector list reaches a maximum list length MaxAffineNumMrgCand (MaxAffineNumMrgCand is a positive integer such as 1, 2, 3, 4, or 5, the following provides a description by using the length of 5 as an example, and details are not described herein), the candidate list is completed. Otherwise, a next neighboring block is traversed.

D2. The candidate control point motion information of the current block is derived by using the constructed control point motion vector prediction method, and is added to the motion information candidate list. For this, refer to FIG. 9B.

Step 601c. Obtain motion information of control points of the current block. For this, refer to step 801 in the constructed control point motion vector prediction method 2 in 5. Details are not described herein again.

Step 602c. Combine the motion information of the control points to obtain constructed control point motion information. For this, refer to step 801 in FIG. 8B. Details are not described herein again.

Step 603c. Add the constructed control point motion information to the candidate motion vector list.

If a length of the candidate list is less than the maximum list length MaxAffineNumMrgCand, the combinations are traversed in a preset order, to obtain a valid combination as the candidate control point motion information. In this case, if the candidate motion vector list is empty, the candidate control point motion information is added to the candidate motion vector list. Otherwise, motion information in the candidate motion vector list is traversed sequentially, to check whether motion information that is the same as the candidate control point motion information exists in the candidate motion vector list. If no motion information that is the same as the candidate control point motion information exists in the candidate motion vector list, the candidate control point motion information is added to the candidate motion vector list.

For example, a preset order is as follows. Affine (CP1, CP2, CP3)→Affine (CP1, CP2, CP4)→Affine (CP1, CP3, CP4)→Affine (CP2, CP3, CP4)→Affine (CP1, CP2)→Affine (CP1, CP3)→Affine (CP2, CP3)→Affine (CP1, CP4)→Affine (CP2, CP4)→Affine (CP3, CP4). There are 10 combinations in total.

If control point motion information corresponding to a combination is unavailable, it is considered that the combination is unavailable. If a combination is available, a reference frame index of the combination is determined (in a case of two control points, a smaller reference frame index is selected as the reference frame index of the combination, in a case of more than two control points, a reference frame index that appears most frequently is selected, and quantities of times that a plurality of reference frame indexes appear are the same, a minimum reference frame index is selected as the reference frame index of the combination), and motion vectors of control points are scaled. If scaled motion information of all the control points is consistent, the combination is invalid.

Optionally, in this embodiment of this application, the candidate motion vector list may be padded. For example, after the foregoing traversal process, if the length of the candidate motion vector list is less than the maximum list length MaxAffineNumMrgCand, the candidate motion vector list may be padded until the list length is equal to MaxAffineNumMrgCand.

Padding may be performed by using a zero motion vector padding method, or by combining or weighted averaging existing candidate motion information in the existing list. It should be noted that another method for padding the candidate motion vector list is also applicable to this application. Details are not described herein.

Step S603b. Parse the bitstream to determine optimal control point motion information.

An index number is parsed, and the optimal control point motion information is determined from the candidate motion vector list based on the index number.

Step 604b. Obtain a motion vector of each subblock in the current block based on the optimal control point motion information and an affine motion model used for the current decoding block.

This step is the same as step 605a.

Step 605b. Perform motion compensation on each subblock based on the determined motion vector of the subblock, to obtain a sample predictor of the subblock.

In the present disclosure, technologies related to a CABAC entropy decoder or another entropy decoder such as a PIPE decoder or a related decoder. Arithmetic decoding is a form of entropy decoding used in many compression algorithms with high decoding efficiency because a symbol can be mapped to a non-integer length code in arithmetic decoding. In general, decoding a data symbol through CABAC involves one or more of the following steps.

(1) Binary. If a to-be-decoded symbol is non-binary, the symbol is mapped to a "binary" sequence, and each binary bit may have a value of "0" or "1".

(2) Context assignment. One context is assigned to each binary bit (in a normal mode). A context model is used to determine a method for calculating a context for a given binary bit based on information available for the binary bit. The information is, for example, a value of a previous decoded symbol or a binary number.

(3) Binary encoding. An arithmetic encoder encodes a binary bit. To encode a binary bit, the arithmetic encoder needs a probability of a value of the binary bit as an input, and the probability is a probability that the value of the binary bit is equal to "0" and a probability that the value of the binary bit is equal to "1". An (estimated) probability of each context is represented by an integer value that is referred to as a "context state". Each context has a state, and therefore the state (that is, the estimated probability) is the same for a binary bit to which one context is assigned and is different between contexts.

(4) State update. A probability (state) for selecting a context is updated based on an actual decoded value of a binary bit (for example, if the value of the binary bit is "1", a probability of "1" is increased).

In other approaches, when parameter information of an affine motion model is parsed through CABAC, for example, affine_merge_flag, affine_merge_idx, affine_inter_flag, and affine_type_flag in Table 1, different contexts need to be used for different syntax elements in CABAC parsing. In the present disclosure, a quantity of contexts used in CABAC is reduced. Therefore, less space required by an encoder and a decoder to store contexts is occupied without affecting coding efficiency.

For affine_merge_flag and affine_inter_flag, two different context sets (each context set includes three contexts) are used in CABAC in other approaches. An actual context index used in each set is equal to a sum of a value of a same syntax element in the left neighboring block of a current decoding block and a value of a same syntax element in the upper neighboring block of the current decoding block, as shown in Table 3. Herein, availableL indicates availability of the left neighboring block of the current decoding block (whether the left neighboring block exists and has been decoded), and availableA indicates availability of the upper neighboring block of the current decoding block (whether the upper neighboring block exists and has been decoded). In other approaches, quantities of contexts of affine_merge_flag and affine_inter_flag are 6.

TABLE 3

| | Context index | | |
|---|---|---|---|
| Syntax element | condL | condA | Context index |
| affine_merge_flag [x0][y0] | affine_merge_flag [x0−1][y0] | affine_merg_flag [x0][y0−1] | (condL && availableL) + (condA && availableA) |
| affine_inter_flag [x0][y0] | affine_inter_flag [x0−1][y0] | affine_inter_flag [x0][y0−1] | (condL && availableL) + (condA && availableA) |

FIG. 10 describes a procedure of a video decoding method according to an embodiment of the present disclosure. This embodiment may be executed by the video decoder shown in FIG. 3. As shown in FIG. 10, the method includes the following steps.

1001. Parse a received bitstream to obtain a to-be-entropy-decoded syntax element in a current block, where the to-be-entropy-decoded syntax element in the current block includes a syntax element 1 in the current block or a syntax element 2 in the current block.

In an implementation, the syntax element 1 in the current block is affine_merge_flag, or the syntax element 2 in the current block is affine_inter_flag.

In an implementation, the syntax element 1 in the current block is subblock_merge_flag, or the syntax element 2 in the current block is affine_inter_flag.

This step may be specifically performed by the entropy decoding unit 304 in FIG. 3.

The current block in this embodiment of the present disclosure may be a CU.

1002. Perform entropy decoding on the to-be-entropy-decoded syntax element in the current block, where entropy decoding on the syntax element 1 in the current block is completed by using a preset context model, or entropy decoding on the syntax element 2 in the current block is completed by using the context model.

This step may be specifically performed by the entropy decoding unit 304 in FIG. 3.

1003. Perform prediction processing on the current block based on a syntax element that is in the current block and that is obtained through entropy decoding, to obtain a prediction block of the current block.

This step may be specifically performed by the prediction processing unit 360 in FIG. 3.

1004. Obtain a reconstructed image of the current block based on the prediction block of the current block.

This step may be specifically performed by the reconstruction unit 314 in FIG. 3.

In this embodiment, because the syntax element 1 and the syntax element 2 in the current block share one context model, the decoder does not need to confirm the context model when performing entropy decoding, so as to improve decoding efficiency of performing video decoding by the decoder. In addition, because the video decoder needs to store only one context model for the syntax element 1 and the syntax element 2, less storage space of the video decoder is occupied.

Corresponding to the video decoding method described in FIG. 10, an embodiment of the present disclosure further provides an encoding method, including obtaining a to-be-entropy-encoded syntax element in a current block, where the to-be-entropy-encoded syntax element in the current block includes a syntax element 1 in the current block or a syntax element 2 in the current block, performing entropy encoding on the to-be-entropy-encoded syntax element in the current block, where when entropy encoding is performed on the to-be-entropy-encoded syntax element in the current block, entropy encoding on the syntax element 1 in the current block is completed by using a preset context model, or entropy encoding on the syntax element 2 in the current block is completed by using the context model, and outputting a bitstream including a syntax element that is in the current block and that is obtained through entropy encoding. The context model used when entropy encoding is performed on the current block is the same as the context model in the video decoding method described in FIG. 10.

In this embodiment, because the syntax element 1 and the syntax element 2 in the current block share one context model, an encoder does not need to confirm the context model when performing entropy encoding, so as to improve encoding efficiency of performing video encoding by the encoder. In addition, because the video encoder needs to store only one context model for the syntax element 1 and the syntax element 2, less storage space of the video encoder is occupied.

Figure 11:
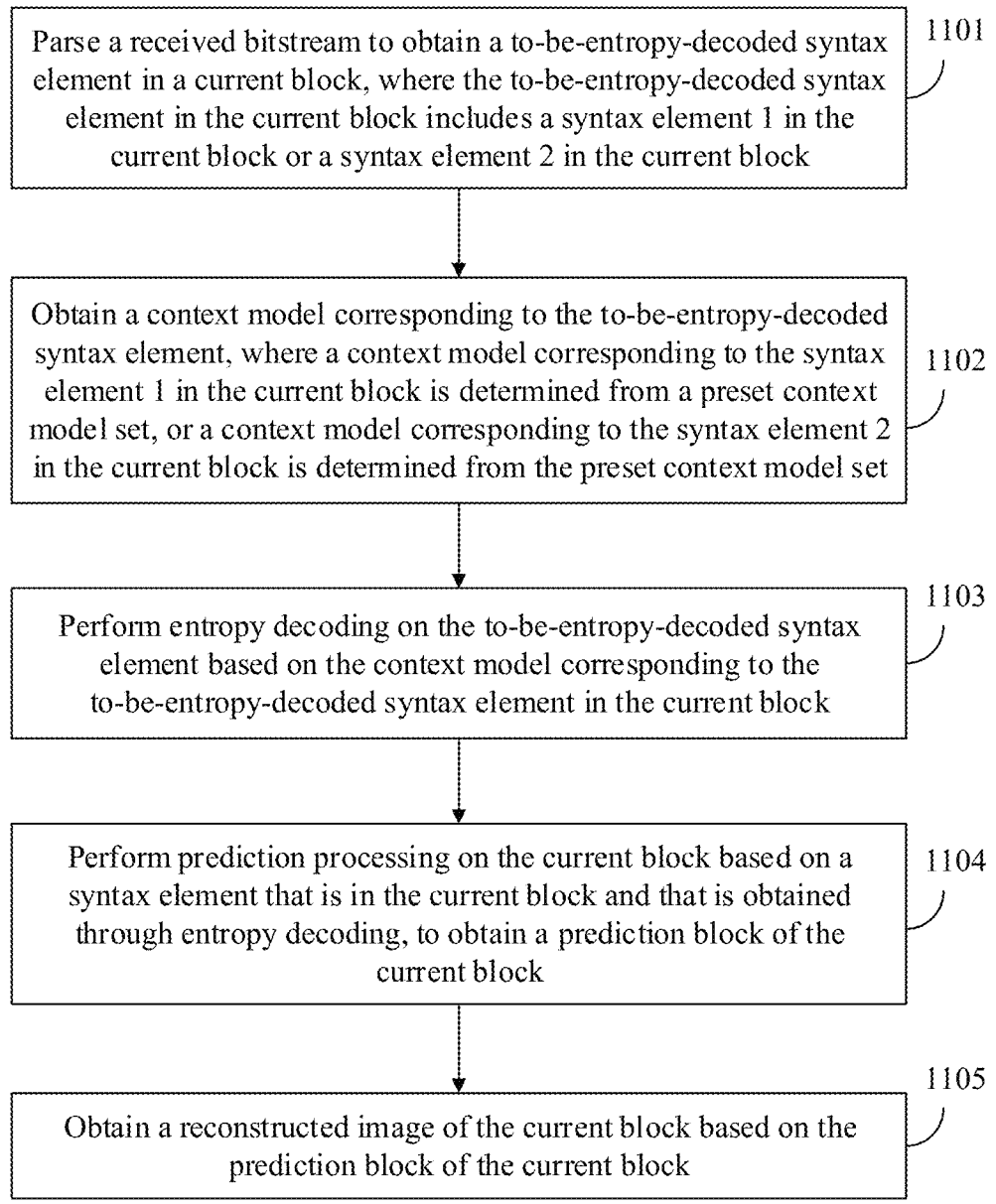
FIG. 11 is a flowchart illustrating a video decoding method according to an embodiment.

FIG. 11 describes a procedure of a video decoding method according to another embodiment of the present disclosure.

This embodiment may be executed by the video decoder shown in FIG. 3. As shown in FIG. 11, the method includes the following steps.

1101. Parse a received bitstream to obtain a to-be-entropy-decoded syntax element in a current block, where the to-be-entropy-decoded syntax element in the current block includes a syntax element 1 in the current block or a syntax element 2 in the current block.

In an implementation, the syntax element 1 in the current block is affine_merge_flag, or the syntax element 2 in the current block is affine_inter_flag.

In an implementation, the syntax element 1 in the current block is subblock_merge_flag, or the syntax element 2 in the current block is affine_inter_flag.

This step may be specifically performed by the entropy decoding unit 304 in FIG. 3.

1102. Obtain a context model corresponding to the to-be-entropy-decoded syntax element, where a context model corresponding to the syntax element 1 in the current block is determined from a preset context model set, or a context model corresponding to the syntax element 2 in the current block is determined from the preset context model set.

The video decoder needs to store only one context model set for the syntax element 1 and the syntax element 2.

For example, if the quantity of context models in the preset context model set is 3, a value of the context index of the syntax element 1 in the current block is a sum of a value obtained by performing an OR operation on the syntax element 1 and the syntax element 2 in the upper neighboring block and a value obtained by performing an OR operation on the syntax element 1 and the syntax element 2 in the left neighboring block, or a value of the context index of the syntax element 2 in the current block is a sum of a value obtained by performing an OR operation on the syntax element 1 and the syntax element 2 in the upper neighboring block and a value obtained by performing an OR operation on the syntax element 1 and the syntax element 2 in the left neighboring block.

Specifically, the syntax element 1 affine_merge_flag and the syntax element 2 affine_inter_flag may share one context model set (the set includes three context models). An actual context index used in each set is equal to a result obtained by adding a value obtained by performing an OR operation on two syntax elements in the left neighboring block of a current decoding block and a value obtained by performing an OR operation on two syntax elements in the upper neighboring block of the current decoding block, as shown in Table 4. Herein, "|" indicates an OR operation.

TABLE 4

| Syntax element | condL | condA | Context index |
|---|---|---|---|
| affine_merge_flag [x0][y0] affine_inter_flag [x0][y0] | affine_merge_flag [x0−1][y0] | affine_inter_flag [x0−01][y0] | affine_merge_flag [x0][y0−1] | affine_inter_flag [x0][y0−1] | (condL && availableL) + (condA && availableA) |

Context index in the present disclosure

In some implementations, the preset context model set includes only two context models. In some other implementations, the preset context model set includes only three context models. It may be understood that the preset context model set may alternatively include four, five, or six context models. A quantity of context models included in the preset context model set is not limited in this embodiment of the present disclosure.

In an implementation, that a context model corresponding to the syntax element 1 in the current block is determined from a preset context model set includes determining a context index of the syntax element 1 in the current block based on a syntax element 1 and a syntax element 2 in the left neighboring block of the current block and a syntax element 1 and a syntax element 2 in the upper neighboring block of the current block, where the context index of the syntax element 1 in the current block is used to indicate the context model corresponding to the syntax element 1 in the current block.

In another implementation, that a context model corresponding to the syntax element 2 in the current block is determined from the preset context model set includes determining a context index of the syntax element 2 in the current block based on a syntax element 1 and a syntax element 2 in the left neighboring block of the current block and a syntax element 1 and a syntax element 2 in the upper neighboring block of the current block, where the context index of the syntax element 2 in the current block is used to indicate the context model corresponding to the syntax element 2 in the current block.

For example, if the quantity of context models in the preset context model set is 2, a value of the context index of the syntax element 1 in the current block is a result obtained by performing an OR operation on a value obtained by performing an OR operation on the syntax element 1 and the syntax element 2 in the upper neighboring block and a value obtained by performing an OR operation on the syntax element 1 and the syntax element 2 in the left neighboring block, or a value of the context index of the syntax element 2 in the current block is a result obtained by performing an OR operation on a value obtained by performing an OR operation on the syntax element 1 and the syntax element 2 in the upper neighboring block and a value obtained by performing an OR operation on the syntax element 1 and the syntax element 2 in the left neighboring block.

Specifically, the syntax element 1 affine_merge_flag and the syntax element 2 affine_inter_flag share one context model set (the set includes two context models). An actual context index used in each set is equal to a result obtained by performing an OR operation on a value obtained by performing an OR operation on two syntax elements in the left neighboring block of a current decoding block and a value obtained by performing an OR operation on two syntax elements in the upper neighboring block of the current decoding block, as shown in Table 5. Herein, "|" indicates an OR operation. In this embodiment of the present disclosure, the quantity of contexts for affine_merge_flag and affine_inter_flag is reduced to 2.

TABLE 5

| | Context index in the present disclosure | | |
|---|---|---|---|
| Syntax element | condL | condA | Context index |
| affine_merge_flag [x0][y0] | affine_merge_flag [x0−1][y0] \| affine_inter_flag [x0−01][y0] | affine_merge_flag [x0][y0−1] \| affine_inter_flag [x0][y0−1] | (condL && availableL) \| (condA && availableA) |
| affine_inter_flag [x0][y0] | | | |

1103. Perform entropy decoding on the to-be-entropy-decoded syntax element based on the context model corresponding to the to-be-entropy-decoded syntax element in the current block.

This step may be specifically performed by the entropy decoding unit 304 in FIG. 3.

1104. Perform prediction processing on the current block based on a syntax element that is in the current block and that is obtained through entropy decoding, to obtain a prediction block of the current block.

This step may be specifically performed by the prediction processing unit 360 in FIG. 3.

1105. Obtain a reconstructed image of the current block based on the prediction block of the current block.

This step may be specifically performed by the reconstruction unit 314 in FIG. 3.

In this embodiment, because the syntax element 1 and the syntax element 2 in the current block share one context model, the video decoder needs to store only one context model for the syntax element 1 and the syntax element 2, so as to occupy less storage space of the video decoder.

Corresponding to the video decoding method described in FIG. 11, an embodiment of the present disclosure further provides an encoding method, including obtaining a to-be-entropy-encoded syntax element in a current block, where the to-be-entropy-encoded syntax element in the current block includes a syntax element 1 in the current block or a syntax element 2 in the current block, obtaining a context model corresponding to the to-be-entropy-encoded syntax element, where a context model corresponding to the syntax element 1 in the current block is determined from a preset context model set, or a context model corresponding to the syntax element 2 in the current block is determined from the preset context model set, performing entropy encoding on the to-be-entropy-encoded syntax element based on the context model corresponding to the to-be-entropy-encoded syntax element in the current block, and outputting a bitstream including a syntax element that is in the current block and that is obtained through entropy encoding. The context model set used when entropy encoding is performed on the current block is the same as the context model set in the video decoding method described in FIG. 11. In this embodiment, because the syntax element 1 and the syntax element 2 in the current block share one context model, a video encoder needs to store only one context model for the syntax element 1 and the syntax element 2, so as to occupy less storage space of the video encoder.

Figure 12:
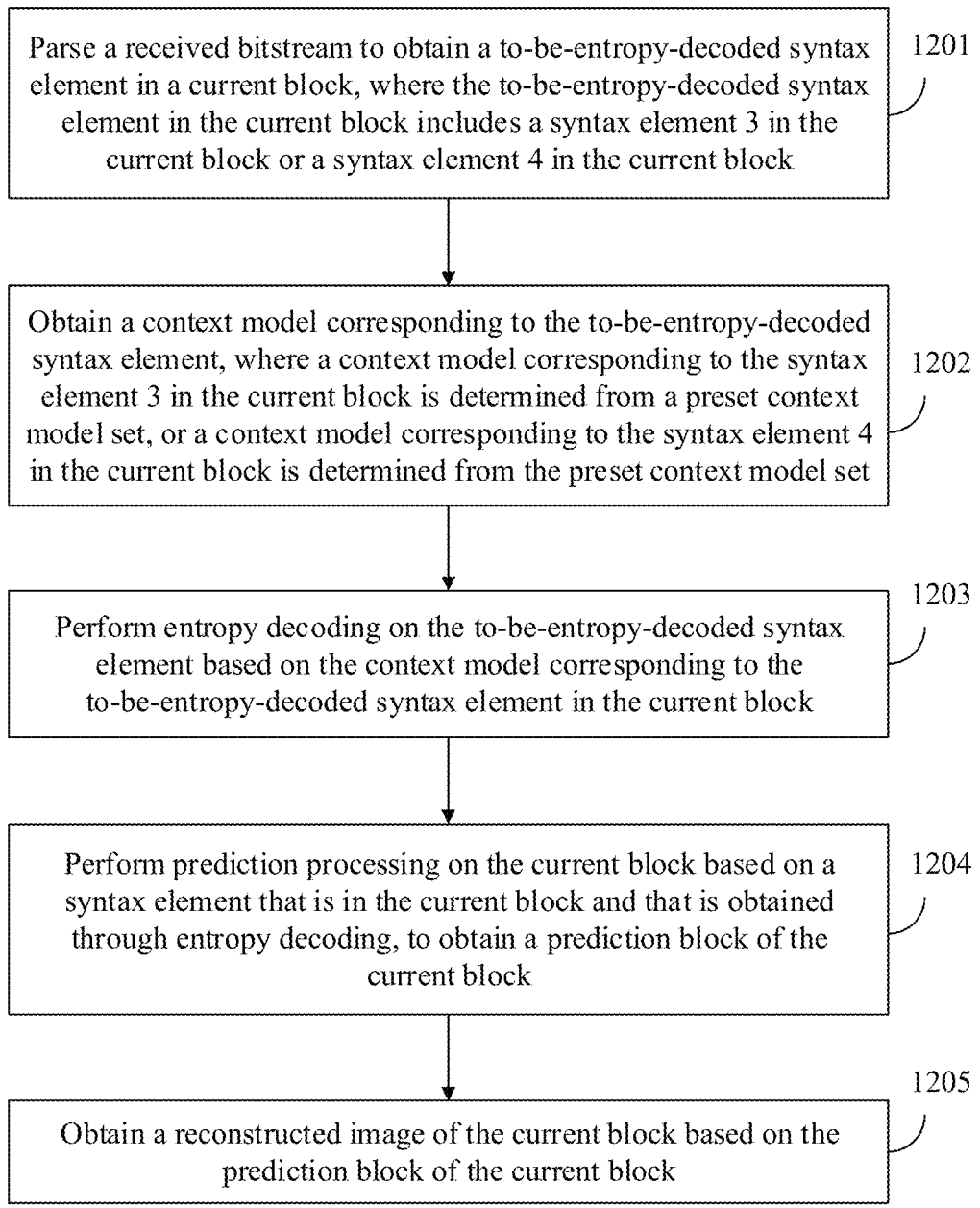
FIG. 12 is a flowchart illustrating a video decoding method according to an embodiment.

FIG. 12 describes a procedure of a video decoding method according to an embodiment of the present disclosure. This embodiment may be executed by the video decoder shown in FIG. 3. As shown in FIG. 12, the method includes the following steps.

1201. Parse a received bitstream to obtain a to-be-entropy-decoded syntax element in a current block, where the to-be-entropy-decoded syntax element in the current block includes a syntax element 3 in the current block or a syntax element 4 in the current block.

In an implementation, the syntax element 3 in the current block is merge_idx, or the syntax element 4 in the current block is affine_merge_idx.

In an implementation, the syntax element 3 in the current block is merge_idx, or the syntax element 4 in the current block is subblock_merge_idx.

This step may be specifically performed by the entropy decoding unit 304 in FIG. 3.

1202. Obtain a context model corresponding to the to-be-entropy-decoded syntax element, where a context model corresponding to the syntax element 3 in the current block is determined from a preset context model set, or a context model corresponding to the syntax element 4 in the current block is determined from the preset context model.

In an implementation, a quantity of context models included in the preset context model set is 5. It may be understood that the quantity of context models included in the preset context model set may alternatively be another value such as 1, 2, 3, or 4. When the quantity of context models included in the preset context model set is 1, the preset context model set is the one context model. The quantity of context models included in the preset context model set is not limited in this embodiment of the present disclosure.

This step may be specifically performed by the entropy decoding unit 304 in FIG. 3.

1203. Perform entropy decoding on the to-be-entropy-decoded syntax element based on the context model corresponding to the to-be-entropy-decoded syntax element in the current block. This step may be specifically performed by the entropy decoding unit 304 in FIG. 3.

1204. Perform prediction processing on the current block based on a syntax element that is in the current block and that is obtained through entropy decoding, to obtain a prediction block of the current block.

This step may be specifically performed by the prediction processing unit 360 in FIG. 3.

1205. Obtain a reconstructed image of the current block based on the prediction block of the current block.

This step may be specifically performed by the reconstruction unit 314 in FIG. 3.

In this embodiment, because the syntax element 3 and the syntax element 4 in the current block share one context model, the video decoder needs to store only one context model for the syntax element 3 and the syntax element 4, so as to occupy less storage space of the video decoder.

Corresponding to the video decoding method described in FIG. 12, an embodiment of the present disclosure further provides an encoding method, including obtaining a to-be-entropy-encoded syntax element in a current block, where the to-be-entropy-encoded syntax element in the current block includes a syntax element 3 in the current block or a syntax element 4 in the current block, obtaining a context model corresponding to the to-be-entropy-encoded syntax element, where a context model corresponding to the syntax element 3 in the current block is determined from a preset context model set, or a context model corresponding to the syntax element 4 in the current block is determined from the preset context model set, performing entropy encoding on the to-be-entropy-encoded syntax element based on the context model corresponding to the to-be-entropy-encoded syntax element in the current block, and outputting a bitstream including a syntax element that is in the current block and that is obtained through entropy encoding. The context model set used when entropy encoding is performed on the current block is the same as the context model set in the video decoding method described in FIG. 12. In this embodiment, because the syntax element 3 and the syntax element 4 in the current block share one context model, a video encoder needs to store only one context model for the syntax element 3 and the syntax element 4, so as to occupy less storage space of the video encoder.

An embodiment of the present disclosure provides a video decoder 30, including an entropy decoding unit 304, a prediction processing unit 360, and a reconstruction unit 314.

The entropy decoding unit 304 is configured to parse a received bitstream to obtain a to-be-entropy-decoded syntax element in a current block, where the to-be-entropy-decoded syntax element in the current block includes a syntax element 1 in the current block or a syntax element 2 in the current block, and perform entropy decoding on the to-be-entropy-decoded syntax element in the current block, where entropy decoding on the syntax element 1 in the current block is completed by using a preset context model, or entropy decoding on the syntax element 2 in the current block is completed by using the context model.

In an implementation, the syntax element 1 in the current block is affine_merge_flag, or the syntax element 2 in the current block is affine_inter_flag.

In an implementation, the syntax element 1 in the current block is subblock_merge_flag, or the syntax element 2 in the current block is affine_inter_flag.

The prediction processing unit 360 is configured to perform prediction processing on the current block based on a syntax element that is in the current block and that is obtained through entropy decoding, to obtain a prediction block of the current block.

The reconstruction unit 314 is configured to obtain a reconstructed image of the current block based on the prediction block of the current block.

In this embodiment, because the syntax element 1 and the syntax element 2 in the current block share one context model, the decoder does not need to confirm the context model when performing entropy decoding, so as to improve decoding efficiency of performing video decoding by the decoder. In addition, because the video decoder needs to store only one context model for the syntax element 1 and the syntax element 2, less storage space of the video decoder is occupied.

Correspondingly, an embodiment of the present disclosure provides a video encoder 20, including an entropy encoding unit 270, configured to obtain a to-be-entropy-encoded syntax element in a current block, where the to-be-entropy-encoded syntax element in the current block includes a syntax element 1 in the current block or a syntax element 2 in the current block, and perform entropy encoding on the to-be-entropy-encoded syntax element in the current block, where when entropy encoding is performed on the to-be-entropy-encoded syntax element in the current block, entropy encoding on the syntax element 1 in the current block is completed by using a preset context model, or entropy encoding on the syntax element 2 in the current block is completed by using the context model, and an output 272, configured to output a bitstream including a syntax element that is in the current block and that is obtained through entropy encoding. The context model used when entropy encoding is performed on the current block is the same as the context model in the method described in FIG. 10. In this embodiment, because the syntax element 1 and the syntax element 2 in the current block share one context model, the encoder does not need to confirm the context model when performing entropy encoding, so as to improve encoding efficiency of performing video encoding by the encoder. In addition, because the video encoder needs to store only one context model for the syntax element 1 and the syntax element 2, less storage space of the video encoder is occupied.

Another embodiment of the present disclosure provides a video decoder 30, including an entropy decoding unit 304, a prediction processing unit 360, and a reconstruction unit 314.

The entropy decoding unit 304 is configured to parse a received bitstream to obtain a to-be-entropy-decoded syntax element in a current block, where the to-be-entropy-decoded syntax element in the current block includes a syntax element 1 in the current block or a syntax element 2 in the current block, obtain a context model corresponding to the to-be-entropy-decoded syntax element, where a context model corresponding to the syntax element 1 in the current block is determined from a preset context model set, or a context model corresponding to the syntax element 2 in the current block is determined from the preset context model set, and perform entropy decoding on the to-be-entropy-decoded syntax element based on the context model corresponding to the to-be-entropy-decoded syntax element in the current block.

In an implementation, the syntax element 1 in the current block is affine_merge_flag, or the syntax element 2 in the current block is affine_inter_flag.

In an implementation, the syntax element 1 in the current block is subblock_merge_flag, or the syntax element 2 in the current block is affine_inter_flag.

In an implementation, the entropy decoding unit 304 may be specifically configured to determine a context index of the syntax element 1 in the current block based on a syntax element 1 and a syntax element 2 in the left neighboring block of the current block and a syntax element 1 and a syntax element 2 in the upper neighboring block of the current block, where the context index of the syntax element 1 in the current block is used to indicate the context model corresponding to the syntax element 1 in the current block, or determine a context index of the syntax element 2 in the current block based on a syntax element 1 and a syntax element 2 in the left neighboring block of the current block and a syntax element 1 and a syntax element 2 in the upper neighboring block of the current block, where the context index of the syntax element 2 in the current block is used to indicate the context model corresponding to the syntax element 2 in the current block.

For example, a value of the context index of the syntax element 1 in the current block is a sum of a value obtained by performing an OR operation on the syntax element 1 and the syntax element 2 in the upper neighboring block and a value obtained by performing an OR operation on the syntax element 1 and the syntax element 2 in the left neighboring block, or a value of the context index of the syntax element 2 in the current block is a sum of a value obtained by performing an OR operation on the syntax element 1 and the syntax element 2 in the upper neighboring block and a value obtained by performing an OR operation on the syntax element 1 and the syntax element 2 in the left neighboring block.

For example, a value of the context index of the syntax element 1 in the current block is a result obtained by performing an OR operation on a value obtained by performing an OR operation on the syntax element 1 and the syntax element 2 in the upper neighboring block and a value obtained by performing an OR operation on the syntax element 1 and the syntax element 2 in the left neighboring block, or a value of the context index of the syntax element 2 in the current block is a result obtained by performing an OR operation on a value obtained by performing an OR operation on the syntax element 1 and the syntax element 2 in the upper neighboring block and a value obtained by performing an OR operation on the syntax element 1 and the syntax element 2 in the left neighboring block.

The prediction processing unit 360 is configured to perform prediction processing on the current block based on a syntax element that is in the current block and that is obtained through entropy decoding, to obtain a prediction block of the current block.

The reconstruction unit 314 is configured to obtain a reconstructed image of the current block based on the prediction block of the current block.

In this embodiment, because the syntax element 1 and the syntax element 2 in the current block share one context model, the video decoder needs to store only one context model for the syntax element 1 and the syntax element 2, so as to occupy less storage space of the video decoder.

Correspondingly, an embodiment of the present disclosure further provides a video encoder, including an entropy encoding unit 270, configured to obtain a to-be-entropy-encoded syntax element in a current block, where the to-be-entropy-encoded syntax element in the current block includes a syntax element 1 in the current block or a syntax element 2 in the current block, obtain a context model corresponding to the to-be-entropy-encoded syntax element, where a context model corresponding to the syntax element 1 in the current block is determined from a preset context model set, or a context model corresponding to the syntax element 2 in the current block is determined from the preset context model set, and perform entropy encoding on the to-be-entropy-encoded syntax element based on the context model corresponding to the to-be-entropy-encoded syntax element in the current block, and an output 272, configured to output a bitstream including a syntax element that is in the current block and that is obtained through entropy encoding. The context model set used when entropy encoding is performed on the current block is the same as the context model set in the video decoding method described in FIG. 11. In this embodiment, because the syntax element 1 and the syntax element 2 in the current block share one context model, the video encoder needs to store only one context model for the syntax element 1 and the syntax element 2, so as to occupy less storage space of the video encoder.

Another embodiment of the present disclosure provides a video decoder 30, including an entropy decoding unit 304, a prediction processing unit 360, and a reconstruction unit 314.

The entropy decoding unit 304 is configured to parse a received bitstream to obtain a to-be-entropy-decoded syntax element in a current block, where the to-be-entropy-decoded syntax element in the current block includes a syntax element 3 in the current block or a syntax element 4 in the current block, obtain a context model corresponding to the to-be-entropy-decoded syntax element, where a context model corresponding to the syntax element 3 in the current block is determined from a preset context model set, or a context model corresponding to the syntax element 4 in the current block is determined from the preset context model set, and perform entropy decoding on the to-be-entropy-decoded syntax element based on the context model corresponding to the to-be-entropy-decoded syntax element in the current block.

The preset context model set includes one, two, three, four, or five context models. It may be understood that, when the preset context model set includes only one context model, the preset context model set is the one context model.

In an implementation, the syntax element 3 in the current block is merge_idx, and is used to indicate an index value of a merge candidate list of the current block, or the syntax element 4 in the current block is affine_merge_idx, and is used to indicate an index value of an affine merge candidate list of the current block, or the syntax element 3 in the current block is merge_idx, and is used to indicate an index value of a merge candidate list of the current block, or the syntax element 4 in the current block is subblock_merge_idx, and is used to indicate an index value of a subblock merge candidate list.

The prediction processing unit 360 is configured to perform prediction processing on the current block based on a syntax element that is in the current block and that is obtained through entropy decoding, to obtain a prediction block of the current block.

The reconstruction unit 314 is configured to obtain a reconstructed image of the current block based on the prediction block of the current block.

In this embodiment, because the syntax element 3 and the syntax element 4 in the current block share one context model, the video decoder needs to store only one context model for the syntax element 3 and the syntax element 4, so as to occupy less storage space of the video decoder.

Correspondingly, an embodiment of the present disclosure further provides a video encoder, including an entropy encoding unit 270, configured to obtain a to-be-entropy-encoded syntax element in a current block, where the to-be-entropy-encoded syntax element in the current block includes a syntax element 3 in the current block or a syntax element 4 in the current block, obtain a context model corresponding to the to-be-entropy-encoded syntax element, where a context model corresponding to the syntax element 3 in the current block is determined from a preset context model set, or a context model corresponding to the syntax element 4 in the current block is determined from the preset context model set, and perform entropy encoding on the to-be-entropy-encoded syntax element based on the context model corresponding to the to-be-entropy-encoded syntax element in the current block, and an output 272, configured to output a bitstream including a syntax element that is in the current block and that is obtained through entropy encoding. The context model set used when entropy encoding is performed on the current block is the same as the context model set in the video decoding method described in FIG. 12. In this embodiment, because the syntax element 3 and the syntax element 4 in the current block share one context model, the video encoder needs to store only one context model for the syntax element 3 and the syntax element 4, so as to occupy less storage space of the video encoder.

Embodiment 1 of the present disclosure proposes that affine_merge_flag and affine_inter_flag share one context set (the set includes three contexts), and an actual context index used in each set is equal to a result obtained by adding a value obtained by performing an OR operation on two syntax elements in the left neighboring block of a current decoding block and a value obtained by performing an OR operation on two syntax elements in the upper neighboring block of the current decoding block, as shown in Table 4. Herein, "|" indicates an OR operation. In Embodiment 1 of the present disclosure, the quantity of contexts for affine_merge_flag and affine_inter_flag is reduced to 3.

Embodiment 2 of the present disclosure proposes that affine_merge_flag and affine_inter_flag share one context set (the set includes two contexts), and an actual context index used in each set is equal to a result obtained by performing an OR operation on a value obtained by performing an OR operation on two syntax elements in the left neighboring block of a current decoding block and a value obtained by performing an OR operation on two syntax elements in the upper neighboring block of the current decoding block, as shown in Table 5. Herein, "|" indicates an OR operation. In Embodiment 2 of the present disclosure, the quantity of contexts for affine_merge_flag and affine_inter_flag is reduced to 2.

Embodiment 3 of the present disclosure proposes that affine_merge_flag and affine_inter_flag share one context. In Embodiment 3 of the present disclosure, the number of affine_merge_flag contexts and the number of affine_inter_flag contexts are reduced to 1.

In other approaches, binarization is performed on merge_idx and affine_merge_idx by using truncated unary codes, two different context sets (each context set includes five contexts) are used in CABAC, and different contexts are used for each binary bit after the binarization. In other approaches, the quantity of contexts for merge_idx and affine_merge_idx is 10.

Embodiment 4 of the present disclosure proposes that merge_idx and affine_merge_idx share one context set (each context set includes five contexts). In Embodiment 4 of the present disclosure, the quantity of contexts for merge_idx and affine_merge_idx is reduced to 5.

In some other technologies, the syntax element affine_merge_flag[x0][y0] in Table 1 may be replaced with subblock_merge_flag[x0][y0], and is used to indicate whether a subblock-based merge mode is used for the current block, and the syntax element affine_merge_idx[x0][y0] in Table 1 may be replaced with subblock_merge_idx[x0][y0], and is used to indicate an index value of a subblock merge candidate list.

In this case, Embodiment 1 to Embodiment 4 of the present disclosure are still applicable, that is, subblock_merge_flag and affine_inter_flag share one context set (or context) and one index obtaining method, and merge_idx and subblock_merge_idx share one context set (or context).

An embodiment of the present disclosure further provides a video decoder, including an execution circuit configured to perform any one of the foregoing methods.

An embodiment of the present disclosure further provides a video decoder, including at least one processor and a non-volatile computer readable storage medium coupled to the at least one processor. The non-volatile computer readable storage medium stores a computer program that can be executed by the at least one processor, and when the computer program is executed by the at least one processor, the video decoder is enabled to perform any one of the foregoing methods.

An embodiment of the present disclosure further provides a computer readable storage medium, configured to store a computer program that can be executed by a processor. When the computer program is executed by the at least one processor, any one of the foregoing methods is performed.

An embodiment of the present disclosure further provides a computer program. When the computer program is executed, any one of the foregoing methods is performed.

In one or more of the foregoing examples, the described functions may be implemented by hardware, software, firmware, or any combination thereof. If implemented in software, the functions may be stored in or transmitted over a computer readable medium and executed by a hardware-based processing unit as one or more instructions or codes. The computer readable medium may include a computer readable storage medium, which corresponds to a tangible medium such as a data storage medium or a communications medium. The communications medium includes, for example, any medium that facilitates transfer of a computer program from one place to another according to a communications protocol. Therefore, the computer readable medium may generally correspond to (1) a non-transitory tangible computer readable storage medium or (2) a communications medium such as a signal or a carrier. The data storage medium may be any available medium that can be accessed by one or more computers or one or more processors to retrieve an instruction, code, and/or a data structure for implementation of the technologies described in the present disclosure. A computer program product may include the computer readable medium.

By way of example rather than limitation, such computer readable storage medium may include a RAM, a ROM, an electrically erasable programable ROM (EEPROM), a compact disc-ROM (CD-ROM) or another optical disk storage, a magnetic disk storage or another magnetic storage device, a flash memory, or any other medium that can be used to store required program code in a form of an instruction or a data structure and that can be accessed by a computer. In addition, any connection may be properly referred to as a computer readable medium. For example, if an instruction is transmitted from a website, a server, or another remote source by using a coaxial cable, a fiber optical cable, a twisted pair, a digital subscriber line (DSL), or wireless technologies such as infrared, radio, and microwave, the coaxial cable, the fiber optical cable, the twisted pair, the DSL, or the wireless technologies such as infrared, radio, and microwave are included in the definition of the medium. However, it should be understood that the computer readable storage medium and the data storage medium include no connection, carrier, signal, or any other transitory media, but are actually directed to a non-transitory tangible storage medium. As used in this specification, a disk and an optical disc include a compact disc (CD), a laser disc, an optical disc, a DVD, a floppy disk, and a BLU-RAY disc. The disk generally reproduces data magnetically, and the optical disc reproduces data optically by using a laser. Any combinations of the foregoing also should fall within the scope of the computer readable medium.

The instruction may be executed by one or more processors, and the one or more processors are, for example, one or more DSPs, one or more general purpose microprocessors, one or more ASICs, one or more FPGAs, or other equivalent integrated or discrete logic circuits. Therefore, the term "processor" used in this specification may represent any one of the foregoing structures or other structures applicable to implementation of the technologies described in this specification. In addition, in some aspects, the functions described in this specification may be provided within dedicated hardware and/or software modules configured to perform encoding and decoding, or may be incorporated in a combined codec. In addition, the technologies may be completely implemented in one or more circuits or logic elements.

The technologies of this disclosure may be implemented in a plurality of devices or apparatuses that include a wireless handset, an integrated circuit (IC), or an IC set (for example, a chip set). Various components, modules, or units are described in this disclosure to emphasize functions of devices configured to perform the disclosed technologies, which are not necessarily implemented by different hardware units. Actually, as described above, various units may be combined in a codec hardware unit in conjunction with proper software and/or firmware, or may be provided by a set of interoperable hardware units. The hardware units include the one or more processors described above.

What is claimed is:

1. A method comprising:
parsing a received bitstream to obtain information corresponding to a quantized coefficient and to a to-be-entropy-decoded syntax element in a current block, wherein the to-be-entropy-decoded syntax element comprises a first syntax element or a second syntax element, and wherein either the first syntax element is a first flag indicating whether a subblock-based merge mode is used for the current block or the second syntax element is a second flag indicating whether an affine motion model-based advanced motion vector prediction (AMVP) mode is used for the current block when a slice in which the current block is located is a P-type slice or a B-type slice;
obtaining a first context model corresponding to the to-be-entropy-decoded syntax element;
performing entropy decoding on the to-be-entropy-decoded syntax element based on the first context model;
obtaining the quantized coefficient based on the information;
performing inverse quantization on the quantized coefficient to obtain an inverse quantized coefficient;
performing prediction processing on the current block based on a third syntax element that is in the current block and that is based on entropy decoding in order to obtain a prediction block of the current block; and
obtaining a reconstructed image of the current block based on the prediction block and the inverse quantized coefficient.

2. The method of claim 1, wherein a second context model corresponding to the first syntax element is based on a preset context model set by determining a first context index of the first syntax element based on a fourth syntax element and a fifth syntax element in a left neighboring block of the current block and a sixth syntax element and a seventh syntax element in an upper neighboring block of the current block, and wherein the first context index indicates the second context model.

3. The method of claim 1, wherein a third context model corresponding to the second syntax element is based on a preset context model set by determining a second context index of the second syntax element in the current block based on a fourth syntax element and a fifth syntax element in a left neighboring block of the current block and a sixth syntax element and a seventh syntax element in an upper neighboring block of the current block, and wherein the second context index indicates the third context model.

4. A video decoding device, comprising:
a non-transitory memory storage configured to store video data in a form of a bitstream, wherein the bitstream comprises information corresponding to a quantized coefficient and to a to-be-entropy-decoded syntax element in a current block, and wherein the to-be-entropy-decoded syntax element comprises a first syntax element or a second syntax element, and wherein either the first syntax element is a first flag indicating whether a subblock-based merge mode is used for the current block or the second syntax element is a second flag indicating whether an affine motion model-based advanced motion vector prediction (AMVP) mode is used for the current block when a slice in which the current block is located is a P-type slice or a B-type slice; and
a video decoder coupled to the non-transitory memory storage and configured to:
parse the bitstream to obtain the information corresponding to the quantized coefficient and to the to-be-entropy-decoded syntax element;
obtain a first context model corresponding to the to-be-entropy-decoded syntax element;
perform entropy decoding on the to-be-entropy-decoded syntax element based on the first context model;
obtain the quantized coefficient based on the information;
perform inverse quantization on the quantized coefficient to obtain an inverse quantized coefficient;
perform prediction processing on the current block based on a third syntax element that is in the current block and that is based on entropy decoding in order to obtain a prediction block of the current block; and
obtain a reconstructed image of the current block based on the prediction block and the inverse quantized coefficient.

5. The video decoding device of claim 4, wherein the video decoder is further configured to determine a first context index of the first syntax element based on a fourth syntax element and a fifth syntax element in a left neighboring block of the current block and a sixth syntax element and a seventh syntax element in an upper neighboring block of the current block, and wherein the first context index indicates a second context model corresponding to the first syntax element and based on a preset context model set.

6. The video decoding device of claim 4, wherein the video decoder is further configured to determine a second context index of the second syntax element based on a fourth syntax element and a fifth syntax element in a left neighboring block of the current block and a sixth syntax element and a seventh syntax element in an upper neighboring block of the current block, and wherein the second context index indicates a third context model corresponding to the second syntax element based on a preset context model set.

7. A video encoding device comprising:
one or more memories configured to store programming instructions; and
one or more processors coupled to the one or more memories and configured to execute the programming instructions to cause the video encoding device to:
obtain a quantized coefficient by performing quantization;
obtain a to-be-entropy-encoded syntax element in a current block, wherein the to-be-entropy-encoded syntax element in the current block comprises a first syntax element or a second syntax element, and wherein either the first syntax element is a first flag indicating whether a subblock-based merge mode is used for the current block or the second syntax element is a second flag indicating whether an affine motion model-based advanced motion vector prediction (AMVP) mode is used for the current block when a slice in which the current block is located is a P-type slice or a B-type slice;
obtain a first context model corresponding to the to-be-entropy-encoded syntax element;
perform entropy encoding on the to-be-entropy-encoded syntax element based on the first context model;
generate a bitstream, wherein the bitstream comprises information corresponding to the quantized coefficient and comprises entropy encoded syntax element corresponding to the to-be-entropy-encoded syntax element; and
transmit the bitstream to a video decoding device.

8. The video encoding device of claim 7, wherein the one or more processors further cause the video encoding device to determine a first context index of the first syntax element based on a third syntax element and a fourth syntax element in a left neighboring block of the current block and a fifth syntax element and a sixth syntax element in an upper neighboring block of the current block, and wherein the first context index indicates a second context model corresponding to the first syntax element and based on a preset context model set.

9. The video encoding device of claim 7, wherein the one or more processors further cause the video encoder to determine a second context index of the second syntax element based on a third syntax element and a fourth syntax element in a left neighboring block of the current block and a fifth syntax element and a sixth syntax element in an upper neighboring block of the current block, and wherein the second context index indicates a third context model corresponding to the second syntax element and based on a preset context model set.

10. A non-transitory storage medium storing an encoded bitstream for video signals, wherein the encoded bitstream comprises:
information corresponding to a quantized coefficient based on performing quantization; and
a to-be-entropy-decoded syntax element in a current block,
wherein the to-be-entropy-decoded syntax element comprises a first syntax element or a second syntax element,
wherein both of a first context model corresponding to the first syntax element and a second context model corresponding to the second syntax element are based on a same preset context model set, and
wherein either the first syntax element is a first flag indicating whether a subblock-based merge mode is used for the current block or the second syntax element is a second flag indicating whether an affine motion model-based advanced motion vector prediction (AMVP) mode is used for the current block when a slice in which the current block is located is a P-type slice or a B-type slice.

11. The non-transitory storage medium of claim 10, wherein the first context model is determined based on a third syntax element and a fourth syntax element in a left neighboring block of the current block and a fifth syntax element and a sixth syntax element in an upper neighboring block of the current block, and wherein a first context index of the first syntax element indicates the context model corresponding to the first syntax element.

12. The non-transitory storage medium of claim 10, wherein the second context model is determined based on a third syntax element and a fourth syntax element in a left neighboring block of the current block and a fifth syntax element and a sixth syntax element in an upper neighboring block of the current block, and wherein a first context index of the first syntax element indicates the context model corresponding to the first syntax element.

13. The method of claim 1, wherein the AMVP mode comprises a translational model-based AMVP mode.

14. The method of claim 1, wherein the AMVP mode comprises a non-translational model-based AMVP mode.

15. The video decoding device of claim 4, wherein the AMVP mode comprises a translational model-based AMVP mode.

16. The video decoding device of claim 4, wherein the AMVP mode comprises a non-translational model-based AMVP mode.

17. The video encoding device of claim 7, wherein the AMVP mode comprises a translational model-based AMVP mode.

18. The video encoding device of claim 7, wherein the AMVP mode comprises a non-translational model-based AMVP mode.

19. The non-transitory storage medium of claim 10, wherein the AMVP mode comprises a translational model-based AMVP mode.

20. The non-transitory storage medium of claim 10, wherein the AMVP mode comprises a non-translational model-based AMVP mode.

* * * * *